US012664984B1

(12) United States Patent
Wilson et al.

(10) Patent No.: US 12,664,984 B1
(45) Date of Patent: Jun. 23, 2026

(54) DYNAMIC TASK ASSIGNMENT

(71) Applicant: Amazon Technologies, Inc., Seattle, WA (US)

(72) Inventors: Brendon Jude Wilson, San Jose, CA (US); Prashant Jayaram Thakare, Sammamish, WA (US); Cameron Stuart McLeod, Newton, MA (US); Ritu Jain, Newcastle, WA (US); Jun woo Park, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 343 days.

(21) Appl. No.: 18/345,473

(22) Filed: Jun. 30, 2023

(51) Int. Cl.
| | |
|---|---|
| *G10L 15/32* | (2013.01) |
| *G10L 15/02* | (2006.01) |
| *G10L 15/08* | (2006.01) |
| *G10L 15/22* | (2006.01) |

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | |
|---|---|---|
| 5,245,694 A | 9/1993 | Zwern |
| 6,577,179 B2 | 6/2003 | Falconer |
| 7,643,894 B2 | 1/2010 | Braithwaite et al. |
| 8,725,277 B2 | 5/2014 | Braithwaite et al. |
| 8,879,761 B2 | 11/2014 | Johnson et al. |
| 8,898,568 B2 | 11/2014 | Bull et al. |
| 9,087,520 B1 | 7/2015 | Salvador |
| 9,142,215 B2 | 9/2015 | Rosner et al. |
| 9,191,914 B2 | 11/2015 | Kennedy et al. |

(Continued)

OTHER PUBLICATIONS

International Search Report and Written Opinion issued by the International Searching Authority, mailed on Jul. 3, 2017 for International Patent Application No. PCT/US2017/017308 filed on Feb. 10, 2017.

(Continued)

*Primary Examiner* — Seong-Ah A Shin
(74) *Attorney, Agent, or Firm* — Pierce Atwood LLP

(57) ABSTRACT

A system configured with local distributed computing framework that enables available compute, storage, and/or sensor resources to be leveraged across a local network. The framework can create a logical grouping of devices associated with specific functionality and select a single device best suited to perform the functionality for the group. For example, a logical grouping can include devices having desired physical proximity and the framework can select an individual device for each task/function. Thus, the framework can select the device best suited for a task dynamically as the environment and/or context changes, such as when devices connect/disconnect or available processing shifts over time. In addition, the framework enables local resources to be coordinated and/or extended across the local network, as a first device can delegate processing to a second device, receive sensor data from the second device, perform unique functionality enabled by the second device, and/or the like.

20 Claims, 32 Drawing Sheets

(56)                 References Cited

U.S. PATENT DOCUMENTS

| | | | |
|---|---|---|---|
| 9,271,111 B2 | 2/2016 | Blanksteen | |
| 9,349,386 B2 | 5/2016 | Adams et al. | |
| 9,484,030 B1 | 11/2016 | Meaney et al. | |
| 9,584,935 B2 | 2/2017 | Starobin et al. | |
| 9,609,406 B2 | 3/2017 | Guo et al. | |
| 9,635,740 B2 | 4/2017 | Sun et al. | |
| 9,645,786 B2 | 5/2017 | Khaira et al. | |
| 9,704,486 B2 | 7/2017 | Basye et al. | |
| 9,774,385 B2 | 9/2017 | Foxworthy et al. | |
| 9,858,927 B2 | 1/2018 | Williams et al. | |
| 9,875,081 B2 | 1/2018 | Meyers et al. | |
| 9,972,320 B2 | 5/2018 | Melendo Casado et al. | |
| 10,009,687 B2 | 6/2018 | Lee et al. | |
| 10,055,190 B2 | 8/2018 | Gundeti et al. | |
| 10,181,323 B2 | 1/2019 | Beckhardt et al. | |
| 10,251,008 B2 | 4/2019 | Baker et al. | |
| 10,304,475 B1 | 5/2019 | Wang et al. | |
| 10,331,166 B2 | 6/2019 | Dahl et al. | |
| 10,382,509 B2 | 8/2019 | Williams et al. | |
| 10,425,780 B1 | 9/2019 | Devaraj et al. | |
| 10,425,781 B1 | 9/2019 | Devaraj et al. | |
| 10,616,726 B1 | 4/2020 | Freeman, II et al. | |
| 10,698,650 B2 * | 6/2020 | Bates | H04N 21/2143 |
| 10,783,883 B2 | 9/2020 | Mixter et al. | |
| 11,120,804 B2 | 9/2021 | Pascovici et al. | |
| 11,200,894 B2 * | 12/2021 | Smith | G06F 3/167 |
| 11,216,729 B2 | 1/2022 | Chien et al. | |
| 11,295,743 B1 | 4/2022 | Bumberger et al. | |
| 11,393,461 B2 | 7/2022 | Ganong et al. | |
| 11,405,740 B1 | 8/2022 | Berol | |
| 11,514,926 B2 | 11/2022 | Nandy et al. | |
| 11,516,340 B2 | 11/2022 | Iltus et al. | |
| 12,367,877 B2 * | 7/2025 | Taylor | G06F 3/165 |
| 2012/0096018 A1 | 4/2012 | Metcalf | |
| 2014/0163978 A1 * | 6/2014 | Basye | G10L 15/28 |
| | | | 704/233 |
| 2015/0162006 A1 | 6/2015 | Kummer | |
| 2015/0170665 A1 * | 6/2015 | Gundeti | G06F 3/167 |
| | | | 704/270.1 |
| 2016/0034249 A1 | 2/2016 | Lee et al. | |
| 2016/0379638 A1 | 12/2016 | Basye et al. | |
| 2021/0074285 A1 * | 3/2021 | Golikov | G01D 21/02 |
| 2021/0398550 A1 | 12/2021 | Nandy et al. | |
| 2022/0115016 A1 * | 4/2022 | Whalin | G10L 15/32 |
| 2022/0335941 A1 * | 10/2022 | Casado | G10L 15/02 |
| 2022/0392449 A1 * | 12/2022 | Carbune | G06F 16/3344 |
| 2025/0266043 A1 * | 8/2025 | Maizels | G10L 25/84 |

OTHER PUBLICATIONS

International Search Report and Written Opinion issued by the International Searching Authority, mailed on Oct. 12, 2021 for International Patent Application No. PCT/US2021/029590 filed on Apr. 28, 2021.

Invitation to Pay Additional Fees issued by the International Searching Authority, mailed on Aug. 18, 2021 for International Patent Application No. PCT/US2021/029590 filed on Apr. 28, 2021.

Definition from Techopedia—What is an Integrated Circuit (IC)? (Last updated: Feb. 13, 2014; retrieved from https://www.techopedia.com/definition/2366/integrated-circuit-ic) on May 21, 2022.

U.S. Non-Final Office Action issued on Jan. 21, 2022 in U.S. Appl. No. 17/091,118, filed Nov. 6, 2020.

* cited by examiner

FIG. 1A

Task: Wakeword Detection

| Device | Capabilities for Task | Frequency |
|--------|----------------------|-----------|
| A | Premium Microphone | Medium |
| B | Premium Microphone | High |
| C | N/A | None |
| D | Basic Microphone | Low |
| E | Basic Microphone | Low |

Selection: Device B

Wakeword Detection Criteria
130

Task: User Identification

| Device | Capabilities for Task | Frequency |
|--------|----------------------|-----------|
| A | Camera, CPU | High |
| B | N/A | None |
| C | N/A | None |
| D | Camera | Medium |
| E | N/A | None |

Selection: Device A

User Identification Criteria
140

Task: Local Speech Processing

| Device | Capabilities for Task | Frequency |
|--------|----------------------|-----------|
| A | On-device speech processing | High |
| B | N/A | None |
| C | N/A | None |
| D | N/A | None |
| E | N/A | None |

Selection: Device A

Speech Processing Criteria
150

Task: Notifications

| Device | Capabilities for Task | Frequency |
|--------|----------------------|-----------|
| A | Display, Premium Speakers | Medium |
| B | Premium Speakers | Low |
| C | Large Display, Speakers | High |
| D | Display, Basic Speakers | Medium |
| E | Basic Speakers | Low |

Selection: Device C

Notification Criteria
160

| Device | Mic. Array | Speakers | Display | Camera |
|--------|-----------|----------|---------|--------|
| A | Premium | Premium | Yes | Yes |
| B | Premium | Premium | No | No |
| C | None | Basic | Yes | No |
| D | Basic | Basic | Yes | Yes |
| E | Basic | Basic | No | No |

Device Hardware
170

FIG. 2

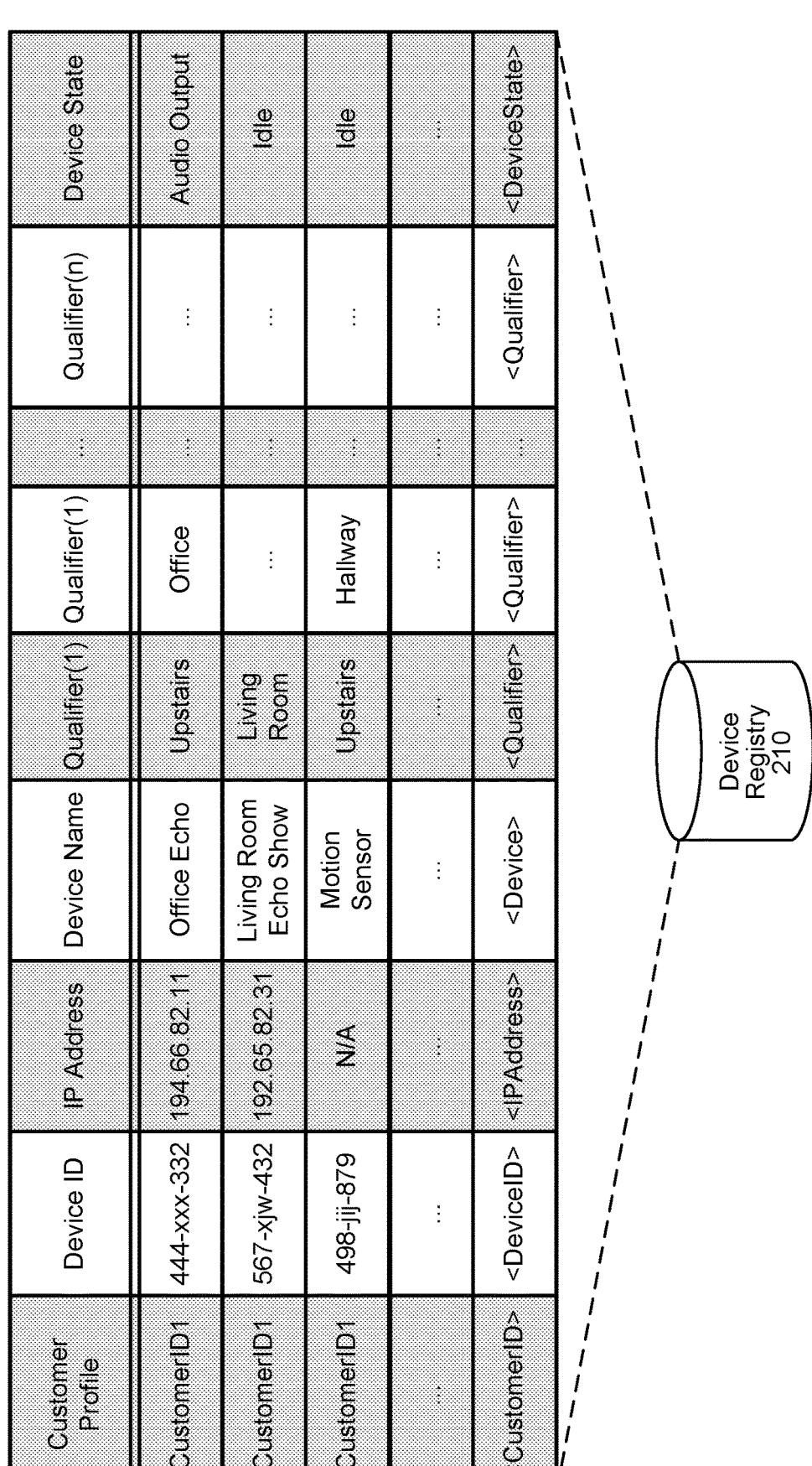

| Customer Profile | Device ID | IP Address | Device Name | Qualifier(1) | Qualifier(1) | ... | Qualifier(n) | Device State |
|---|---|---|---|---|---|---|---|---|
| CustomerID1 | 444-xxx-332 | 194.66.82.11 | Office Echo | Upstairs | Office | ... | ... | Audio Output |
| CustomerID1 | 567-xjw-432 | 192.65.82.31 | Living Room Echo Show | Living Room | ... | ... | ... | Idle |
| CustomerID1 | 498-jjj-879 | N/A | Motion Sensor | Upstairs | Hallway | ... | ... | Idle |
| ... | ... | ... | ... | ... | ... | ... | ... | ... |
| <CustomerID> | <DeviceID> | <IPAddress> | <Device> | <Qualifier> | <Qualifier> | ... | <Qualifier> | <DeviceState> |

Device Registry 210

FIG. 3A

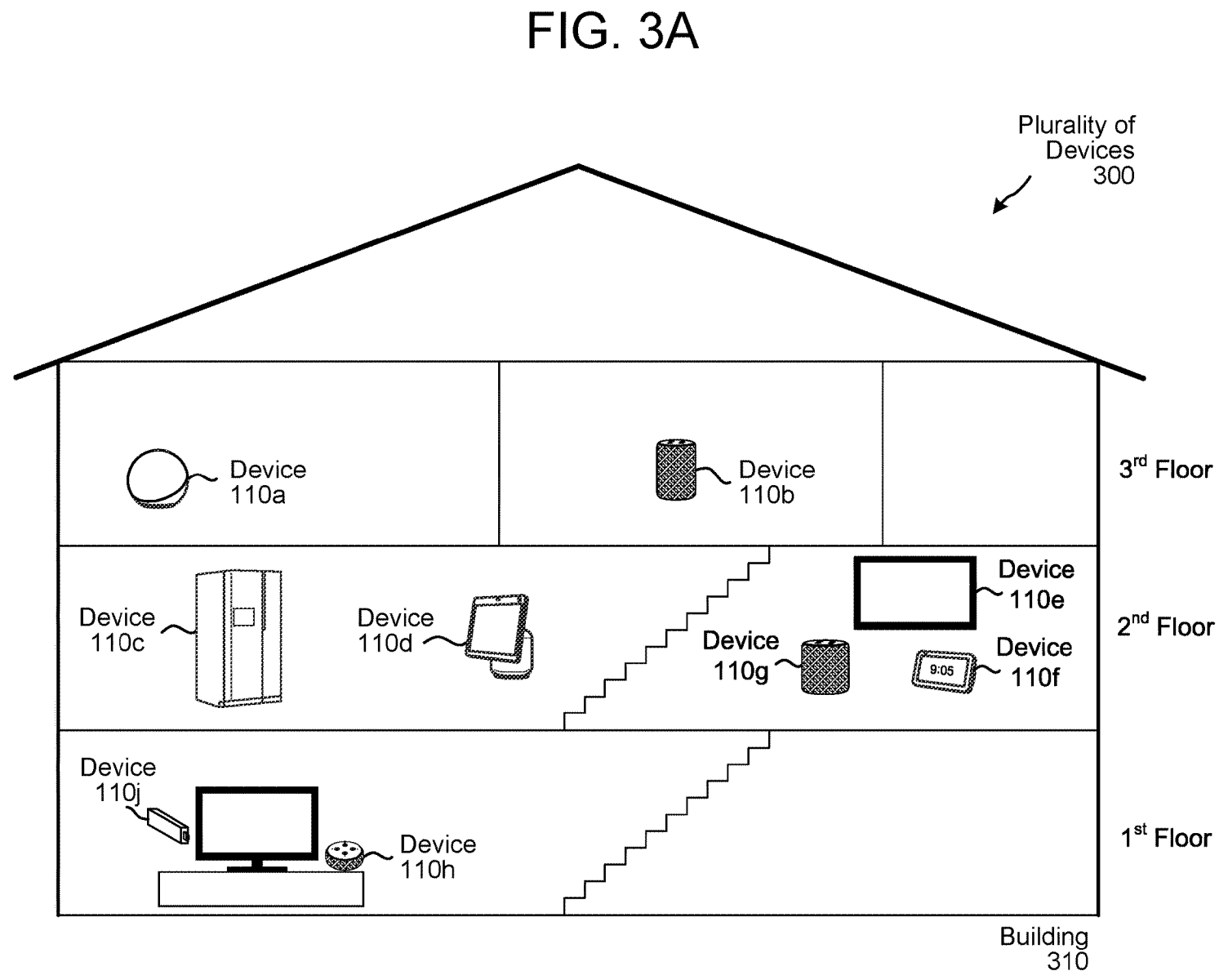

Plurality of Devices 300

3rd Floor

2nd Floor

1st Floor

Building 310

Device 110a

Device 110b

Device 110c

Device 110d

Device 110e

Device 110f

Device 110g

Device 110h

Device 110j

FIG. 3B

| Device | Mic. Array | Speakers | Display | Camera | Additional Sensors/Features |
|--------|-----------|----------|---------|--------|----------------------------|
| A | Basic | Basic | No | No | Motion, Temperature, Ambient Light |
| B | Premium | Premium | No | No | Motion, Temperature, Ambient Light, Smart Home Hub |
| C | Basic | Basic | Yes | No | N/A |
| D | Premium | Premium | Yes | Yes | Motion, Temperature, Ambient Light, Smart Home Hub, Computer Vision |
| E | None | Basic | Yes | No | N/A |
| F | Premium | Premium | Yes | Yes | Motion, Temperature, Ambient Light, Computer Vision |
| G | Premium | Premium | No | No | Motion, Temperature, Ambient Light |
| H | Basic | Basic | No | No | Motion, Temperature, Ambient Light |
| J | None | Passes | Passes | No | N/A |

Device Capability Data
320

Acoustic Region Grouping Example 400

| # | Devices | Active |
|---|---------|--------|
| 1 | C/D | D |
| 2 | K | K |
| 3 | E/F/G | F |

Room Grouping
520

FIG. 5B

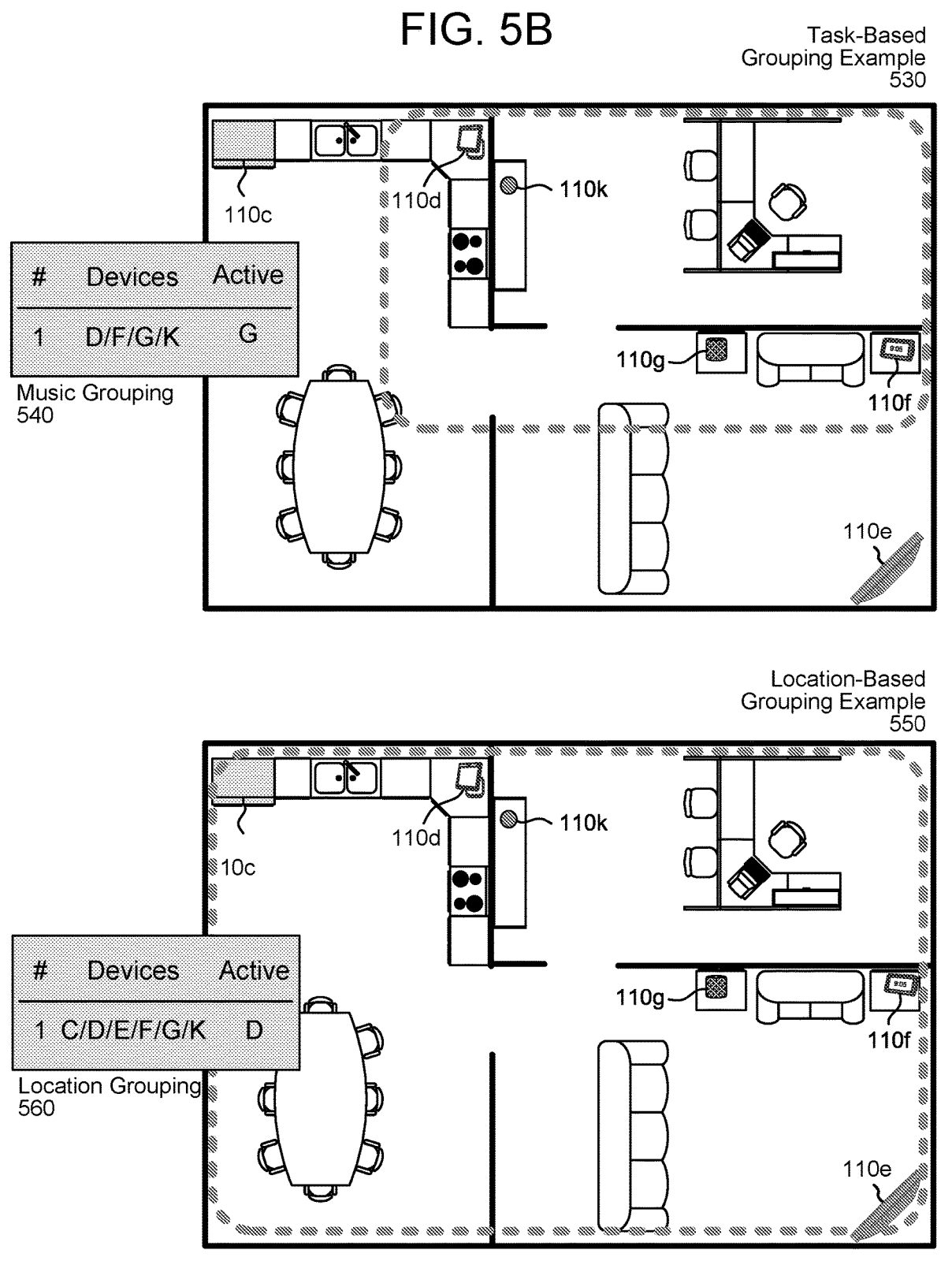

Task-Based
Grouping Example
530

| # | Devices | Active |
|---|---------|--------|
| 1 | D/F/G/K | G |

Music Grouping
540

110c

110d

110k

110g

110f

110e

Location-Based
Grouping Example
550

| # | Devices | Active |
|---|---------|--------|
| 1 | C/D/E/F/G/K | D |

Location Grouping
560

| # | Devices | Coordinator |
|---|---------|-------------|
| 1 | B/D/F/H | D |

Default Device Grouping
570

| # | Devices | Grouping Coordinator |
|---|---------|----------------------|
| 1 | C/D | D |
| 2 | K | K |
| 3 | E/F/G | F |

Room Grouping
580a

| # | Devices | Task Coordinator |
|---|---------|------------------|
| 1 | C/D | |
| 2 | K | D |
| 3 | E/F/G | |

Room Grouping
580b

| # | Devices | Coordinator |
|---|---------|-------------|
| 1 | B/D | |
| 2 | SH1/SH2/SH3 | D |

Smart Home Grouping
590

FIG. 6
Extending Functionality
610
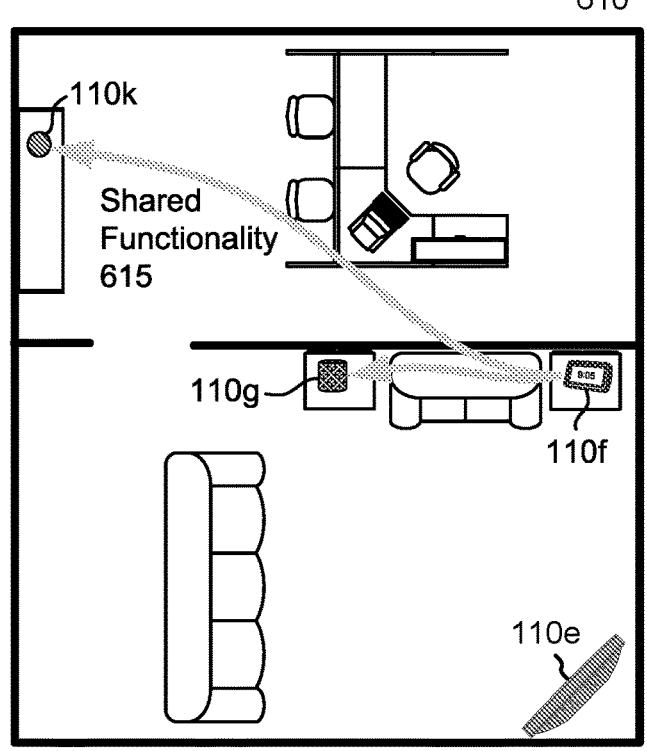
Extension
600
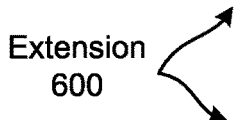
Delegating Processing
620
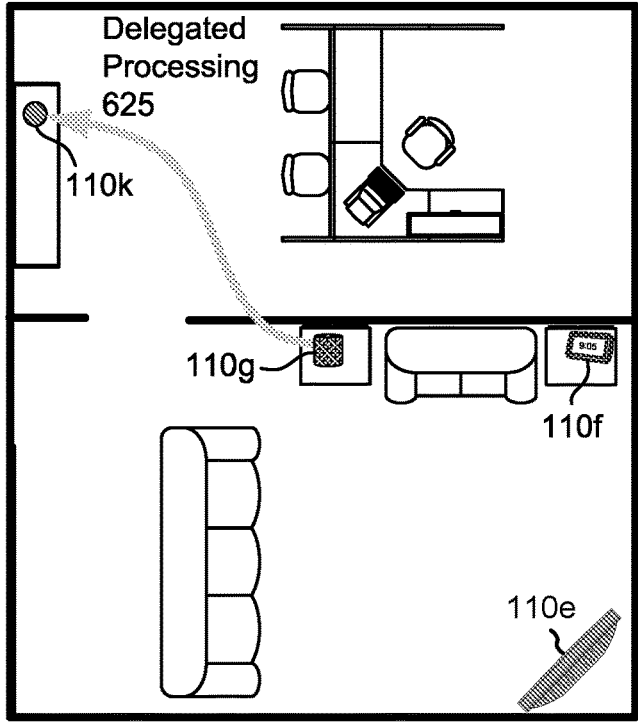

FIG. 7
Sensor Extension
710
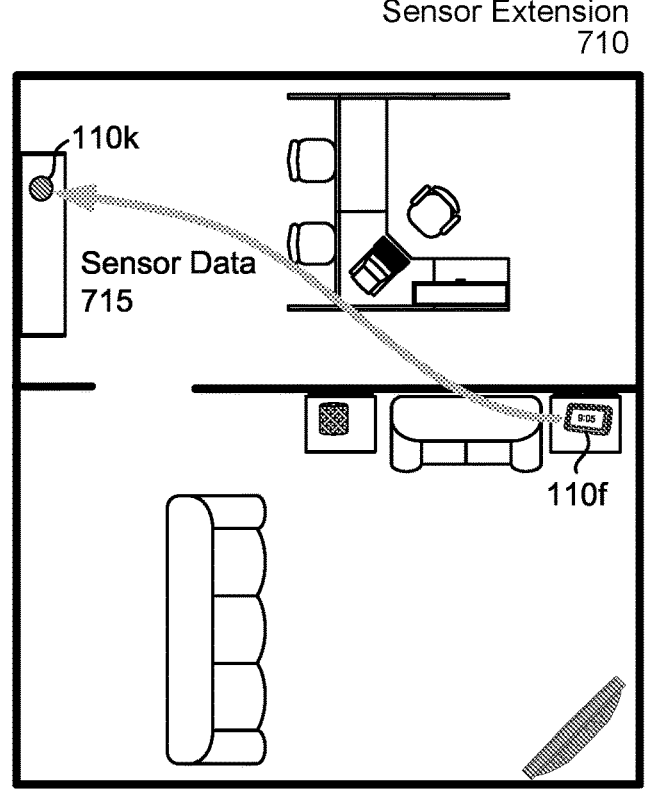
110k
Sensor Data
715
110f
Collaboration
700
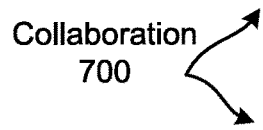
Sensor Aggregation
720
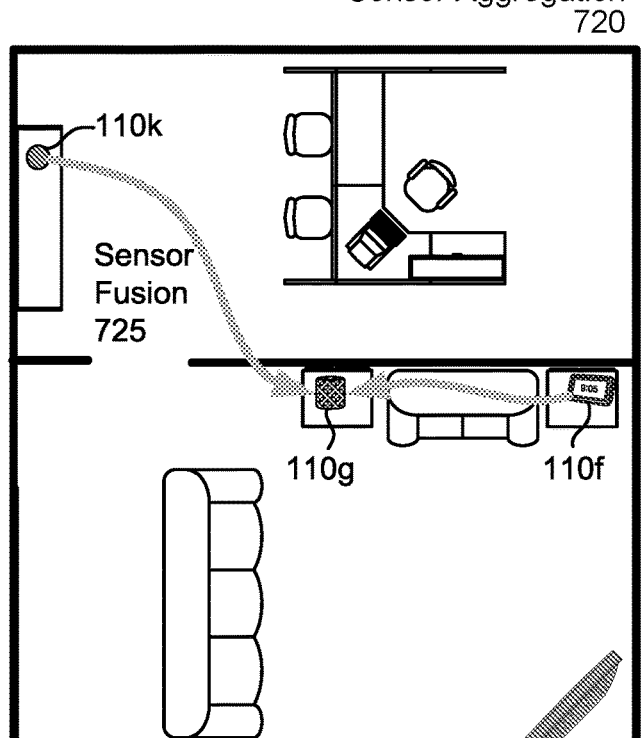
110k
Sensor
Fusion
725
110g          110f

Distributed Computing
Framework (DCF)
Architecture
1300

Figure 24:
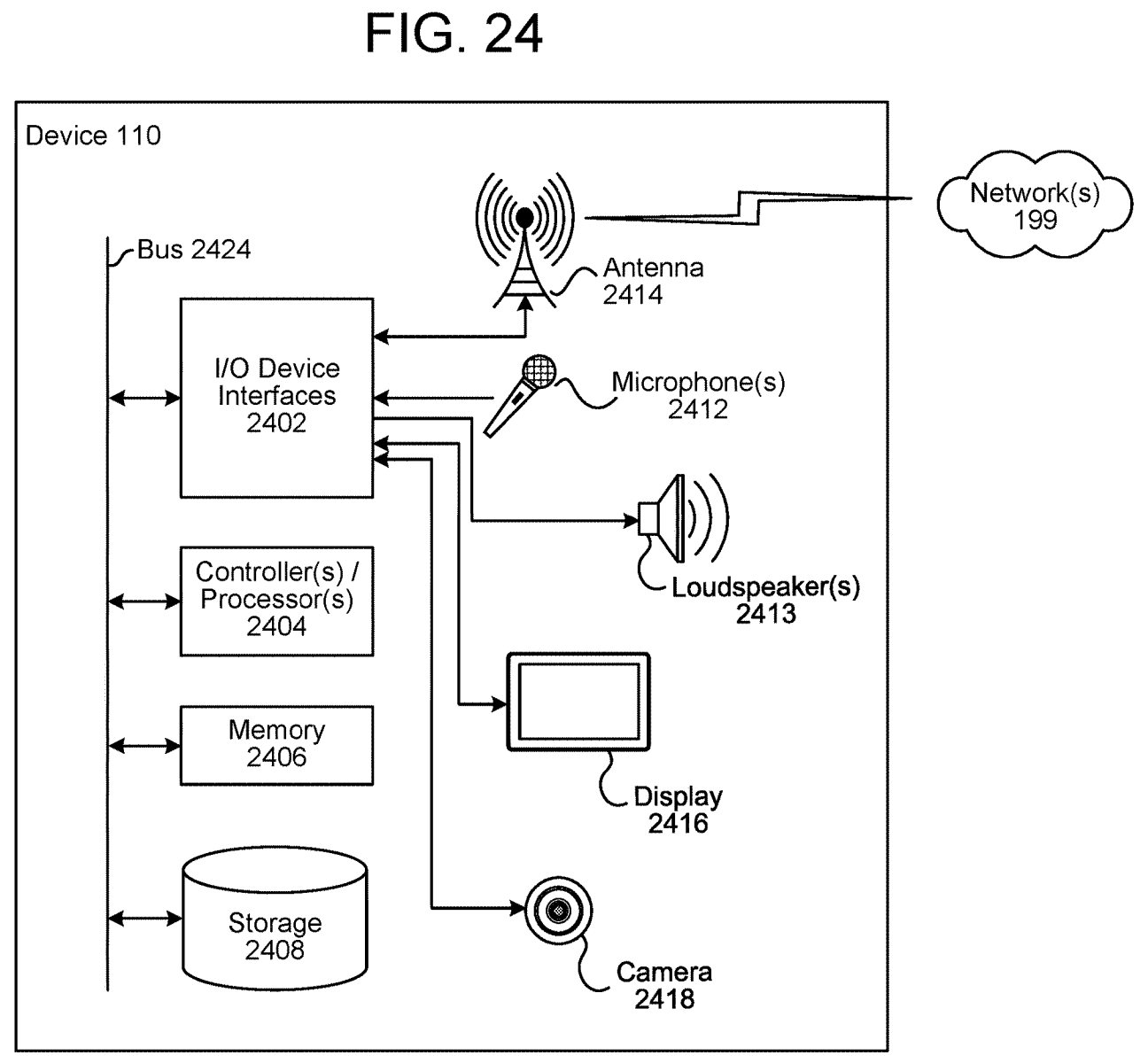

Network(s)
199

Device 110

Bus 2424

Antenna
2414

Microphone(s)
2412

Loudspeaker(s)
2413

Display
2416

Camera
2418

I/O Device
Interfaces
2402

Controller(s) /
Processor(s)
2404

Memory
2406

Storage
2408

Skill System Component(s) 125

Motile Device 110e

Smart TV 110d

I/O Limited Device 110c

Network(s) 199

System Component(s) 120

Device(s) with Display 110a

Device(s) 110b

DYNAMIC TASK ASSIGNMENT

BACKGROUND

With the advancement of technology, the use and popularity of electronic devices has increased considerably. Electronic devices are commonly used to generate and play media content.

BRIEF DESCRIPTION OF DRAWINGS

For a more complete understanding of the present disclosure, reference is now made to the following description taken in conjunction with the accompanying drawings.

FIG. 1A is a conceptual diagram illustrating a local distributed computing framework assigning functionality according to embodiments of the present disclosure.

FIG. 2 illustrates an example of information included in a device registry.

FIGS. 3A-3B illustrate an example of a building with multiple devices, along with device capabilities associated with the devices, according to embodiments of the present disclosure.

FIGS. 5A-5C illustrate examples of different types of logical groupings according to embodiments of the present disclosure.

FIG. 6 illustrates examples of performing distributed computing extension according to embodiments of the present disclosure.

FIG. 7 illustrates examples of performing distributed computing collaboration according to embodiments of the present disclosure.

FIG. 10B is a component diagram illustrating an example of data distribution and synchronization using a distributed computing framework according to embodiments of the present disclosure.

FIG. 13 is a component diagram illustrating an example of a distributed computing framework architecture according to embodiments of the present disclosure.

FIG. 16 is a conceptual diagram of an ASR component, according to embodiments of the present disclosure.

FIG. 24 is a block diagram conceptually illustrating example components of a device, according to embodiments of the present disclosure.

DETAILED DESCRIPTION

Figure 1B:
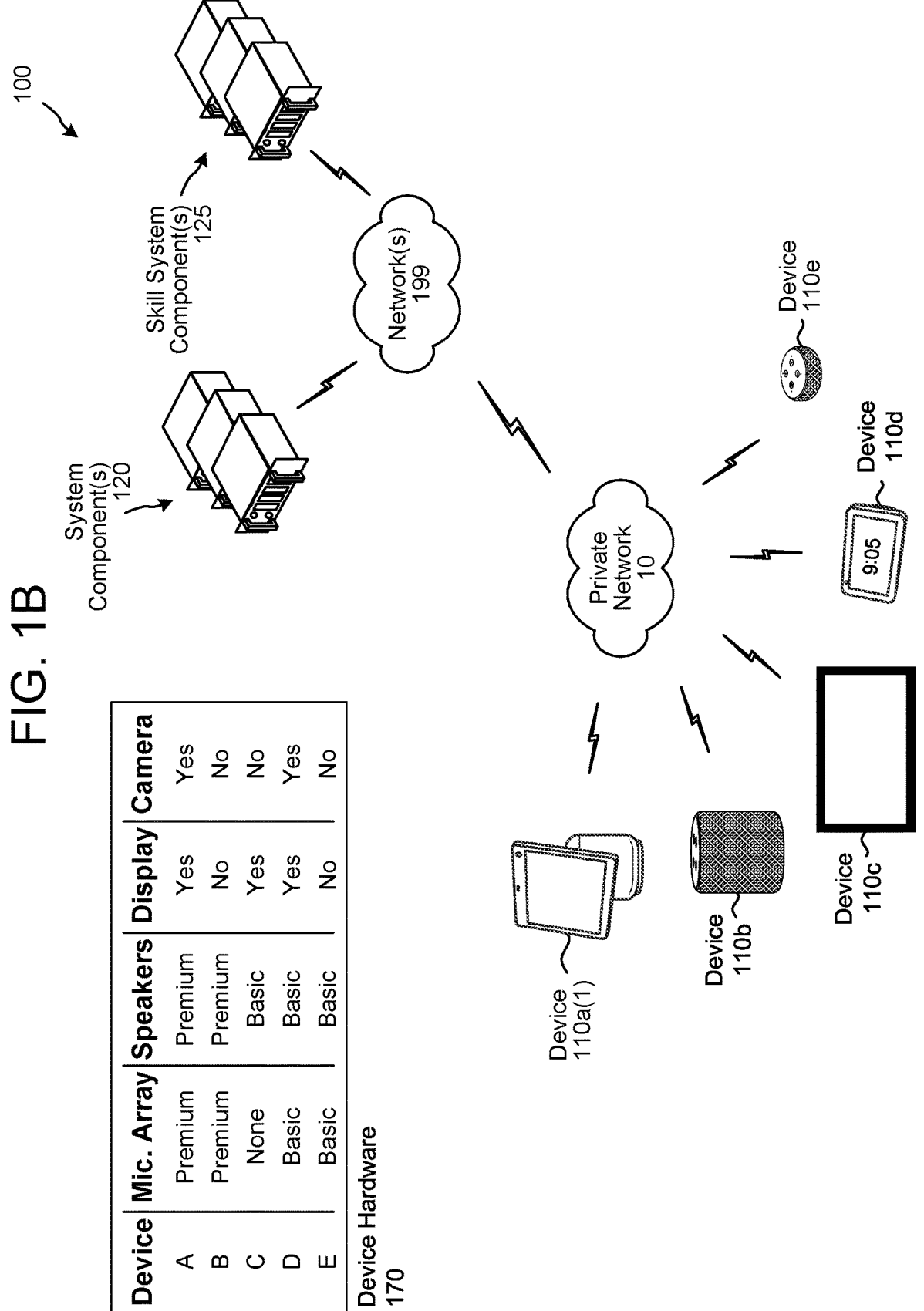
FIG. 1B is a conceptual diagram illustrating a system having a local distributed computing framework according to embodiments of the present disclosure.

Electronic devices may be used to perform a variety of tasks. Electronic devices may be used to output media content to a user. For example, a device may be configured to receive audio data and generate audio for output using one or more loudspeakers. Additionally or alternatively, the device may be configured to receive image data representing a video and output the video on a display of the device. Thus, the device may play media content (e.g., music, television show, movie, etc.) for the user using the loudspeakers and/or the display.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a language processing system to generate NLU output data. The combination of ASR and NLU is one example of how a system can perform spoken language understanding (SLU) processing to transform audio data into NLU output data. Some systems may perform SLU in an end-to-end component without separate or otherwise distinct ASR and NLU components. Text-to-speech (TTS) is a field of computer science concerning transforming textual and/or other data into audio data that is synthesized to resemble human speech. Natural language generation (NLG) is the use of artificial intelligence (AI) programming to produce written or spoken narratives from a data set.

A system may cause a skill to perform actions in response to natural language inputs (e.g., spoken inputs and/or typed inputs in a language spoken by humans). For example, for the natural language input "play Mozart music," a music skill may be invoked to output music created by an artist named Mozart. For further example, for the natural language input "turn on the lights," a smart home skill may be invoked to turn on "smart" lights associated with a user's profile. In another example, for the natural language input "what is the weather," a weather skill may be invoked to output weather information for a geographic location corresponding to the device that captured the natural language input. In the foregoing examples, actions correspond to the outputting of music, turning on "smart" lights, and outputting of weather information in a synthetic voice using TTS. As used herein, an "action" may refer to some result of a skill's processing. In a natural language processing (NLP) system such as Amazon's Alexa, some language processing is performed using a system component(s) having expandable language processing capability (e.g., capable of processing a large number of requests simultaneously), while other language processing may be performed by individual device(s) having limited processing capability (e.g., resource constrained devices capable of processing a small number of requests simultaneously). The system may also be capable of performing a variety of other tasks using some combination of device(s) that are proximate to a user and/or at a different location from the user. Such tasks may include, but are not limited to, wakeword/wake gesture detection, system directed detection, user recognition, presence detection, sentiment detection, notification routing/display, media recognition, etc.

This disclosure includes a system having a local distributed computing framework that enables available compute, storage, and/or sensor resources to be leveraged across a local network. The framework can create a logical grouping of devices associated with specific functionality and select a single device best suited to perform the functionality for the group. For example, a logical grouping can include devices having desired physical proximity (e.g., within the same room, on the same floor, in the same house, etc.) and the distributed computing framework can select an individual device for each task/function (e.g., wakeword detection, user identification, local speech processing, notifications, etc.). Thus, the distributed computing framework can select the device best suited for a task dynamically as the environment and/or context changes, such as when devices connect/ disconnect or available processing shifts over time. In addition, the distributed computing framework enables local resources to be coordinated and/or extended across the local network, as a first device can delegate processing to a second device, receive sensor data from the second device, perform unique functionality enabled by the second device, and/or the like. Devices may be grouped differently for purposes of determining which device is designated for a particular task, depending on the environment(s) of the respective device(s), the task/function to be performed, the context of the situation, and other factors.

FIGS. 1A and 1B are conceptual diagrams illustrating a local distributed computing framework assigning functionality according to embodiments of the present disclosure. As will be described in greater below, the system 100 may be configured to enable a distributed computing framework comprising a plurality of devices 110. For example, the distributed computing framework may be configured to manage distributed resources associated with the plurality of devices 110 in order to extend functionality or local resources, collaborate between devices 110 and/or sensors, and coordinate processing, storage, and/or the like to improve efficiency. As part of coordinating the plurality of devices 110, the system 100 may group a subset of the devices 110 together, determine task-based capabilities for each device 110 included in the subset of devices 110, and assign functionality for each task based on the corresponding capabilities.

FIG. 1A illustrates examples of assigning functionality within the subset of devices 110. As illustrated in FIG. 1A, the system 100 may determine wakeword detection criteria 130 associated with a first task (e.g., wakeword detection) for each of the five devices 110a-110e included in the subset. For example, the system 100 may determine first capabilities associated with the first device 110a(1) (e.g., "Premium Microphone") and a first frequency that the first device 110a(1) is selected for performing wakeword detection (e.g., "Medium"), second capabilities associated with the second device 110b (e.g., "Premium Microphone") and a second frequency that the second device 110b is selected for performing wakeword detection (e.g., "High"), third capabilities associated with the third device 110c (e.g., "N/A") and a third frequency that the third device 110c is selected for performing wakeword detection (e.g., "None"), fourth capabilities associated with the fourth device 110d (e.g., "Basic Microphone") and a fourth frequency that the fourth device 110d is selected for performing wakeword detection (e.g., "Low"), and fifth capabilities associated with the fifth device 110e (e.g., "Basic Microphone") and a fifth frequency that the fifth device 110e is selected for performing wakeword detection (e.g., "Low").

Based on the capabilities and frequency of being selected for each device 110, the system 100 may select a single device out of the subset of devices to perform wakeword detection. For example, the wakeword detection criteria 130 indicate that the second device 110b (e.g., "Device B") was selected to perform wakeword detection. Thus, the system 100 directs the second device 110b to perform wakeword detection and directs the remaining devices 110a(1)/110c/ 110d/110e to disable wakeword detection.

While the example described above refers to the frequency that each device 110 is selected for performing wakeword detection, the disclosure is not limited thereto. Instead, in some examples the frequency may refer to how often the device 110 itself needs the results from performing wakeword detection without departing from the disclosure. For example, the first frequency may indicate how often the first device 110a(1) requests wakeword data generated by performing wakeword detection, the second frequency may indicate how often the second device 110b requests the wakeword data, and so on.

As illustrated in FIG. 1A, the system 100 may determine user identification criteria 140 associated with a second task (e.g., user identification) for each of the five devices 110a-110e included in the subset. For example, the system 100 may determine first capabilities associated with the first device 110a(1) (e.g., "camera, CPU") and a first frequency that the first device 110a(1) is selected for performing user identification (e.g., "High"), second capabilities associated with the second device 110b (e.g., "N/A") and a second frequency that the second device 110b is selected for performing user identification (e.g., "None"), third capabilities associated with the third device 110c (e.g., "N/A") and a third frequency that the third device 110c is selected for performing user identification (e.g., "None"), fourth capabilities associated with the fourth device 110d (e.g., "Camera") and a fourth frequency that the fourth device 110d is selected for performing user identification (e.g., "Medium"), and fifth capabilities associated with the fifth device 110e (e.g., "N/A") and a fifth frequency that the fifth device 110e is selected for performing wakeword detection (e.g., "None").

Based on the capabilities and frequency of being selected for each device 110, the system 100 may select a single device out of the subset of devices to perform user identification. For example, the user identification criteria 140 indicate that the first device 110a(1) (e.g., "Device A") was selected to perform user identification. Thus, the system 100 directs the first device 110a(1) to perform user identification and directs the remaining devices 110b/110c/110d/110e to disable user identification.

While the example described above refers to the frequency that each device 110 is selected for performing user identification, the disclosure is not limited thereto. Instead, in some examples the frequency may refer to how often the device 110 itself needs the results from performing user identification without departing from the disclosure. For example, the first frequency may indicate how often the first device 110a(1) requests identification data generated by performing user identification, the second frequency may indicate how often the second device 110b requests the identification data, and so on.

As illustrated in FIG. 1A, the system 100 may determine speech processing criteria 150 associated with a third task (e.g., local speech processing) for each of the five devices 110a-110e included in the subset. For example, the system 100 may determine first capabilities associated with the first device 110a(1) (e.g., "on-device speech processing") and a first frequency that the first device 110a(1) is selected for performing speech processing (e.g., "High"). In this example, the remaining devices 110b-110e are not capable of performing local speech processing and have never been selected to perform this task (e.g., "None"). Based on the capabilities and frequency of being selected for each device 110, the system 100 may select the first device (e.g., "Device A") to perform local speech processing and may direct the first device 110a(1) to perform local speech processing. In some examples, the system 100 may direct the remaining devices 110b/110c/110d/110e to disable local speech processing. However, the disclosure is not limited thereto, and in other examples the system 100 may do nothing regarding the remaining devices without departing from the disclosure.

As illustrated in FIG. 1A, the system 100 may determine notification criteria 160 associated with a fourth task (e.g., notifications) for each of the five devices 110a-110e included in the subset. For example, the system 100 may determine first capabilities associated with the first device 110a(1) (e.g., "Display, Premium Speakers") and a first frequency that the first device 110a(1) is selected for generating notifications (e.g., "Medium"), second capabilities associated with the second device 110b (e.g., "Premium Speakers") and a second frequency that the second device 110b is selected for generating notifications (e.g., "Low"), third capabilities associated with the third device 110c (e.g., "Large Display, Premium Speakers") and a third frequency that the third device 110c is selected for generating notifications (e.g., "High"), fourth capabilities associated with the fourth device 110d (e.g., "Display, Basic Speakers") and a fourth frequency that the fourth device 110d is selected for generating notifications (e.g., "Medium"), and fifth capabilities associated with the fifth device 110e (e.g., "Basic Speakers") and a fifth frequency that the fifth device 110e is selected for generating notifications (e.g., "Low").

Based on the capabilities and frequency of being selected for each device 110, the system 100 may select a single device out of the subset of devices to generate notifications. For example, the notification criteria 160 indicate that the third device 110c (e.g., "Device C") was selected to generate notifications. Thus, the system 100 directs the third device 110c to generate notifications while directing the remaining devices 110a(1)/110b/110d/110e to disable notifications.

While the example described above refers to the frequency that each device 110 is selected for generating notifications, the disclosure is not limited thereto. Instead, in some examples the frequency may refer to how often the device 110 itself receives user input following the notifications without departing from the disclosure. For example, the first frequency may indicate how often the first device 110a(1) receives user input following the notifications, the second frequency may indicate how often the second device 110b receives user input following the notifications, and so on. In this example, user input following the notifications may indicate which of the devices 110 is closest to the user and/or a preferred device with which the user interacts, although the disclosure is not limited thereto.

As illustrated in FIG. 1A, the system 100 may assign functionality such as wakeword detection, user identification, local speech processing, and notifications. However, the disclosure is not limited thereto, and in other examples the system 100 may assign functionality such as capturing audio input, generating audio output, generating image output, acoustic event detection (e.g., detecting a particular event represented in audio data), media content recognition (e.g., watermark generation, watermark detection, etc.), notification routing (e.g., which device 110 to use to display a notification), new device provisioning (e.g., automatically detecting a new device and providing network information to enable the device to connect to the private network 10), smart home control (e.g., sending commands to smart home devices), augmented arbitration (e.g., performing arbitration using additional context data to improve an accuracy of the decision), and/or the like without departing from the disclosure. In some examples, the system 100 may divide a plurality of devices 110 into subsets based on proximity (e.g., acoustic region, distance, location, etc.) and then generate logical groupings for a number of different types of functionality within each subset.

While FIG. 1A illustrates several examples of tasks and/or functionality, the disclosure is not limited thereto. Instead, the system 100 may assign any number of different tasks without departing from the disclosure. Additionally or alternatively, while the examples illustrated in FIG. 1A include the same subset of devices 110, the disclosure is not limited thereto and the number of devices 110 may vary without departing from the disclosure. For example, the number of devices included in the subset may vary, a number of devices included in each grouping may vary based on task, the system 100 may assign functionality separately for two or more subsets of devices 110, and/or the like without departing from the disclosure.

As described above, the distributed computing framework may extend functionality or local resources between devices 110. For example, the distributed computing framework may enable a host device to deliver functionality on behalf of a client device in the local network, such that the client device may gain additional functionality that it wouldn't otherwise have due to a lack of resources. Additionally or alternatively, a client device may delegate non-urgent processing to another device to preserve local resources. Optimizing the utilization of on-device computing resources (e.g., processing resources, etc.) of the device 110 can a reduce latency so that the user experience with the device 110 is not negatively impacted by local processing tasks taking too long.

Further, the distributed computing framework may enable collaboration between devices 110 and/or sensors. For example, devices on the local network may exchange and combine data to extract more accurate context about the user and/or the environment. Combining data from multiple devices and/or sensors enables net-new user experiences and/or expands the coverage of existing experiences throughout the distributed computing framework. Finally, the distributed computing framework enables processing, storage, and/or the like to be coordinated to improve efficiency and reduce redundancy. For example, the distributed computing framework may enable devices 110 to coordinate activities to deliver a unified user experience that spans multiple devices 110 and/or output modalities. While each device 110 remains responsible for its own resources and processing, the device 110 executes its actions in concert with other devices 110 in the distributed computing framework to deliver one portion of an overall user experience.

As illustrated in FIG. 1B, the system 100 may include one or more devices 110 connected to a private network 10 (e.g., local area network (LAN) or the like, although the disclosure is not limited thereto). For example, the five devices 110a-110e may be connected to the private network 10 within the user's house without departing from the disclosure. Additionally or alternatively, the five devices 110a-110e may form the private network 10 by communicating with each other according to a LAN protocol without departing from the disclosure. However, the disclosure is not limited thereto and one or more of the devices 110a-110e may not be associated with the private network 10 without departing from the disclosure. Instead, the distributed computing framework may be used to coordinate devices 110 associated with a user profile, even if some of the devices 110 are not connected to the private network 10. In addition, the device(s) 110 may optionally communicate with one or more system component(s) 120 and/or skill system component(s) 125 via one or more network(s) 199. Thus, communication between various components of the system 100 may occur directly, across the private network 10, and/or across one or more network(s) 199 without departing from the disclosure.

The system component(s) 120 may be remote system component(s) such as a group of computing components located geographically remote from device 110 but accessible via the network(s) 199 (e.g., servers accessible via the internet). The disclosure is not limited thereto, however, and the system component(s) 120 may also include remote system component(s) that are physically separate from device 110 but located geographically close to device 110 and accessible via the network 199 and/or the private network 10 (for example a home server located in a same residence as device 110). System component(s) 120 may also include some combination thereof, for example where certain components/operations are performed via a home server(s) and others are performed via geographically remote server(s)/computing component(s).

The device 110 may be an electronic device configured to capture and/or receive audio data. For example, the device 110 may include a microphone array configured to generate audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive playback audio data and generate playback audio (e.g., output audio) using one or more loudspeakers of the device 110. For example, the device 110 may generate playback audio corresponding to media content, such as music, a movie, and/or the like. In some examples, as part of outputting media content the device 110 may generate playback audio for a user and/or play a video on a display of the device 110, although the disclosure is not limited thereto.

In some examples, the devices 110a-110e may capture a voice command generated by a user. For example, the first device 110a(1) may receive first audio corresponding to a spoken natural language input originating from the user and may generate first audio data corresponding to the first audio. The first device 110a(1) and/or the system component(s) 120 may be configured to perform natural language processing, enabling the system 100 to interpret the voice command using the first device 110a(1), the system component(s) 120, or a combination thereof. As used herein, the system component(s) 120 may have expandable language processing capability (e.g., capable of processing a large number of requests simultaneously), while the first device 110a(1) may have limited processing capability (e.g., a resource constrained device capable of processing a small number of requests simultaneously).

As illustrated in FIG. 1B, the devices 110 may be connected to a private network 10 associated with an environment of the devices 110 (e.g., home, business, etc.). For example, the devices 110 may connect to each other according to a local area network (LAN) protocol, although the disclosure is not limited thereto. Thus, the devices 110 may communicate with each other using the private network 10, even if the private network 10 is not connected to remote networks (e.g., the internet) via network(s) 199. Thus, in some examples the devices 110b-110e may send the input audio data to the first device 110a(1) via the private network 10 for language processing without departing from the disclosure. However, the disclosure is not limited thereto, in other examples the devices 110b-110e may send the input audio data to the system component(s) 120 for language processing without departing from the disclosure. Additionally or alternatively, the first device 110a(1) may send input audio data to the system component(s) 120 for language processing without departing from the disclosure.

In some examples, the first device 110a(1) may send the input audio data to the system component(s) 120 for language processing. For example, the first device 110a(1) may send the input audio data to the system component(s) 120 via an application that is installed on the first device 110a(1) and associated with the system component(s) 120. An example of such an application is the Amazon Alexa application that may be installed on a smart phone, tablet, or the like. In other examples, the first device 110a(1) may be configured to perform on-device language processing. For example, the first device 110a(1) may include language processing components that are configured to interpret a voice command to determine an action responsive to the voice command. Thus, the first device 110a(1) may perform language processing on the audio data generated by the first device 110a(1) to determine a first voice command without departing from the disclosure.

Additionally or alternatively, the first device 110a(1) may extend this functionality to the devices 110b-110e and other devices 110 associated with the private network 10. For example, the first device 110*a*(1) may perform language processing on audio data received from the devices 110*b*-110*e* to determine a second voice command without departing from the disclosure. Thus, the first device 110*a*(1) may receive audio data from one or more devices 110, may determine an action responsive to the audio data, and may cause the action to be performed.

As used herein, on-device language processing and/or local speech processing may refer to the first device 110*a*(1) performing language processing for itself and other devices 110 associated with the private network 10. However, the disclosure is not limited thereto and the system component(s) 120 may perform language processing without departing from the disclosure. As described above, the system component(s) 120 may have expandable language processing capability (e.g., capable of processing a large number of requests simultaneously), while the first device 110*a*(1) may have limited processing capability (e.g., a resource constrained device capable of processing a small number of requests simultaneously). Thus, the disclosure may refer to the first device 110*a*(1) performing local speech processing on input audio data received from another device even when the first device 110*a*(1) is physically distant (e.g., remote) from the device 110.

The system 100 may identify an utterance, including defining a beginning of the utterance (e.g., beginpoint) and an end of the utterance (e.g., endpoint), using techniques known to one of skill in the art. As used herein, a number of utterances that the first device 110*a*(1) is configured to process (e.g., capable of processing) simultaneously indicates a number of discrete audio streams representing speech on which the first device 110*a*(1) may perform language processing at the same time. While multiple devices 110 may capture a single utterance and generate multiple audio streams, the first device 110*a*(1) and/or the system 100 may perform arbitration to select a single audio stream on which to perform language processing. Thus, the multiple audio streams correspond to only a single utterance in terms of the number of utterances on which the first device 110*a*(1) is configured to process at a single time. Similarly, if a wakeword is falsely detected and a device 110 generates an audio stream that does not represent speech, this does not count as an utterance in terms of the number of utterances on which the first device 110*a*(1) is configured to process at a single time.

A system such as the system 100 may be configured to incorporate user permissions and may only perform activities disclosed herein if approved by a user. Accordingly, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

In some examples, the system 100 may store information about the device and/or the device state in a device registry. For example, the device registry may be configured to store the state data as well as identifying information associated with each of the devices 110, although the disclosure is not limited thereto.

As described above, the system 100 may generate logical groupings and/or assign functionality for a variety of tasks. Examples of functionality may include capturing audio input (e.g., generating audio data using microphone(s) associated with the device 110), acoustic event detection (e.g., detecting a particular event represented in the audio data), wakeword detection (e.g., detecting a wakeword represented in the audio data), user identification (e.g., identifying and/or verifying an identity of a user using one or more inputs), augmented arbitration (e.g., performing arbitration using additional context data to improve an accuracy of the decision), local speech processing (e.g., performing language processing on a local device 110), generating audio output (e.g., generating output audio using loudspeaker(s) associated with the device 110), generating image output (e.g., displaying an image on a display of the device 110), generating notifications (e.g., outputting a notification by generating audio output and/or image output), notification routing (e.g., selecting on which device 110 to display a notification), media content recognition (e.g., watermark generation, watermark detection, etc.), new device provisioning (e.g., automatically detecting a new device and providing network information to enable the device to connect to the private network 10), smart home control (e.g., sending commands to smart home devices), and/or the like without departing from the disclosure.

As described in greater detail above, the device 110 may capture audio input by generating audio data using one or more microphone(s) associated with the device 110. For example, capturing an audio signal and/or generating audio data includes a microphone transducing audio waves (e.g., sound waves) of captured sound to an electrical signal and a codec digitizing the signal to generate the microphone audio data. Using the microphone audio data, the device 110 may perform acoustic event detection to detect a particular event represented in the audio data. For example, the device 110 may include one or more event detectors configured to monitor the microphone audio data and detect specific acoustic events, such as speech, pet sounds (e.g., dogs barking), glass breaking, mechanical noises, and/or the like. Performing acoustic event detection may also include wakeword detection, which occurs when the device 110 detects a specific wakeword represented in the microphone audio data, as will be described in greater detail below with regard to FIG. 14.

The device 110 may perform user identification in order to identify and/or verify an identity of a user. In some examples, the device 110 may be configured to perform user identification using the microphone audio data. For example, the device 110 may perform user recognition by comparing speech characteristics represented in the microphone audio data to stored speech characteristics of the users. However, the disclosure is not limited thereto, and in other examples the device 110 may perform user identification using the microphone audio data, vision data, biometric data, and/or other input data without departing from the disclosure. Examples of performing user recognition and/or user identification are described in greater detail below with regard to FIGS. 20-22.

After at least two devices 110 perform wakeword detection, the system 100 may perform augmented arbitration to select between the two or more devices 110 that detected the wakeword. For example, the system 100 may perform augmented arbitration using additional context data (e.g., additional sensor data) to improve an accuracy of the decision without sending the additional context data to the system component(s) 120, as described in greater detail below with regard to FIG. 9. Based on the results of arbitration, the system 100 may select one of the devices 110 to capture the audio input (e.g., generate the microphone audio data) and one of the devices 110 may perform local speech processing to determine a voice command represented in the microphone audio data, as described in greater detail below with regard to FIGS. 15A-15B.

In some examples, the system 100 may select an individual device to perform specific functionality based on context data unrelated to the specific functionality. For example, the system 100 may use the results of the augmented arbitration to determine which device 110 should be selected to perform wakeword detection, regardless of microphone capabilities. However, the disclosure is not limited thereto, and in other examples the system 100 may select the individual device to perform specific functionality based on hardware capability without departing from the disclosure. For example, the system 100 may determine a first indicator of performance indicating a first quality at which a first device 110a performs user identification (e.g., based on a first resolution of a first camera associated with the first device 110a), may determine a second indicator of performance indicating a second quality at which a second device 110b performs the user identification (e.g., based on a second resolution of a second camera associated with the second device 110b), and may select between the first device 110a and the second device 110b based on the first indicator and the second indicator. Thus, the system 100 may select the device 110 having the higher resolution camera, although the disclosure is not limited thereto.

As described above, the device 110 may generate audio output by generating output audio using one or more loudspeaker(s) associated with the device 110 and/or may generate image output by displaying an image on a display associated with the device 110. In some examples, the devices 110 may (i) only generate audio output, (ii) only generate image output, or (iii) generate audio output while generating image output without departing from the disclosure. Thus, the system 100 may perform notification routing to select with which device 110 to generate the audio output, the image output, and/or a combination of the audio output and the image output. The selected device(s) 110 may generate and/or deliver notifications by generating the audio output and/or the image output as directed.

As part of generating, routing, and/or delivering the notifications, the system 100 may determine a relevancy and/or priority associated with the notification and route the notification accordingly. For example, some notifications may be considered high priority and/or relevance, and the system 100 may route the notifications to multiple logical groupings to ensure that the notification is delivered to the user. However, other notifications may be considered low priority and/or relevance, and the system 100 may route the notifications to a single logical grouping and/or nearby device(s) 110. To illustrate an example, a first notification indicating a severe weather update may be associated with a high priority and routed to multiple logical groupings, whereas a second notification indicating that a vacuum is clogged and needs attention may be associated with a low priority and routed to a limited number of destinations (e.g., nearby devices 110 located in the same room as the vacuum, based on a current location of the vacuum).

As mentioned above, the device 110 may perform media content recognition, which may comprise performing watermark generation, watermark detection, watermark matching, and/or the like without departing from the disclosure. In some examples, the device 110 may perform watermark generation to embed an audio watermark in playback audio data prior to generating playback audio using the playback audio data, enabling other devices 110 to detect the audio watermark and perform an action (e.g., ignore a wakeword, perform a command, etc.). The disclosure is not limited thereto, however, and in other examples the device 110 may perform watermark generation to embed an image watermark in image data and/or video data without departing from the disclosure. Additionally or alternatively, in some examples the device 110 may perform watermark detection and/or watermark matching to detect an audio watermark in the microphone audio data and/or in playback audio data and may perform an action corresponding to the detected watermark. However, the disclosure is not limited thereto, and in other examples the device 110 may perform watermark detection and/or watermark matching to detect an image watermark in the image data prior to displaying an image on the display, and may perform an action corresponding to the detected watermark.

Finally, the device 110 may perform new device provisioning and/or smart home control, as described in greater detail below with regard to FIG. 7. To illustrate an example of performing new device provisioning, the device 110 may automatically detect a new device and may provide network information to enable the new device to directly connect to the private network 10. For example, the network information may include a network identification (e.g., SSID) and/or password, such that the new device may connect to the private network 10 via a wireless router, access point, and/or the like. To illustrate an example of smart home control, the system 100 may enable each of the devices 110 to send commands to and/or otherwise control smart home devices via smart home hubs connected to the private network 10, as described in greater detail below with regard to both FIG. 7 and FIG. 23.

As described above, in some examples the system 100 may include one or more devices 110 connected to a private network 10, such as a LAN, wireless LAN (WLAN), and/or the like. For example, a plurality of devices 110 may be connected to the private network 10 at a first location, such that the plurality of devices 110 are in geographic proximity to each other and communicate with each other according to a LAN protocol (e.g., inside the user's house, a business, and/or the like). In some examples, the private network 10 may include one or more access points (e.g., wireless router) and/or wired connections and each of the plurality of devices 110 may be connected to the private network 10 via the access point(s) and/or the wired connections. However, the disclosure is not limited thereto and in other examples, the plurality of devices 110 may be in geographic proximity even if the plurality of devices 110 are not connected to the same private network 10. For example, the system 100 may monitor a location associated with each of the plurality of devices 110 and determine that they are in geographic proximity regardless of how an individual device 110 connects to the network(s) 199.

In some examples, the distributed computing framework may be used to coordinate devices 110 associated with a user profile, even if some of the devices 110 are not directly connected to the private network 10. For example, the distributed computing framework may associate devices 110 that are in geographic proximity whether the devices 110 are connected to the private network 10 via the access point(s) and/or the wired connection(s) or are connected to the network(s) 199 via other access point devices (e.g., satellite access points, range extenders, and/or the like), mesh network(s), cellular towers, and/or the like. Additionally or alternatively, the devices 110 may be connected to different LANs that are in physical proximity without departing from the disclosure. For example, some smart devices may connect to a smart home hub via a wireless communication protocol (e.g., Wifi, Bluetooth, Zigbee, and/or the like), such that the smart devices are in proximity to the devices 110 despite being on a different LAN than the private network 10.

In some examples, the system 100 may determine that some of the devices 110 are in geographic proximity using global positioning system (GPS) technology, other locationing techniques, wireless communication protocols, short-distance wireless technology, and/or the like. For example, the system 100 may determine that multiple devices 110 receive a broadcast (e.g., device broadcast, beacon, probe request, connection request, etc.) from a single access point and/or device 110 and may associate the multiple devices 110 with a particular location and/or geographic proximity, although the disclosure is not limited thereto.

FIG. 2 illustrates an example of information included in a device registry. As illustrated in FIG. 2, the device registry 210 may include an entry for each of the devices 110 associated with an account. In the example illustrated in FIG. 2, each entry may indicate a customer profile (e.g., customer identification), which may correspond to a user profile (e.g., individual user) or the overall account, device identification (ID) (e.g., unique device identifier), an Internet Protocol (IP) address associated with the device, a device name, one or more qualifiers (e.g., indicating a location or other attributes of the device), a device state (e.g., outputting audio, idle, etc.), and/or the like. However, the disclosure is not limited thereto and the device registry 210 may include any information known to one of skill in the art without departing from the disclosure.

In some examples, the device registry 210 may include a variety of information related to individual devices, user profiles, households, accounts, etc. that interact with the system 100. For example, the device registry 210 may include data regarding devices 110 associated with particular individual user accounts (e.g., user profiles), as described above and illustrated in FIG. 2. While not illustrated in FIG. 2, in some examples the device registry 210 may store additional information associated with each device 110, such as names by which the device 110 may be referred to by a user. Further qualifiers describing a device 110, a location of the device 110, acoustic region(s) associated with the device 110, input capabilities of the device 110, output capabilities of the device 110, sensor data associated with the device 110, unique functionality enabled by the device 110, previous selection data, and/or the like may also be listed along with a description of the type of object of the device 110.

In some examples, the user account may include or be associated with different user preferences, such as preferred types of notifications, preferred devices from which to output the notifications, preferred acoustic region(s) and/or locations to which to output the notifications, and/or the like. A device 110 may refer to the user account and corresponding data (e.g., user preferences) in order to configure settings for an individual user profile of the device 110.

While the device registry 210 may include multiple columns of information, an individual entry in the device registry 210 may lack information for one or more columns of information without departing from the disclosure. To illustrate an example, some devices may not be associated with an IP address without departing from the disclosure. For example, one or more devices (e.g., sensor device or component, although the disclosure is not limited thereto) may be communicatively coupled via a wireless connection to a hub device or a wired connection to another device 110 and may therefore not be associated with an individual IP address. Additionally or alternatively, the device registry

210 may indicate the IP address of the hub device for each of the one or more devices without departing from the disclosure.

In some examples, the device registry 210 is stored locally on one or more devices 110 associated with the private network 10. For example, the device registry 210 may be stored on a home server in an environment (e.g., building or residence) associated with the devices 110, may be stored on one or more devices 110, and/or the like without departing from the disclosure. In some examples, the device registry 210 may be in communication with various components, such as the devices 110, the system components(s) 120, the skill system component(s) 125, and/or the like, via the network(s) 199. However, the disclosure is not limited thereto and in some examples the device registry 210 may be cloud-based storage without departing from the disclosure. For example, the device registry 210 may be associated with the system component(s) 120 and remote from the devices 110.

FIGS. 3A-3B illustrate examples of a building with multiple devices, along with device capabilities associated with the devices, according to embodiments of the present disclosure. As illustrated in FIG. 3A, a plurality of devices 300 may be located within a building 310, although the disclosure is not limited thereto. For example, a first device 110*a* and a second device 110*b* may be located on a third floor of a building 310, a third device 110*c*, a fourth device 110*d*, a fifth device 110*e*, a sixth device 110*f*, and a seventh device 110*g* may be located on a second floor of the building 310, and an eighth device 110*h* and a ninth device 110*j* may be located on a first floor of the building 310. Each of the devices 110 illustrated in FIG. 3A may be configured to perform different functionality, such as generating audio data, outputting audio, generating image data, displaying image(s) on a display, and/or the like.

Additionally or alternatively, components of the devices 110 may vary such that an audio quality of output audio, an image quality of output image(s), sensor data generated by the device 110, unique functionality associated with the device 110, and/or the like may vary between the devices 110 without departing from the disclosure. For example, FIG. 3B illustrates an example of device capability data 320 listing capabilities associated with each of the devices 110. As illustrated in FIG. 3B, some of the devices 110 have basic microphone arrays, while other devices 110 have premium microphone arrays configured to generate audio data with higher audio quality, using additional microphones, processing, and/or the like. Alternatively, some of the devices 110 do not include a microphone array or individual microphone(s), such that these devices 110 may be unable to capture audio on their own, without departing from the disclosure.

Similarly, some of the devices 110 have basic loudspeakers, while other devices 110 have premium loudspeakers configured to generate output audio with higher audio quality, using additional loudspeakers, and/or the like. The ninth device 110*j* (e.g., headless device) does not include loudspeakers, but instead "passes" the audio data to a separate device such as a television or external loudspeakers.

Some of the devices 110 include a display, enabling these devices 110 to output an image, a series of images (e.g., video), and/or the like on the display. However, some of the devices 110 do not include a display and may use a speech interface to interact with the user. The ninth device 110*j* does not include a display, but instead "passes" the image data to a separate device such as the television. Some of the devices 110 may also include a camera, enabling these devices 110 to generate image data. For example, the devices 110 may generate image data representing the user during a communication session, although the disclosure is not limited thereto. Additionally or alternatively, the devices 110 may generate image data as part of user identification, presence detection, and/or the like. For example, a device 110 may generate image data and perform image processing, such as computer vision (CV) processing, to identify a user, verify a user profile associated with the user, monitor location(s) of the user, and/or the like without departing from the disclosure.

In addition, some devices 110 have additional sensors and/or additional features that are unique and can be extended to other devices 110 associated with the private network 10. For example, the devices 110 may include a motion sensor, a temperature sensor, an ambient light sensor, a smart home hub configured to control smart home devices, more processing power enabling the device 110 to perform computer vision processing, on-device language processing, and/or other advanced processing, and/or the like. Additionally or alternatively, the devices 110 may enable additional sensors and/or additional features not illustrated in FIG. 3B, such as distance sensors, radar sensors, lidar sensors, and/or the like without departing from the disclosure.

Based on the capabilities listed in the device capability data 320 and/or location(s) of individual devices 110, the system 100 may generate logical groupings that may vary based on functionality (e.g., function, task, and/or the like). For example, the system 100 may group some devices 110 together for certain types of output (e.g., audio output corresponding to music, audio output corresponding to a movie/TV show, etc.), such that the output is generated using all of the devices 110 in the group. In some examples, a user request to receive output via the group may be sent to a specific device in the group. In some embodiments, for such multi-device synchronous output the system 100 may use data described in the table below.

TABLE 1

| | | Example data for multi-device output | |
|---|---|---|---|
| GroupID | Group Function | Included Devices | Command destination for GroupID |
| Group 123 | Audio output | Device_1_ID, Device_2_ID, Device_3_ID | Device_1_ID |
| GroupABC | Audio output | Device_1_ID, Device_4_ID | Device_4_ID |
| GroupXYZ | Audio output | Device_5_ID, Device_6_ID, Device_7_ID, Device_8_ID | Device_5_ID |

In an example, for groupID "GroupABC" and for function "audio output", the group may include "Device_1_ID", "Device_2_ID", and "Device_3_ID", and the command for the function may be sent to "Device_1_ID" which may distribute the audio output to the other devices in the group for synchronous output. In some embodiments, the command to output data may be sent to one of the devices in the group, an interim component in the system component(s) 120, an interim component in the device 110, a destination address or the like.

Figure 4:
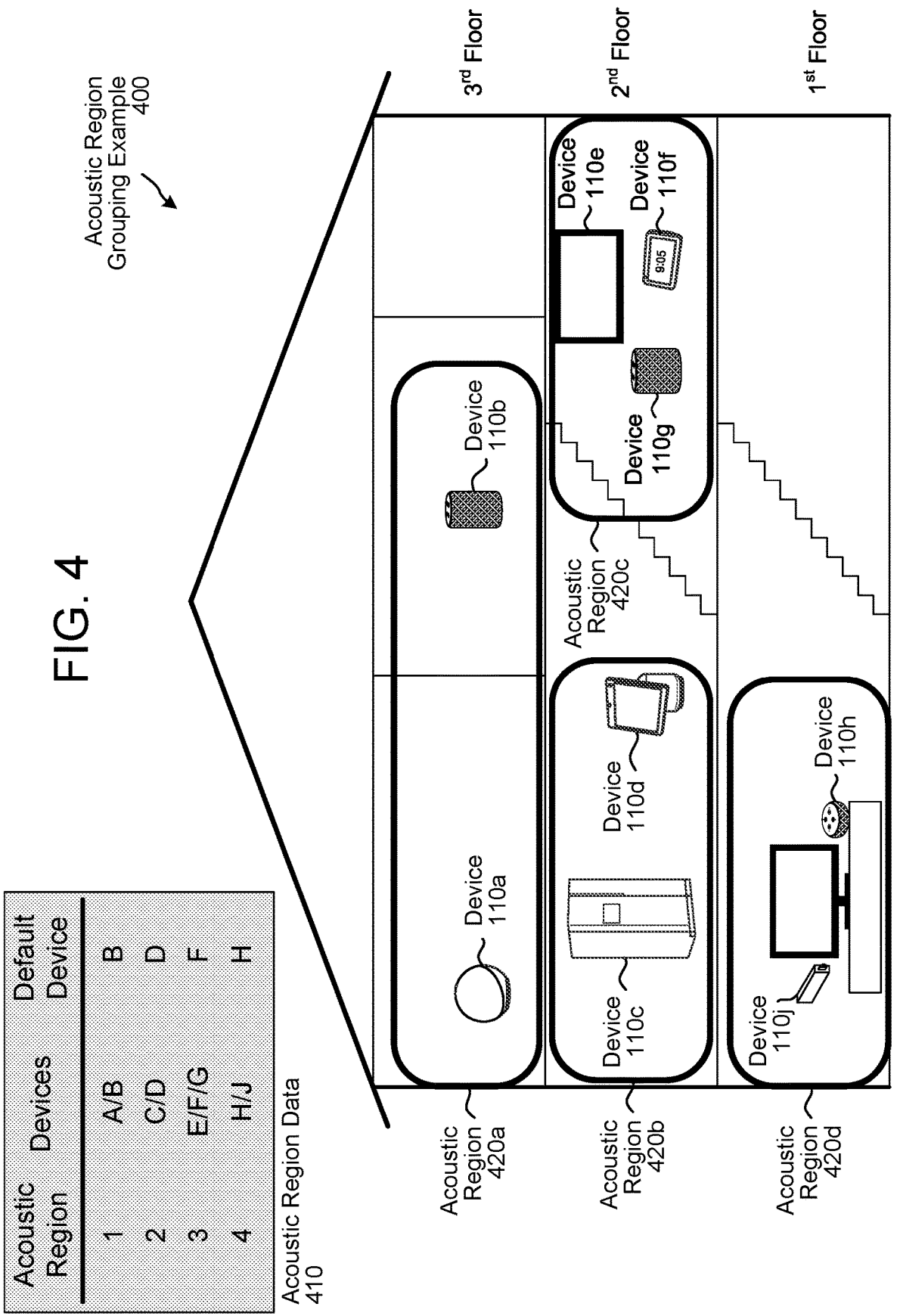
FIG. 4 illustrates an example of logical groupings corresponding to acoustic regions according to embodiments of the present disclosure.

In some examples, the system 100 may determine logical groupings based on individual acoustic regions. For example, FIG. 4 illustrates an example of logical groupings that correspond to acoustic regions, such that one or more devices may be grouped together based on playback proximity and/or overlap. Thus, each acoustic region may correspond to a unique room, group of rooms, and/or other delineated area in the building 310. As illustrated in FIG. 4, acoustic region grouping example 400 illustrates an example of acoustic region data 410 along with visual illustrations of acoustic regions 420 indicated by the acoustic region data 410.

In response to one or more acoustic region requests and/or additional processing, the system 100 may generate acoustic regions corresponding to the devices 110. For example, FIG. 4 illustrates an example of acoustic region data 410. As illustrated in 4, the acoustic region data 410 indicates that a first acoustic region 420a (e.g., "1") may include the first device 110a and the second device 110b, and that the second device 110b may be the default device (e.g., main device) for the first acoustic region 420a. The acoustic region data 410 also indicates that a second acoustic region 420b (e.g., "2") may include the third device 110c and the fourth device 110d, and that the fourth device 110d may be the default device for the second acoustic region 420b. Similarly, the acoustic region data 410 also indicates that a third acoustic region 420c (e.g., "3") may include the fifth device 110e, the sixth device 110f, and the seventh device 110g, and that the sixth device 110f may be the default device for the third acoustic region 420c. Finally, the acoustic region data 410 may also indicate that a fourth acoustic region 420d (e.g., "4") may include an eighth device 110h and a ninth device 110j, with the eighth device 110h being the default device for the fourth acoustic region 420d.

In addition, FIG. 4 illustrates a visual depiction of the acoustic region data 410. As illustrated in FIG. 4, the acoustic region grouping example 400 illustrates that the first device 110a and the second device 110b are included in the first acoustic region 420a on the third floor of the building 310, that the third device 110c and the fourth device 110d are included in the second acoustic region 420b on the second floor of the building 310 (e.g., kitchen), that the fifth device 110e, the sixth device 110f, and the seventh device 110g are included in the third acoustic region 420c on the second floor of the building 310 (e.g., living room), and that the eighth device 110h and the ninth device 110j are included in the fourth acoustic region 420d on the first floor of the building 310 (e.g., basement).

In some examples, the acoustic regions 420 may correspond to device-paired configurations, such as multi-room audio. In the device-paired configuration, each device 110 in an acoustic region 420 may receive the same output audio data and may generate output audio corresponding to multiple channels. Thus, a user may perceive the same output audio being generated by multiple devices in varying locations. The output audio may be synchronized between the multiple devices, such that the output audio is generated at the same time, but the output audio generated by each device is the same.

The acoustic region data 410 and the acoustic regions 420 are intended as an illustrative example and the disclosure is not limited thereto. Instead, the acoustic regions 420 may vary without departing from the disclosure. Additionally or alternatively, while in some examples the system 100 may receive input indicating the acoustic regions 420, the disclosure is not limited thereto and in other examples the system 100 may automatically generate the acoustic regions 420 without departing from the disclosure.

In some examples, the acoustic region request may indicate the default device for an acoustic region. In other examples, the system 100 may select the default device for an acoustic region 420 based on locations of the devices 110, output capabilities of the devices 110, available processing associated with the devices 110, other information and/or capabilities, and/or the like without departing from the disclosure. The default device may be a single device chosen as a "main" device or controller for each of the acoustic regions 420. For example, the controller may control the devices 110 included in the acoustic region 420, communicate with other devices in the system 100 on behalf of the acoustic region 420, and/or relay data received from the devices 110 and/or the system component(s) 120 to the other devices 110 in the acoustic region 420. For example, a first controller (e.g., sixth device 110*f*) for the third acoustic region 420*c* may control the remaining devices 110*f*/110*g* and may send audio data to the remaining devices 110*f*/110*g* so that the devices 110*e*/110*f*/110*g* collectively generate output audio that is synchronized. Thus, if the devices 110 and/or the system component(s) 120 send data (e.g., notification data, audio data, and/or the like) to the first controller, the first controller may relay the data to the devices 110*e*/ 110*g*.

While FIG. 4 illustrates examples of logical groupings associated with particular functionality (e.g., outputting audio within acoustic regions), the disclosure is not limited thereto and the system 100 may generate a number of logical groupings without departing from the disclosure. In some examples, the system 100 may generate logical groupings for a number of different types of functionality (e.g., function, task, and/or the like), such as capturing audio input, generating audio output, generating image output, generating notifications, performing wakeword detection, performing user identification, performing speech processing, performing smart home control, and/or the like. In other examples, the system 100 may divide a plurality of devices 110 into subsets based on proximity (e.g., acoustic region, distance, location, etc.) and then generate logical groupings for a number of different types of functionality within each subset. For example, the system 100 may determine the acoustic regions 420 described above and then generate multiple logical groupings for each of the acoustic regions 420. To illustrate an example, the system 100 may determine the third acoustic region 420*c* and then generate a first logical grouping within the third acoustic region 420*c* for first functionality, a second logical grouping within the third acoustic region 420*c* for second functionality, and so on for different types of functionality.

Figure 5A:
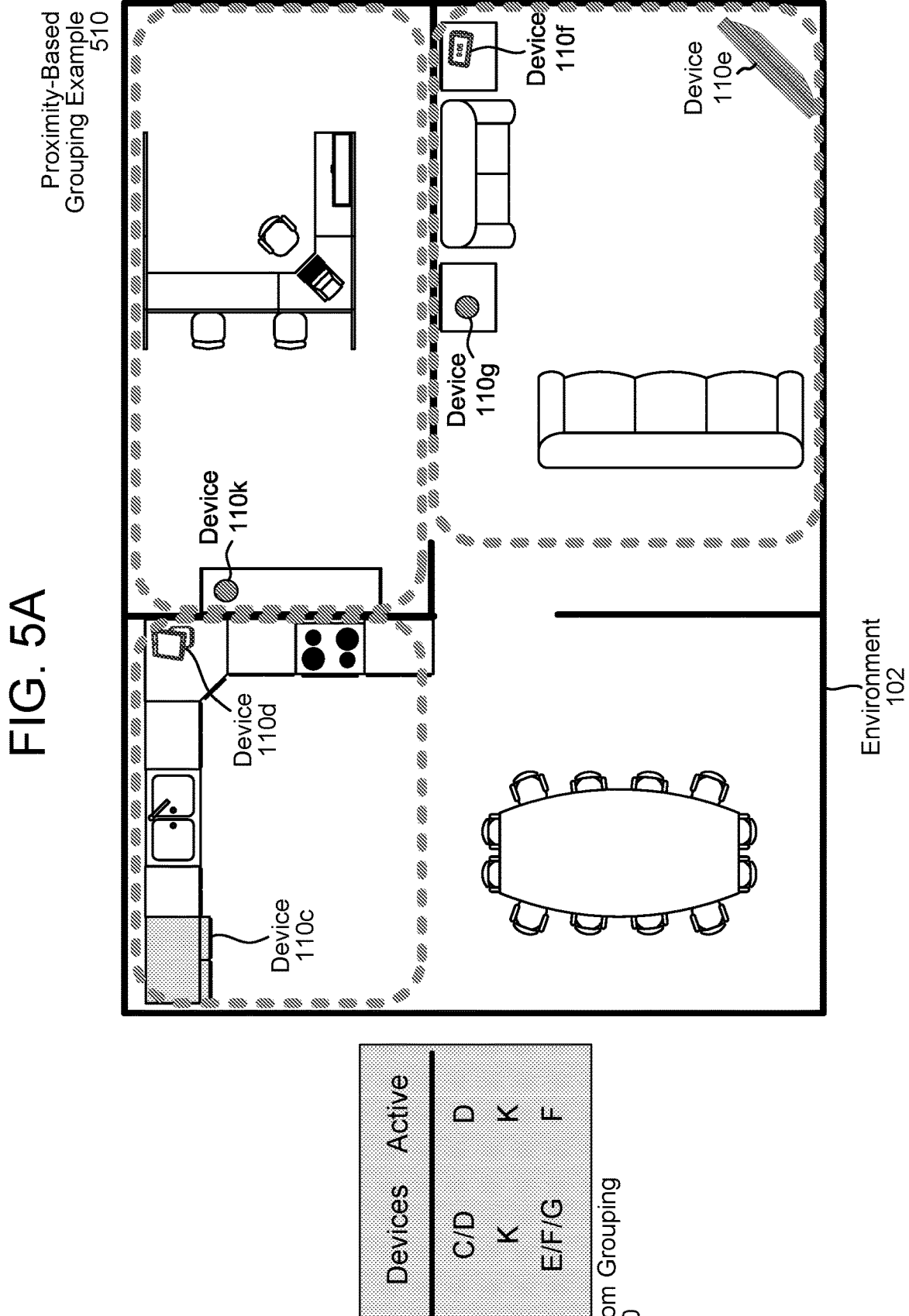

FIGS. 5A-5C illustrate examples of different types of logical groupings according to embodiments of the present disclosure. In some examples, the system 100 may perform proximity-based grouping to separate the devices 110 into groups based on proximity (e.g., acoustic region, distance between devices 110, location associated with devices 110, etc.). For example, the system 100 may group devices 110 based on individual rooms in the building 310 (e.g., all of the devices 110 that share a physical room), individual acoustic regions (e.g., devices 110 within one or more rooms that capture output audio from each other), relative distances between the devices 110 and a specific position (e.g., devices 110 that are within a designated area), clustering of the devices 110 (e.g., the system 100 performs a clustering operation to separate the devices 110 into clusters based on relative distance), individual locations (e.g., all of the devices 110 associated with a first address), and/or the like.

As used herein, an acoustic region may correspond to a physical area based on playback proximity and/or overlap. In some examples, the system 100 may determine an acoustic region by identifying which devices 110 detect cross-talk. For example, if a first device 110*a* generates output audio that is detected by devices 110*b*-110*d*, the system 100 may group the four devices 110*a*-110*d* within a single acoustic region. The key concept of an acoustic region is that a user may detect output audio or other notifications generated by any of the devices 110 associated with an individual acoustic region. Instead of generating multiple overlapping notifications using each of the devices 110 within the individual acoustic region, the system 100 may improve a user experience by generating a single notification for the acoustic region. Each acoustic region may correspond to a unique room, group of rooms, and/or other delineated area in the building 310. Thus, an individual acoustic region may extend across multiple rooms depending on acoustics, a floorplan, obstacles, sound dampening materials, a relative position of the devices 110, and/or the like.

In contrast to acoustic regions that may extend across multiple rooms, the system 100 may group devices 110 based on physical rooms without departing from the disclosure. In some examples, the system 100 may determine acoustic regions (e.g., identifying devices 110 within range of each other) and then further distinguish between individual rooms. For example, while the four devices 110*a*-110*d* may detect each other, the system 100 may use mapping data, computer vision processing, floorplan data, sensor data, and/or other inputs to determine that the first device 110*a* is in a first room while the other devices 110*b*-110*d* are in a second room. Thus, the first device 110*a* may be associated with a first logical grouping, while the other devices 110*b*-110*d* may be associated with a second logical grouping. However, the disclosure is not limited thereto, and in other examples the system 100 may determine the logical groupings associated with individual rooms directly without departing from the disclosure. For example, the system 100 may compare individual positions of the devices 110 to mapping data indicating a layout of the building 310 to generate the first grouping and the second grouping without departing from the disclosure.

As illustrated in FIG. 5A, proximity-based grouping example 510 illustrates an example in which the system 100 separates a plurality of devices 110 based on a physical room associated with the device 110. To illustrate room-based logical groupings, the proximity-based grouping example 510 includes six devices (110*c*-110*g* and 110*k*) located between three separate rooms in an environment 102. For example, two devices (110*c*/110*d*) are located in a first room (e.g., kitchen), a single device (110*k*) is located in a second room (e.g., office), and three devices (110*e*-110*g*) are located in a third room (e.g., living room). While output audio generated by the devices 110 may overlap between rooms, such that device 110*k* may detect output audio generated by the seventh device 110*g*, the system 100 may use the physical layout of the environment 102 to distinguish between the logical groupings.

As illustrated in FIG. 5A, the system 100 may generate room grouping 520 corresponding to the logical groupings described above. For example, the room grouping 520 indicates that a first logical grouping (e.g., "1") includes the third device 110*c* and the fourth device 110*d* (e.g., "C/D"), a second logical grouping (e.g., "2") includes the device 110*k* (e.g., "K"), and a third logical grouping (e.g., "3") includes the fifth device 110*e*, the sixth device 110*f*, and the seventh device 110*g* (e.g., "E/F/G").

In addition, the room grouping 520 indicates an active device selected for each of the logical groupings. For example, the room grouping 520 indicates that the fourth device 110*d* (e.g., "D") is active for the first logical grouping (e.g., "1"), the device 110*k* (e.g., "K") is active for the second logical grouping (e.g., "2"), and the sixth device 110*f* (e.g., "F") is active for the third logical grouping (e.g., "3"). In some examples, the active device may be directed to enable functionality for the logical grouping, while the remaining devices are directed to disable this functionality. For example, if the room grouping 520 coordinates generating output audio in each room, the active device may be configured to generate output audio while the remaining devices (e.g., inactive devices) may disable audio output. Alternatively, if the room grouping 520 corresponds to other functionality (e.g., wakeword detection, acoustic event detection, user identification, notification presentation, etc.), the active device may be configured to perform the desired functionality for the group while the remaining devices remain idle. However, the disclosure is not limited thereto, and in other examples the active device may be selected to coordinate or manage the logical grouping. For example, the active device may be selected as a local coordinator (e.g., leader device) tasked with coordinating certain functionality for the group, as will be described in greater detail below with regard to FIG. 10A.

As illustrated in FIG. 5B, task-based grouping example 530 illustrates an example in which the system 100 separates the plurality of devices 110 based on a specific task or function. In this case, the system 100 groups all devices 110 associated with the selected task, regardless of physical position (e.g., acoustic region, room, etc.). To illustrate an example, the system 100 may generate music grouping 540 corresponding to all of the devices 110 configured to generate output audio. For example, the music grouping 540 indicates a first logical grouping (e.g., "1") that includes the fourth device 110*d*, the sixth device 110*f*, the seventh device 110*g*, and the device 110*k* (e.g., "D/F/G/K"). Using the music grouping 540, the system 100 may output audio data using the selected devices.

In addition, the music grouping 540 indicates that the seventh device 110*g* (e.g., "G") is selected as an active device for the first logical grouping (e.g., "1"). As described above, the active device may be directed to enable functionality for the logical grouping, while the remaining devices are directed to disable this functionality. Additionally or alternatively, the active device may be selected to coordinate or manage the logical grouping. For example, the seventh device 110*g* may be tasked with identifying connections/disconnections of devices 110 associated with the music grouping 540, coordinating local distributed resources associated with the music grouping 540, and/or the like, although the disclosure is not limited thereto. While the task-based grouping example 530 illustrates an example of music grouping 540, the disclosure is not limited thereto and the task-based grouping may correspond to other functionality (e.g., wakeword detection, acoustic event detection, user identification, notification presentation, etc.) without departing from the disclosure.

As illustrated in FIG. 5B, location-based grouping example 550 illustrates an example in which the system 100 groups the plurality of devices 110 based on general location (e.g., address, building, etc.). In this case, the system 100 groups all devices 110 associated with the location, regardless of physical position (e.g., acoustic region, room, etc.) within the location. To illustrate an example, the system 100 may generate location grouping 560 including a first plurality of devices 110 located at a first address, while a second logical grouping (not illustrated) may include a second plurality of devices 110 located at a second address. For example, the location grouping 560 indicates a first logical grouping (e.g., "1") that includes all of the devices (e.g., "C/D/E/F/G/K").

In addition, the location grouping 560 indicates that the fourth device 110*d* (e.g., "D") is selected as an active device for the first logical grouping (e.g., "1"). As described above, the active device may be directed to enable functionality for the logical grouping, while the remaining devices are directed to disable this functionality. Additionally or alternatively, the active device may be selected to coordinate or manage the logical grouping. For example, the fourth device 110*d* may be tasked with identifying connections/disconnections of devices 110 associated with the location grouping 560, coordinating local distributed resources associated with the location grouping 560, and/or the like, although the disclosure is not limited thereto.

While FIGS. 5A-5B distinguish between proximity-based grouping, task-based grouping, and location-based grouping, the disclosure is not limited thereto. In some examples, the system 100 may perform a combination of proximity-based grouping and task-based grouping without departing from the disclosure. For example, the system 100 may perform proximity-based grouping and/or location-based grouping to select a subset of the devices 110 that are in a particular area (e.g., physical context relative to each other), and then perform task-based grouping for a number of different tasks associated with the subset.

As illustrated in FIG. 5C, the system 100 may generate additional logical groupings without departing from the disclosure. In some examples, the system 100 may generate default device grouping 570, which includes each of the default devices selected for the acoustic regions 420 illustrated in FIG. 4. For example, the default device grouping 570 indicates a first logical grouping (e.g., "1") that includes the second device 110*b*, the fourth device 110*d*, the sixth device 110*f*, and the eighth device 110*h* (e.g., "B/D/F/H"). In addition, the default device grouping 570 indicates that the fourth device 110*d* (e.g., "D") is selected as a coordinator device for the first logical grouping (e.g., "1"). In some examples, the system 100 may generate output notifications by sending notification data to each device 110 associated with the default device grouping 570, resulting in the output notifications being generated once in each acoustic region 420. As described above, the coordinator device may be selected to coordinate or manage the logical grouping.

In some examples, the system 100 may select a grouping coordinator for each logical grouping. For example, first room grouping 580*a* illustrates an example in which each logical grouping has an individual grouping coordinator that is configured to coordinate or manage the logical grouping. As illustrated in FIG. 5C, the first room grouping 580*a* indicates that a first logical grouping (e.g. "1") is associated with two devices (e.g., "C/D") and a first grouping coordinator (e.g., "D"), a second logical grouping (e.g. "2") is associated with a single device (e.g., "K") and a second grouping coordinator (e.g., "K"), and a third logical grouping (e.g. "3") is associated with three devices (e.g., "E/F/G") and a third grouping coordinator (e.g., "F"). While the grouping coordinator for a logical grouping is selected from amongst the devices 110 associated with the logical grouping, the disclosure is not limited thereto and the grouping coordinator may correspond to other devices 110 without departing from the disclosure.

The disclosure is not limited thereto, however, and in other examples the system 100 may select a task coordinator associated with a task for multiple logical groupings without departing from the disclosure. For example, second room grouping 580*b* illustrates an example that includes the same logical groupings as the first room grouping 580*a*, but instead of selecting an individual grouping coordinator for each logical grouping, the second room grouping 580*b* indicates a single task coordinator (e.g., "D") that is selected to coordinate or manage all three logical groupings. Thus, the task coordinator may be associated with a particular task or functionality and may identify connections/disconnections of devices 110, coordinate local distributed resources associated with the second room grouping 580*b*, and/or the like, although the disclosure is not limited thereto. While FIG. 5C only illustrates a single task-based grouping, the disclosure is not limited thereto and the second room grouping 580*b* may correspond to two or more task-based groupings without departing from the disclosure.

In some examples, the system 100 may generate logical groupings associated with smart home devices, which may include one or more hub device(s) and a plurality of smart devices (e.g., smart bulb, smart plug, and/or the like). A hub device may be referred to as a "home controller," gateway and/or other type of "hub," and may assist in controlling associated smart-home devices. In some examples, smart devices may be paired to the hub device, typically by following directions to physically place the smart device and the hub device into a join mode, which may also be described as a pairing mode, and/or by utilizing a hub-associated application stored on and/or accessed by a web and/or mobile phone. Thereafter, the hub device may be utilized to control operations associated with the smart device.

As illustrated in FIG. 5C, smart home grouping 590 includes a first logical grouping (e.g., "1") corresponding to smart home hub devices (e.g., "B/D") and a second logical grouping (e.g. "2") corresponding to smart devices (e.g., secondary devices) that are controlled via the smart home hub devices. While the smart home grouping 590 illustrates an example in which the second logical grouping only includes three smart home devices (e.g., "SH1/SH2/SH3"), the disclosure is not limited thereto and the number of smart home devices may vary without departing from the disclosure. As illustrated in FIG. 5C, the smart home grouping 590 indicates a single coordinator (e.g., "D"), which may be selected to coordinate or manage all logical groupings without departing from the disclosure.

Using the distributed computing framework, the system 100 may manage the devices 110 in order to extend functionality or local resources, collaborate between devices 110 and/or sensors, and coordinate processing, storage, and/or the like to improve efficiency. For example, the system 100 may centrally track each device's connection abilities (i.e. protocols supported and smart devices reachable), functionality (e.g., unique functions, sensors, etc.), and/or the like and may distribute processing between distributed resources.

As described above, the distributed computing framework may extend functionality or local resources between devices 110. For example, the distributed computing framework may enable a host device to deliver functionality on behalf of a client device in the local network, such that the client device may gain additional functionality that it wouldn't otherwise have due to a lack of resources. Additionally or alternatively, a client device may delegate non-urgent processing to another device to preserve local resources. Further, the distributed computing framework may enable collaboration between devices 110 and/or sensors. For example, devices on the local network may exchange and combine data to extract more accurate context about the user and/or the environment. Combining data from multiple devices and/or sensors enables net-new user experiences and/or expands the coverage of existing experiences throughout the distributed computing framework. Finally, the distributed computing framework enables processing, storage, and/or the like to be coordinated to improve efficiency and reduce redundancy. For example, the distributed computing framework may enable devices 110 to coordinate activities to deliver a unified user experience that spans multiple devices 110 and/or output modalities. While each device 110 remains responsible for its own resources and processing, the device 110 executes its actions in concert with other devices 110 in the distributed computing framework to deliver one portion of an overall user experience.

FIG. 6 illustrates examples of performing distributed computing extension according to embodiments of the present disclosure. As described above, the distributed computing framework may enable a host device to deliver functionality on behalf of a client device in the local network, such that the client device may gain additional functionality that it wouldn't otherwise have due to a lack of resources. While FIG. 6 illustrates two examples of extension 600 (e.g., extending functionality 610 and delegating processing 620), the disclosure is not limited thereto.

As illustrated in FIG. 6, extending functionality 610 corresponds to a device 110*f* enabling shared functionality 615 on devices 110*g*/110*k*. For example, the distributed computing framework may improve latency and reliability by extending local resources to process requests locally and/or may extend functionality from one device to other device(s) 110 via the private network 10. Functionality to extend includes CPU processing, language processing, computer vision (CV) processing, smart device control, novel features enabled by unique sensors, and/or the like.

Additionally or alternatively, the distributed computing framework enables a device 110 to delegate non-urgent processing to another device 110 to preserve local resources. As illustrated in FIG. 6, delegating processing 620 corresponds to device 110*g* requesting that another device 110*k* perform delegated processing to preserve resources associated with device 110*g*. Thus, the distributed computing framework enables the device 110 to delegate non-urgent processing to other device(s) that are not in use and/or to redistribute processing to other devices 110 on the local network to improve responsiveness.

FIG. 7 illustrates examples of performing distributed computing collaboration according to embodiments of the present disclosure. As described above, the distributed computing framework may enable collaboration between devices 110 and/or sensors. For example, devices on the local network may exchange and combine data to extract more accurate context about the user and/or the environment. Combining data from multiple devices and/or sensors enables net-new user experiences and/or expands the coverage of existing experiences throughout the distributed computing framework. While FIG. 7 illustrates two examples of collaboration 700 (e.g., sensor extension 710 and sensor aggregation 720), the disclosure is not limited thereto.

As illustrated in FIG. 7, sensor extension 710 illustrates an example in which a device 110*f* extends sensor data 715 to device 110*k*. The distributed computing framework may offload processing of sensor data to another device on the local network to enable a device to sense people, objects, and events in the immediate vicinity. In addition, the distributed computing framework enables sensor data to be extended to nearby devices via local sensor communication.

In some examples, sensor data can be combined between multiple devices to provide additional context about the environment. As illustrated in FIG. 7, sensor aggregation 720 illustrates an example in which a device 110*g* receives sensor data from other devices 110*f*/110*k* and performs sensor fusion 725. For example, the sensor fusion 725 may generate aggregated sensor data from multiple devices 110 and in some examples the device 110*g* may publish the aggregated sensor data back to the devices 110*f*/110*k*, although the disclosure is not limited thereto. The distributed computing framework may combine sensor data from nearby devices to confirm presence detection, user identification, and/or the like. In addition, the distributed computing framework may fuse sensor data captured from multiple devices to sense people, objects, and events across the entire premise (e.g., environment 102) and locate them with high granularity. The distributed computing framework may aggregate sensor data from multiple devices and publish task-specific sensor data to local devices. Additionally or alternatively, the distributed computing framework may aggregate sensor data from multiple devices and extract feature data, protecting the user's privacy.

While FIG. 7 illustrates two examples of collaboration 700 (e.g., sensor extension 710 and sensor aggregation 720), the disclosure is not limited thereto. In addition, the system 100 may enable smart home control, new device provisioning, federated learning, and/or the like without departing from the disclosure. Additionally or alternatively, the distributed computing framework may create a pipeline for map-based and/or location based context information to be shared across the devices 110, although the disclosure is not limited thereto.

To illustrate an example of enabling smart home control, the system 100 may provide a framework by which the device 110 may send commands to one or more smart devices (e.g., smart device, smart endpoint, etc.). For example, some of the devices 110 may include additional components, such as a radio capable of wireless communication using various protocols, enabling them to act as a smart home hub and control one or more smart devices. By monitoring the devices 110 and/or smart devices connected to the private network 10 (e.g., local LAN), tracking each device's connection abilities (i.e. protocols supported and smart devices reachable), and managing which smart devices are controlled by individual smart home hubs, the system 100 may improve local coverage while improving efficiency and responsiveness (e.g., reducing latency).

In some examples, the system 100 may generate logical groupings associated with smart home devices, which may include one or more hub devices and a plurality of smart home devices (e.g., smart bulb, smart plug, door locks, and/or the like). A smart hub device may be referred to as a "home controller," gateway and/or other type of "hub," and may assist in controlling associated smart home devices. In some examples, smart home devices may be paired to the smart hub device, typically by following directions to physically place the smart home device and the smart hub device into a join mode, which may also be described as a pairing mode, and/or by utilizing a hub-associated application stored on and/or accessed by a web and/or mobile phone. Thereafter, the smart hub device may be utilized to control operations associated with the smart home device.

The smart home hub may be configured to locally control one or more smart home devices connected via Bluetooth, Zigbee, and/or other point-to-point methods (e.g., Bluetooth, Zigbee, BLE Mesh, proprietary protocols over WiFi, Matter over WiFi and Thread, Local Adapter Platform, etc.). Thus, to control a smart home device, the smart home hub must be 1:1 paired with the target smart home device. Typically, in order to enable local control and avoid routing commands through the system component(s) 120 and/or the network(s) 199, every smart home hub on the private network 10 must be paired with every smart home device on the private network 10, which results in inefficient and redundant pairings. With the distributed computing framework, however, the devices 110 can collaborate such that an individual smart home hub is connected to a subset of smart home devices and delegates control of the rest of the smart home devices to other smart home hubs. In some examples, the system 100 may allow some redundant pairings to improve resiliency, although the disclosure is not limited thereto.

As part of managing which devices 110 and/or smart home devices are connected to the private network 10, the system 100 may track each device's connection abilities (i.e. protocols supported and smart devices reachable), For example, each of the devices 110 can declare the protocols they support, get elected to be local control authority for some or all endpoints supporting those protocols, and report back smart home devices reachable through that individual device 110 along with any quality metrics. Thus, local control of a smart home device can then be delegated to the best device(s) 110 connected to that smart home device, although the disclosure is not limited thereto.

In some examples, the device 110 that a smart home device is connected to locally can propagate a device state to local datastores of all of the devices 110 that need it. For example, the system 100 may abstract any local datastore queries to dynamically map to a different device's datastore, depending on which device is authoring state for a smart home device. Additionally or alternatively, each device 110 can proactively propagate state updates to all of the device's local datastores to reduce latencies at the cost of redundancy. Thus, the distributed computing framework may enable the devices 110 to manage and coordinate device state information locally between the devices 110.

To illustrate an example of enabling new device provisioning, the system 100 may also continuously monitor for new devices 110 and/or smart home devices that are not yet connected to the private network 10. For example, one or more devices 110 may perform discovery by monitoring different protocols (e.g., WiFi, Bluetooth, Zigbee, other short-range wireless connections, etc.) to detect a broadcast (e.g., device broadcast, beacon, probe request, connection request, etc.) from a new device. In some examples, the device 110 may continuously scan for new devices. When a device 110 detects a new broadcast, indicating a newly discovered device, the device 110 may perform new device provisioning to connect to the new device, perform authentication to verify that the new device is associated with the user profile and/or authorized to connect to the private network 10, and communicate network information to the new device that may enable the new device to connect to the private network 10.

Using the distributed computing framework, the system 100 may divide a coverage area between multiple devices 110 to avoid having multiple provisioners (e.g., devices 110 configured to perform new device provisioning) running within the same coverage area. For example, the system 100 may only enable one device 110 out of a logical grouping of devices 110 to perform new device provisioning for each protocol, enabling the other devices 110 to reduce processing (e.g., processing consumption), memory, and/or power consumption. The system 100 may enable this collaboration between devices 110 using the same responsibility division framework described above, with each device 110 declaring connection abilities (i.e. protocols supported) and/or potential capabilities (e.g., coverage area by protocol), being elected to be the provisioner (e.g., local coordinator) for a given protocol and/or coverage area, and confirming assignment(s) after launching the provisioners. Additionally or alternatively, each device 110 may run a radio coverage check upon powering on (e.g., initial startup, bootup, etc.) and report the coverage area by protocol to the distributed computing framework. In some examples, the local coordinator may periodically verify coverage with the device(s) 110 associated with the protocol and/or coverage area, although the disclosure is not limited thereto.

To illustrate an example of enabling federated learning, the system 100 may enable multiple devices 110 to collaborate and detect erroneous machine learning model predictions. When one or more erroneous machine learning model predictions are detected, the system 100 may generate training data and/or update the machine learning model(s) locally, to avoid future defects without sending raw data to the system component(s) 120 via the network(s) 199. Performing federated learning may enable the system 100 to improve wakeword detection, local automatic speech recognition (ASR) processing, and/or other classification machine learning models, although the disclosure is not limited thereto. As part of collaboration between the devices 110, the distributed computing framework enables the devices 110 to offload federated learning processing to other devices to reduce a resource burden and/or enable federated learning for devices 110 that lack the required resources.

Collaboration and/or coordination between the devices 110 requires local connectivity between the devices 110 on a common network, such as the private network 10. However, there are multiple system conditions that may impact a user experience and/or capabilities of the system 100. For example, an available network bandwidth to deliver the required data may be reduced within the private network 10 due to many factors (other data-intensive applications running in the private network 10, a total number of devices 110, device types, placement, physical structure, etc.). In addition, a device's ability to directly communicate (e.g., reachability) may change temporarily or permanently without intentional changes to the network topology. Finally, intermittent changes in network latency may prevent consistent delivery of data for near-real-time experiences. To avoid these issues, the distributed computing framework may be configured to include redundancy for increased resiliency and/or incorporate fallback behavior patterns in cases where local network connectivity is unavailable or insufficient.

Figure 8:
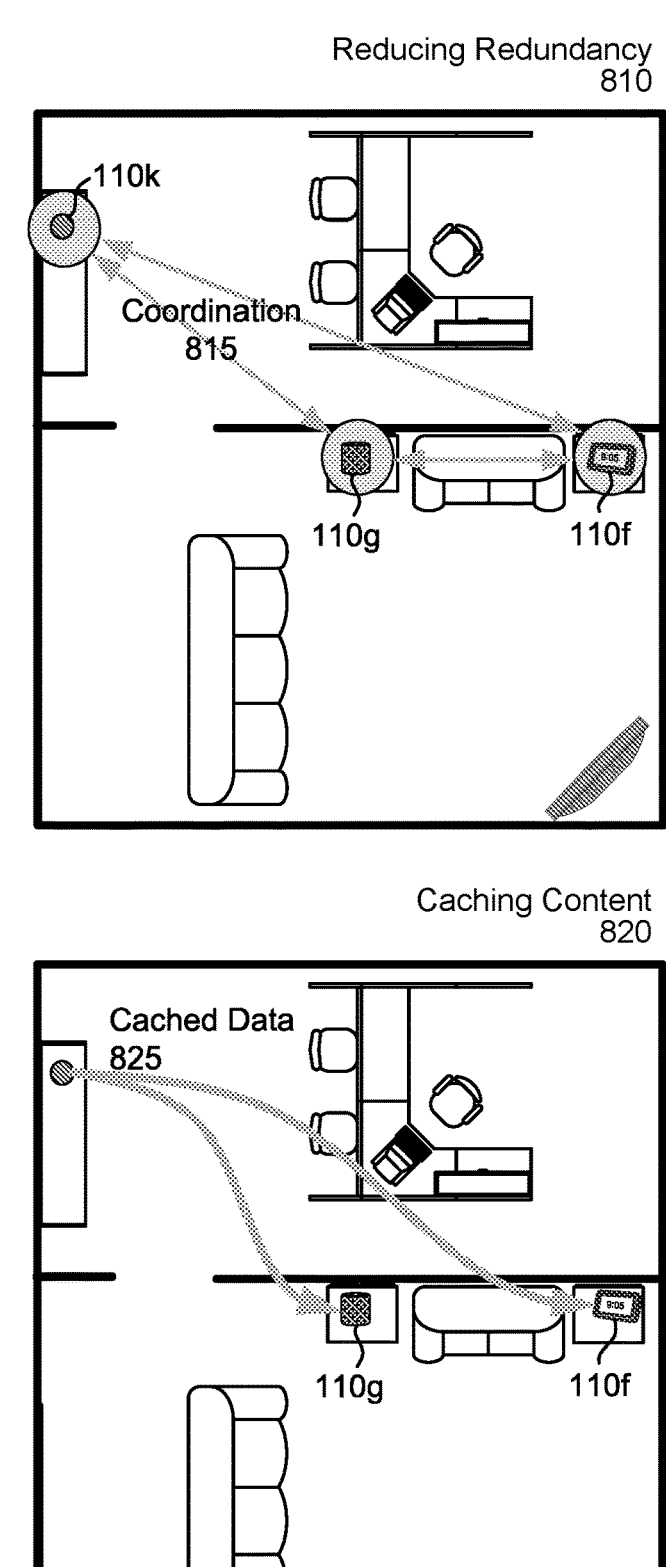
FIG. 8 illustrates examples of performing distributed computing coordination according to embodiments of the present disclosure.

FIG. 8 illustrates examples of performing distributed computing coordination according to embodiments of the present disclosure. As described above, the distributed computing framework enables processing, storage, and/or the like to be coordinated to improve efficiency and reduce redundancy. For example, the distributed computing framework may enable devices 110 to coordinate activities to deliver a unified user experience that spans multiple devices 110 and/or output modalities. While FIG. 8 illustrates two examples of coordination 800 (e.g., reducing redundancy 810 and caching content 820), the disclosure is not limited thereto.

As illustrated in FIG. 8, reducing redundancy 810 illustrates an example in which multiple devices 110f/110g/110k perform coordination 815. Thus, the distributed computing framework may create a unified user experience across multiple devices, may manage distributed resources and coordinate processing, and may improve efficiency by eliminating redundant processing, while still maintaining resiliency. In addition, the distributed computing framework may perform shared media caching to reduce redundancy between devices 110, may manage audio distribution and time synchronization, enabling audio playback synchronized across multiple devices, and may perform local arbitration to prevent duplicate request processing.

An example of performing shared media caching is illustrated in FIG. 8 as caching content 820. As illustrated in FIG. 8, caching content 820 illustrates an example in which the device 110k stores cached data 825 and distributes the cached data 825 to the other devices 110f/110g. Thus, the distributed computing framework may distribute cached audio content locally during audio playback and/or may perform shared media caching to reduce redundancy between devices. In addition, the distributed computing framework may improve responsiveness by maintaining local copies of frequently requested music, may improve responsiveness by proactively fetching media content, and/or may store smart home state data locally.

Figure 9:
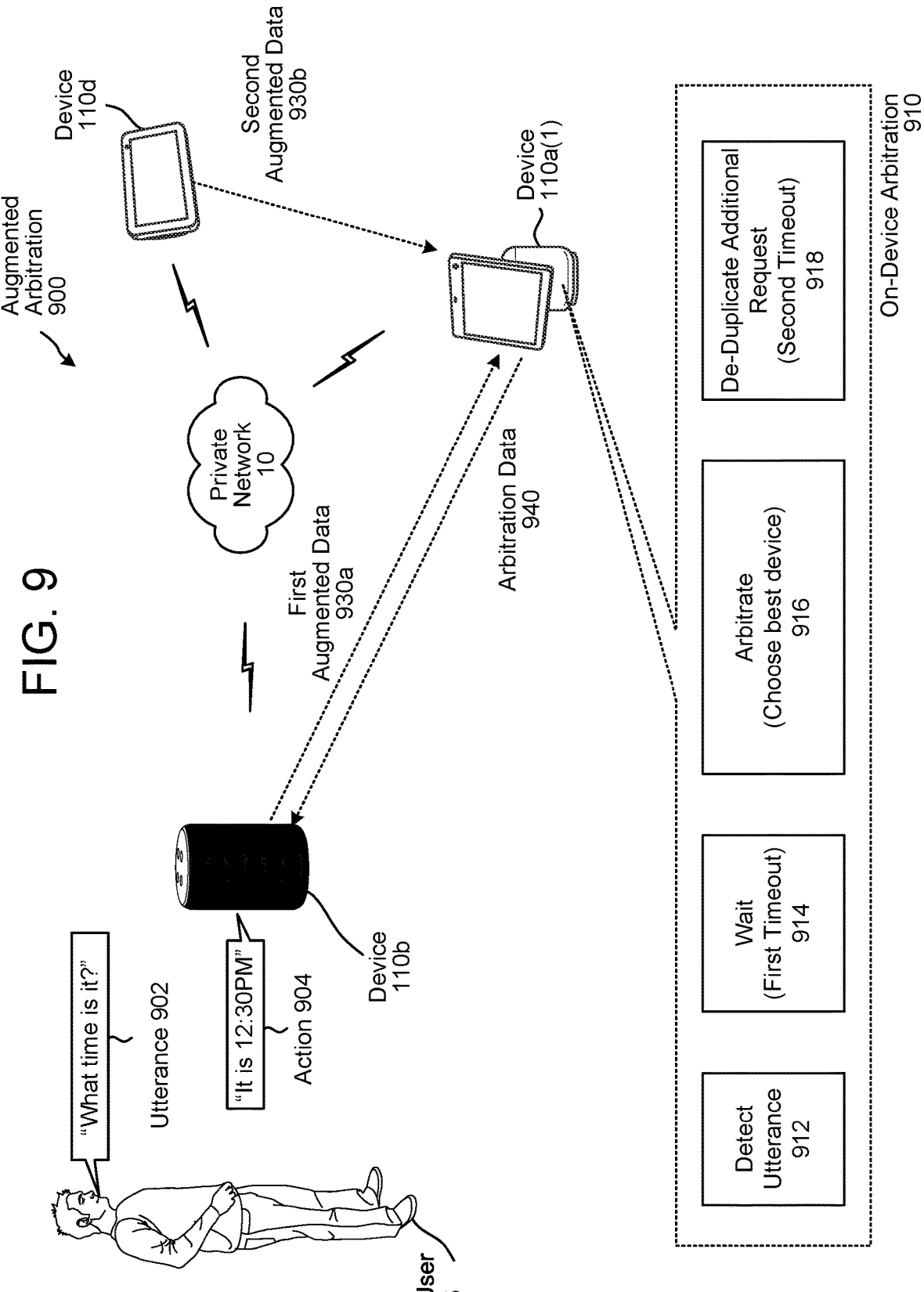
FIG. 9 is a schematic diagram illustrating a technique for performing augmented arbitration to designate a device to perform an action according to embodiments of the present disclosure.

FIG. 9 is a schematic diagram illustrating a technique for performing augmented arbitration to designate a device to perform an action according to embodiments of the present disclosure. As illustrated in FIG. 9, a second device 110b and a fourth device 110d may both capture an utterance 902 generated by a user (e.g., "What time is it?"). To avoid redundant processing, the system 100 may perform augmented arbitration 900 to select audio data that represents the user utterance 902 from a single device 110.

In some examples, a first device 110a(1) may be configured to perform natural language processing, enabling the system 100 to interpret a voice command corresponding to the utterance 902 using the first device 110a(1). In the example illustrated in FIG. 9, the first device 110a(1) is a hub device configured to perform language processing and other routing for surrounding devices 110, such as the second device 110b and/or the fourth device 110d. Thus, when the utterance 902 is detected by multiple devices 110, the devices 110 may be configured to send audio data to the first device 110a(1) for language processing. As part of performing language processing, the first device 110a(1) may perform on-device arbitration 910 (e.g., local arbitration) to select from multiple representations of the utterance 902. For example, the first device 110a(1) may receive augmented data 930 from one or more devices 110 and may perform on-device arbitration 910 to select augmented data 930 corresponding to a single representation of the utterance 902.

FIG. 9 illustrates an example of the first device 110a(1) performing augmented arbitration 900, which may occur when the first device 110a(1), the second device 110b, and/or the fourth device 110d can communicate directly via the private network 10. For example, the second device 110b may send first augmented data 930a to the first device 110a(1) via the private network 10, while the fourth device 110d may send second augmented data 930b to the first device 110a(1) via the private network 10. In some examples, the augmented data 930 may include audio data along with additional sensor data that may be beneficial in identifying a location associated with the user. Thus, the second device 110b may generate the first augmented data 930a representing the utterance 902 and first sensor data and may send the first augmented data 930a to the first device 110a(1), while the fourth device 110d may generate second augmented data 930b representing the utterance 902 and second sensor data and may send the second augmented data 930*b* to the first device 110*a*(1).

In the example illustrated in FIG. 9, on-device arbitration 910 corresponds to selecting between the first augmented data 930*a* and the second augmented data 930*b*. In some examples, the first device 110*a*(1) may perform on-device arbitration 910 based on wakeword occurrence times associated with the augmented data 930. For example, the first device 110*a*(1) may determine a first wakeword occurrence time (WT1) associated with the first augmented data 930*a*, which corresponds to an estimated time at which the second device 110*b* detected a wakeword in the utterance 902. In addition to receiving the second augmented data 930*b* from the fourth device 110*d*, the first device 110*a*(1) may also receive a second wakeword occurrence time (WT2) associated with the second augmented data 930*b*, which corresponds to an estimated time at which the fourth device 110*d* detected the wakeword in the utterance 902.

To perform on-device arbitration 910, the first device 110*a*(1) may compare the first wakeword occurrence time (WT1) to the second wakeword occurrence time (WT2) and may select the augmented data 930 corresponding to an earliest wakeword occurrence time (WT). To illustrate an example of performing on-device arbitration 910, FIG. 9 illustrates that the first device 110*a*(1) may detect (912) an utterance and wait (914) for a first period of time (e.g., first timeout) to receive augmented data 930 from other devices 110.

The first device 110*a*(1) may wait for the first period of time to account for communication delays associated with receiving data via the private network 10. For example, while the first device 110*a*(1) may detect the utterance 902 before the first device 110*a*(1) receives the second augmented data 930*b* from the fourth device 110*d*, the fourth device 110*d* may have detected the utterance 902 first (e.g., second wakeword occurrence time (WT2) may be earlier than the first wakeword occurrence time (WT1)). Thus, the first device 110*a*(1) may start the first timeout period upon detecting the utterance 902 at the first wakeword occurrence time (WT1) (e.g., upon generating audio data based on the utterance 902, detecting a wakeword in the utterance 902, etc.), and the first device 110*a*(1) may wait for the first period of time to allow audio data or notifications to arrive at the first device 110*a*(1) within the first timeout period. In the example illustrated in FIG. 9, the first device 110*a*(1) may receive the second augmented data 930*b* and the second wakeword occurrence time (WT2) from the fourth device 110*d* within the first timeout period.

After the first period of time has elapsed (e.g., end of the first timeout period), the first device 110*a*(1) may identify the augmented data 930 received during the first period of time and may arbitrate (916) between the devices 110. For example, the first device 110*a*(1) may perform arbitration based on sensor data, user location, presence detection, determining an earliest wakeword occurrence time (WT), and/or the like. Thus, the first device 110*a*(1) may perform device arbitration to determine whether to designate the second device 110*b* or the fourth device 110*d* as a designated device to field the utterance 902. In some examples, the first device 110*a*(1) may designate the device 110 with the earliest wakeword occurrence time as the designated device to perform an action with respect to the user speech. For example, if the first device 110*a*(1) determines that the first wakeword occurrence time (WT1) (e.g., the time the second device 110*b* perceived the wakeword) is earlier than (or precedes) the second wakeword occurrence time (WT2) (e.g., the time the fourth device 110*d* perceived the wakeword), the first device 110*a*(1) may designate the second device 110*b* to perform the action with respect to the user speech. If, on the other hand, the first device 110*a*(1) determines that the second wakeword occurrence time (WT2) is earlier than (or precedes) the first wakeword occurrence time (WT1), the first device 110*a*(1) may designate the fourth device 110*d* to perform the action with respect to the user speech.

While the example described above refers to the first device 110*a*(1) performing time-based arbitration to designate the device 110 associated with the earliest wakeword occurrence time, the disclosure is not limited thereto. As the augmented data 930 may include sensor data and/or additional information, the augmented arbitration 900 enables the first device 110*a*(1) to perform arbitration based on the sensor data, a user location, presence detection, and/or the like. For example, while the second device 110*b* may be associated with an earlier wakeword occurrent time, the first device 110*a*(1) may process the augmented data 930 and determine that the user is walking from the second device 110*b* towards the fourth device 110*d*. Thus, the first device 110*a*(1) may designate the fourth device 110*d* as the designated device to perform an action with respect to the user speech.

The first device 110*a*(1) may then de-duplicate (918) additional request(s) that arrive at the first device 110*a*(1) during a second period of time (e.g., second timeout period that is longer than the first timeout period). For example, if the first device 110*a*(1) waits for other notifications or augmented data 930 to arrive at the first device 110*a*(1) during the first timeout period, performs arbitration after the first timeout period, and then receives a notification and/or augmented data from another device 110 during the second period of time, the first device 110*a*(1) may infer that the received augmented data and/or notification(s) correspond to the same utterance 902, and may de-duplicate by deleting the audio data, and/or ignoring the notification so that two actions 904 are not output based on a single utterance 902. To illustrate an example, the first device 110*a*(1) may perform on-device arbitration 910 to determine that the first augmented data 930*a* corresponds to the utterance 902. Thus, the first device 110*a*(1) may select the first augmented data 930*a*, may send arbitration data 940 to the second device 110*b*, and may ignore duplicate representations of the utterance 902 (e.g., the second augmented data 930*b*).

Performing the action with respect to the user speech may include continuing to capture the user speech corresponding to the utterance 902 via a microphone of the designated device (e.g., continue generating audio data). In other words, on-device arbitration 910 may determine a most appropriate device to "listen" for sound representing user speech in the environment. For example, a duration of the utterance 902 may be longer than the time it takes to perform on-device arbitration 910, and, as such, a designated device can be determined for continuing to "listen" to the utterance 902. In some examples, the first device 110*a*(1) may send a command to stop generating the audio data to each of the devices 110 that were not selected as the designated device. For example, if the on-device arbitration 910 selects the second device 110*b* as the designated device, the first device 110*a*(1) may send a command to the fourth device 110*d* directing the fourth device 110*d* to stop generating the second audio data. Alternatively, if the on-device arbitration 910 selects the fourth device 110*d* as the designated device, the first device 110*a*(1) may send a command to the second device 110*b* directing the second device 110*b* to stop generating the first audio data.

Additionally or alternatively, the on-device arbitration 910 may determine the appropriate device 110 to perform an action 904 responsive to the utterance 902. For example, the on-device arbitration 910 may determine that the designated device should perform the action 904 and generate output audio responsive to the utterance 902. However, the disclosure is not limited thereto, and the system 100 may designate an output device 110 using any technique known to one of skill in the art without departing from the disclosure. For example, despite the fourth device 110d perceiving the wakeword earlier, the system 100 may designate the second device 110b to generate the output audio based on a number of loudspeakers, a quality of output audio, and/or the like without departing from the disclosure.

Regardless of which device 110 was designated as the device to perform the action, after performing on-device arbitration 910 the first device 110a(1) may perform language processing on the selected audio data (e.g., audio data included in the selected augmented data 930). For example, the first device 110a(1) may perform language processing to process the selected audio data (e.g., by performing ASR on the audio data to generate ASR data, then performing NLU on the ASR data, etc., although the disclosure is not limited thereto) and generate directive data.

The directive data corresponds to a command to perform an action 904 responsive to the utterance 902. In the example illustrated in FIG. 9, the utterance 902 (e.g., "What time is it?") corresponds to a user query and the first device 110a(1) may generate directive data corresponding to an action 904 that is responsive to the user query, such as generating an audible response with the current time (e.g., a text-to-speech (TTS) response saying "It is 12:30 PM"). The first device 110a(1) may cause the action 904 to be performed using any techniques known to one of skill in the art without departing from the disclosure. For example, the first device 110a(1) may execute the directive data (e.g., generate output audio corresponding to the audible response), send the directive data to the second device 110b in order to direct the second device 110b regarding how to respond to the user speech (e.g., directing the second device 110b to generate the output audio), and/or the like.

It is to be appreciated that the first device 110a(1) may perform arbitration in step 916 based on additional types of data, which may be considered in combination with or instead of the aforementioned "time-based data" that corresponds to the wakeword occurrence times. For example, the arbitration processing may include "energy data", which may correspond to a signal strength value (e.g., SNR) associated with a detected utterance. Additionally or alternatively, the arbitration processing may include "contextual data" (e.g., a current state of the device(s) that detects an utterance, a last-used device, an ASR and/or NLU output, etc.), although the disclosure is not limited thereto.

Figure 10A:
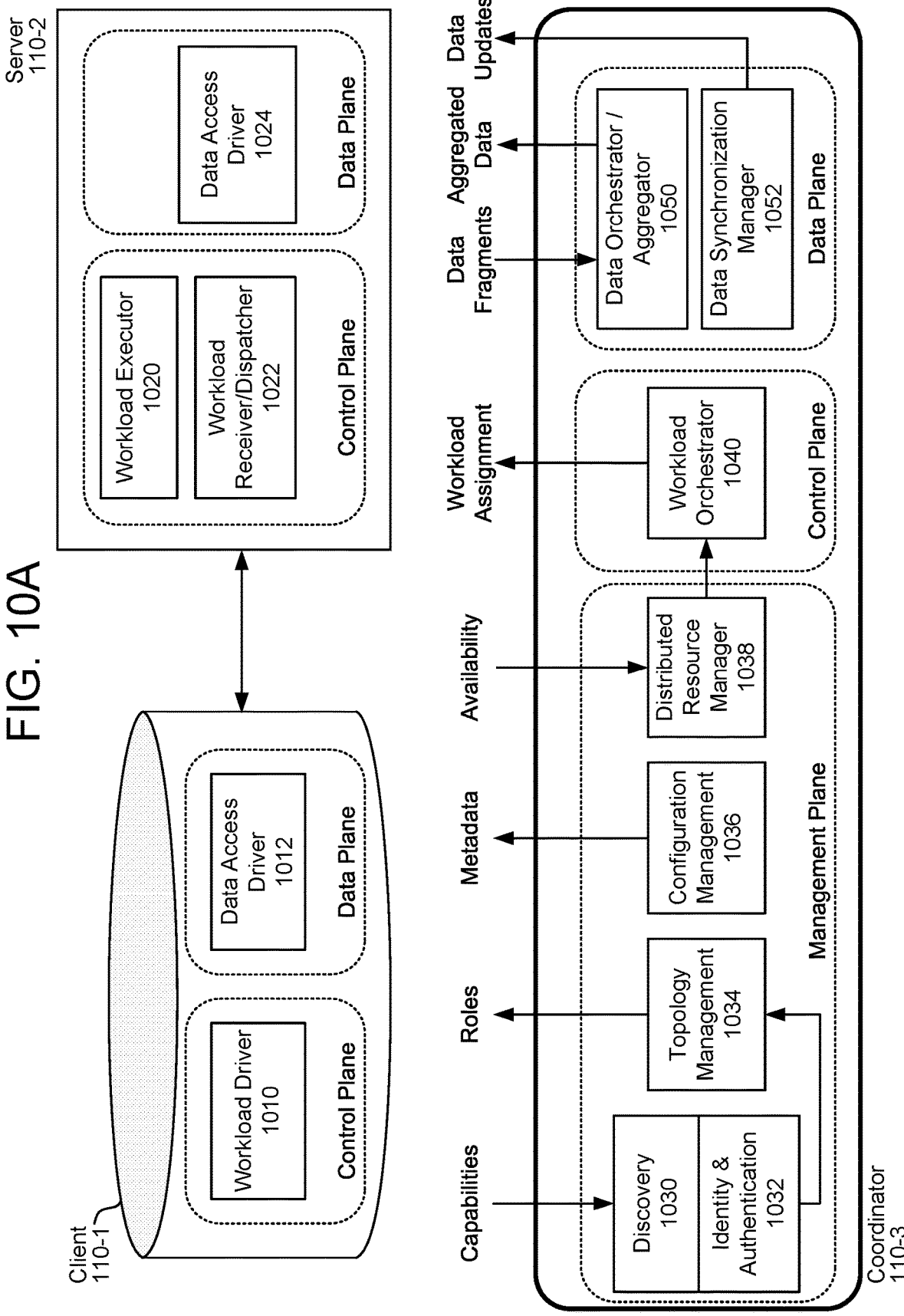
FIG. 10A is a component diagram illustrating an example of a distributed computing framework according to embodiments of the present disclosure.

FIG. 10A is a component diagram illustrating an example of a distributed computing framework according to embodiments of the present disclosure. As illustrated in FIG. 10A, the distributed computing framework includes components that are distributed between a client device 110-1 configured to request an action, a server device 110-2 configured to execute the action, and/or a coordinator device 110-3 (e.g., leader device) configured to manage the distributed computing framework. In some examples, the server device 110-2 and the coordinator device 110-3 correspond to separate devices, such that the coordinator device 110-3 manages the distributed resources and routes the request to the server device 110-2 to be executed. For example, the second device 110b (e.g., client device 110-1) may generate a workload request, the first device 110a (e.g., coordinator device 110-3) may route the workload request to the fourth device 110d (e.g., server device 110-2), and the fourth device 110d may execute the workload request. However, the disclosure is not limited thereto, and in other examples the server device 110-2 and the coordinator device 110-3 correspond to the same device without departing from the disclosure. For example, the second device 110b (e.g., client device 110-1) may generate the workload request and the first device 110a (e.g., both server device 110-2 and coordinator device 110-3) may execute the workload request.

As illustrated in FIG. 10A, the distributed computing framework includes components that correspond to a control plane, a data plan, or a management plan. For example, components associated with the control plane enable the devices 110 to execute workload requests across the distributed computing framework, components associated with the data plane enable the devices 110 to access storage and/or sensor data associated with other devices 110, and components associated with the management plane manage the distributed resources and coordinate execution of the workload requests based on an availability of distributed resources.

As illustrated in FIG. 10A, the control plane is associated with a workload driver component 1010 on the client device 110-1, a workload executor component 1020 and a workload receiver/dispatcher component 1022 associated with the server device 110-2, and a workload orchestrator component 1040 associated with the coordinator device 110-3. The workload driver component 1010 may receive local workload submissions and publish the workload submissions to the workload orchestrator component 1040 for distribution. In addition, the workload driver component 1010 may receive workload execution requests and forward them to a local workload executor component 1020. Essentially, the workload driver component 1010 abstracts distributed computing from clients of the workload. The workload orchestrator component 1040 is configured to match quality of service requirements of the workload with resource availability, may split the workloads, and/or coordinate execution dependency. The workload receiver/dispatcher component 1022 may be configured to deliver the workload to the workload executor component 1020, including delivering any artifacts and installing them locally. Finally, the workload executor component 1020 may be configured to adapt the workload to the local execution environment.

As illustrated in FIG. 10A, the data plane is associated with a data access driver component 1012 on the client device 110-1, a data access driver component 1024 on the server device 110-2, and a data orchestrator/aggregator component 1050 and a data synchronization manager component 1052 associated with the coordinator device 110-3. The data access driver component 1012/1024 may be configured to redirect requests for local storage and/or sensor data to the data orchestrator/aggregator component 1050 and to respond to requests from the data orchestrator/aggregator component 1050 regarding local storage and/or sensor data. The data orchestrator/aggregator component 1050 may be configured to dereference storage requests to where the data is authored, where the capacity is available, or to the appropriate sensor(s). In some examples, the data orchestrator/aggregator component 1050 may aggregate from multiple nodes if necessary. Finally, the data synchronization manager component 1052 may be configured to replicate storage and/or sensor data across devices associated with the distributed computing framework.

As illustrated in FIG. 10A, the management plane is associated with components included on the coordinator device 110-3, which enables participation in the distributed computing framework by managing device(s) 110 and resource(s). For example, the management plane includes a discovery component 1030, an identity and authentication component 1032, topology management component 1034, configuration management component 1036, and a distributed resource manager component 1038. The discovery component 1030 may be configured to discover nodes in the local network, such as devices 110, smart devices, and/or the like, which will be included in the distributed computing framework. Working in conjunction with the discovery component 1030, the identity and authentication component 1032 may be configured to perform authentication/authorization for nodes to join the distributed computing framework. The topology management component 1034 may be configured to determine a topology of the distributed computing framework (e.g., device map) and is considered a source of truth on nodes in the local network and their characteristics. The configuration management component 1036 may be configured to deliver configurations across the network ahead of workload execution. Finally, the distributed resource manager component 1038 may be configured to manage a registry of resources per device, monitor resource availability, and/or replicate the information in a coordinator node (e.g., coordinator device 110-3) to enable access by the entire distributed computing framework.

As illustrated in FIG. 10A, the components of the coordinator device 110-3 work together to manage the distributed resources and coordinate workload requests across the distributed computing framework. For example, the coordinator device 110-3 may determine capabilities of resources/devices associated with the distributed computing framework using the discovery component 1030 and the identity and authentication component 1032. Based on the capabilities discovered, the topology management component 1034 may determine a topology (e.g., device map) and/or distribute roles to the resources/devices included in the distributed computing framework. Similarly, the configuration management component 1036 may send metadata associated with the configurations ahead of workload execution.

To coordinate execution of workload requests, the coordinator device 110-3 may determine an availability of distributed resources using the distributed resource manager component 1038. In some examples, the coordinator device 110-3 may passively receive updates from resources/devices in the distributed computing framework indicating their availability. The disclosure is not limited thereto, however, and in other examples the coordinator device 110-3 may actively query the resources/devices about their availability. For example, the distributed resource manager component 1038 may query the resources/devices periodically or in response to individual workload requests, although the disclosure is not limited thereto. Based on the updates received from the resources/devices included in the distributed computing framework, the distributed resource manager component 1038 may determine an availability of distributed resources. Based on the availability of distributed resources, the workload orchestrator component 1040 may manage and coordinate the distributed resources, which may include sending a workload assignment to distributed resource(s).

Figure 10B:
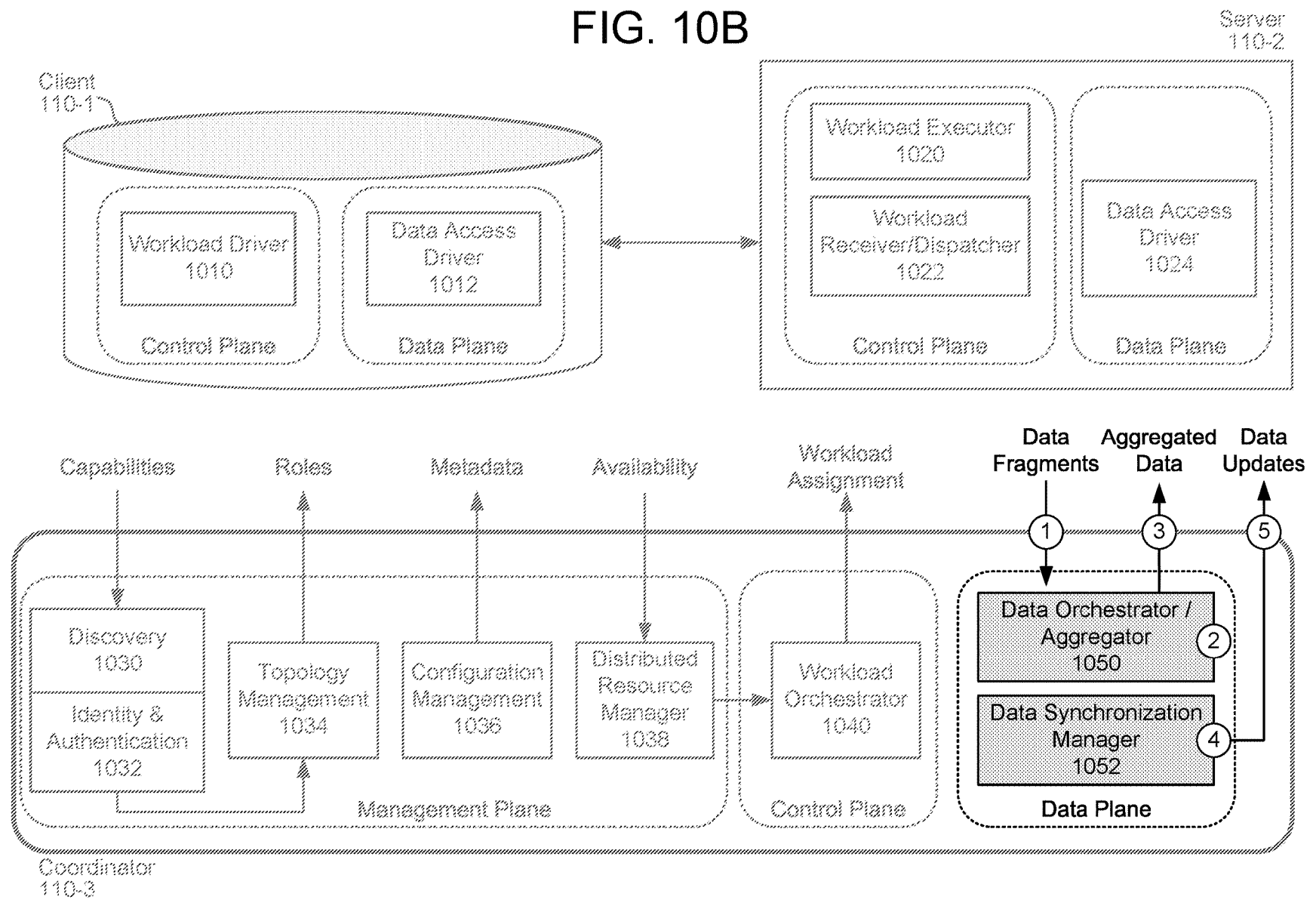

FIG. 10B is a component diagram illustrating an example of data distribution and synchronization using a distributed computing framework according to embodiments of the present disclosure. To coordinate data across the distributed computing framework, the data orchestrator/aggregator component 1050 may receive data fragments from individual resources/devices (step "1"), may combine two or more data fragments to generate aggregated data (step "2"), and may send aggregated data to the resources/devices (step "3"). Additionally or alternatively, the data synchronization manager component 1052 may determine data updates using the data fragments and/or other input data (step "4") and may send data updates to the resources/devices (step "5").

As mentioned above, the data synchronization manager component 1052 may be configured to replicate storage and/or sensor data across devices associated with the distributed computing framework. For example, the data synchronization manager component 1052 may aggregate sensor data across multiple devices and distribute the aggregated sensor data to these devices, enabling an individual device to process sensor data from nearby devices. As the aggregated sensor data combines sensor data from multiple devices and/or includes enhanced sensor data associated with unique sensors, the aggregated sensor data may provide additional context that is beneficial to the distributed computing framework and/or may extend functionality across the distributed computing framework. Thus, a device may process the aggregated sensor data to confirm user identification, improve user localization, arbitrate wakeword detection between multiple devices, and/or the like.

In some examples, the data synchronization manager component 1052 may be configured to monitor device states across the distributed computing framework. For example, the data synchronization manager component 1052 may be configured to monitor a device state for individual resources/devices and/or propagate device state(s) to other devices in the distributed computing framework. To enable data collaboration between the resources/devices in the distributed computing framework, the data synchronization manager component 1052 may abstract local data storage queries to dynamically map to data storage of the device configured to control the data storage component and/or distributed resource requested.

As described above, the system 100 may enable a distributed computing framework by centrally tracking each device's connection abilities (i.e. protocols supported and appliances reachable) using the discovery component 1030 and the topology management component 1034. Thus, the distributed computing framework tracks each participant's potential capabilities and designates different participants to perform a subset of those responsibilities, course correcting based on which of those responsibilities were acknowledged by the workload orchestrator component 1040. For example, each device 110 can declare the protocols they can support, get elected to be local control authority for all endpoints supporting those protocols, and report back smart devices reachable through that device 110 along with any quality metrics. Any local control of a smart device can then be delegated to the best device 110 connected to that smart device.

Figure 11:
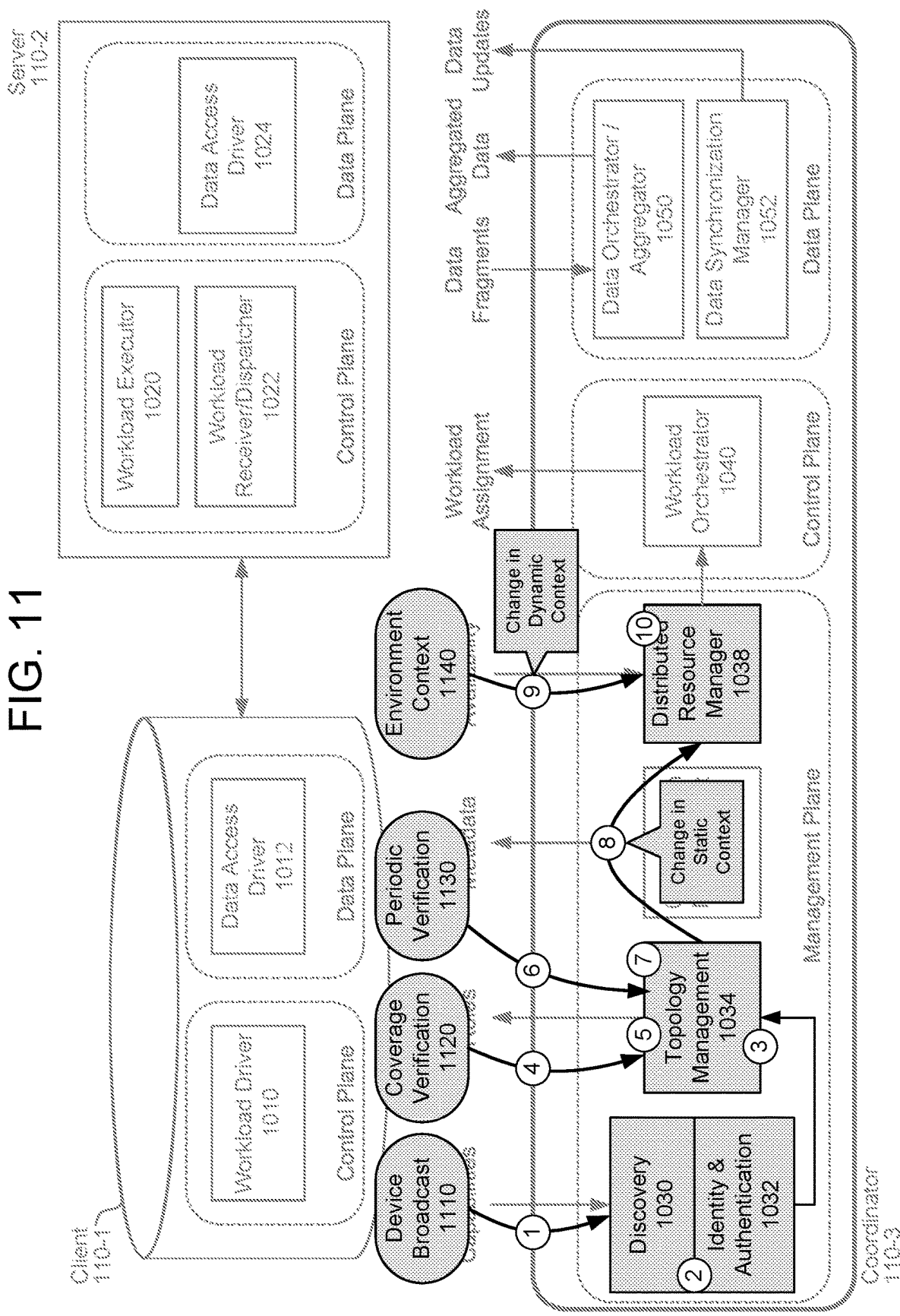
FIG. 11 is a component diagram illustrating an example of monitoring availability of local distributed resources using a distributed computing framework according to embodiments of the present disclosure.

FIG. 11 is a component diagram illustrating an example of monitoring availability of local distributed resources using a distributed computing framework according to embodiments of the present disclosure. Although FIG. 11, and other figures/discussion illustrate the operation of the system in a particular order, the steps described may be performed in a different order (as well as certain steps removed or added) without departing from the intent of the disclosure.

As illustrated in FIG. 11, the management plane of the coordinator device 110-3 may monitor the availability of the distributed resources by (i) performing topology management to determine resources/devices connected to the distributed computing framework (e.g., detect when devices connect/disconnect and update the device map accordingly) and (ii) determining current availability of the resources/devices monitored by the topology management component 1034 (e.g., determine current workloads and an amount of available resources, such as available processing).

As illustrated in FIG. 11, the coordinator device 110-3 may perform topology management using three overlapping processes, which correspond to new devices connecting (e.g., device broadcast 1110), existing devices rebooting (e.g., coverage verification 1120), and/or the topology management component 1034 querying resources/devices, although the disclosure is not limited thereto.

When a new device connects to the distributed computing framework, the coordinator device 110-3 may detect the new device and update the device map accordingly. For example, the discovery component 1030 may receive a broadcast (e.g., device broadcast), a beacon, a connection request, and/or the like without departing from the disclosure. In some examples, the discovery component 1030 may monitor one or more wireless channels and detect a probe request from an unknown device. As illustrated in FIG. 11, the discovery component 1030 may receive a device broadcast 1110 (step "1") and the discovery component 1030 and/or the identity and authentication component 1032 may perform authentication/authorization (step "2"). For example, the identity and authentication component 1032 may verify that the device is associated with the account, although the disclosure is not limited thereto. In response to the new device being identified and authenticated, the topology management component 1034 may update the device map (step "3").

When an existing device restarts or reboots, the device may perform coverage verification on boot-up. For example, the rebooting device may detect resources/devices connected via the distributed computing framework and/or may send queries to the resources/devices to verify previous coverage (e.g., confirm that the device map is accurate). Thus, device may perform coverage verification 1120 and send an update to the topology management component 1034 (step "4"). In response to the coverage verification 1120, the topology management component 1034 may update the device map (step "5").

In some examples, the topology management component 1034 may periodically query the resources/devices included in the device map to confirm coverage. For example, the topology management component 1034 may perform periodic verification 1130 by sending queries and receiving responses from the connected resources/devices (step "6"). In response to the periodic verification 1130, the topology management component 1034 may update the device map (step "7").

A topology of the distributed computing framework corresponds to the resources/devices connected to the distributed computing framework. Thus, the topology management component 1034 may generate and update a device map indicating all of the resources/devices connected to the distributed computing framework at a specific time. The topology of the environment may be referred to as a static context of the environment, which may include the resources/devices connected, the device map, a physical layout of the environment, relative distances between the devices, and/or the like. Thus, changes detected by the topology management component 1034 (e.g., changes in the device map) may correspond to changes in the static context of the environment.

While a configuration of the distributed computing framework (e.g., resources/devices connected) corresponds to the static context of the environment, a current state of the environment (e.g., current processing being performed, detected events, etc.) corresponds to a dynamic context of the environment. For example, the dynamic context may reflect current device state(s) (e.g., device state(s) associated with resources/devices and/or smart devices), sensor data (e.g., aggregate sensor data generated by one or more devices), events detected (e.g., acoustic event), and/or other contextual awareness. In some examples, the distributed resource manager component 1038 may determine availability of distributed resource(s) based on changes in dynamic context.

As illustrated in FIG. 11, the distributed resource manager component 1038 may retrieve a current topology (e.g., device map) from the topology management component 1034 (step "8") and determine an environment context 1140 (step "9"). Thus, the distributed resource manager component 1038 may detect a change in static context (e.g., change in topology) in step "8" and may detect a change in dynamic context (e.g., detect acoustic event and/or change in current state(s)) in step "9." Using these inputs, the distributed resource manager component 1038 may be configured to determine an availability of distributed resources based on contextual awareness of the environment (step "10"). As will be described in greater detail below, the availability of the distributed resources is used by the workload orchestrator component 1040 to coordinate routing and execution of workload requests.

Figure 12:
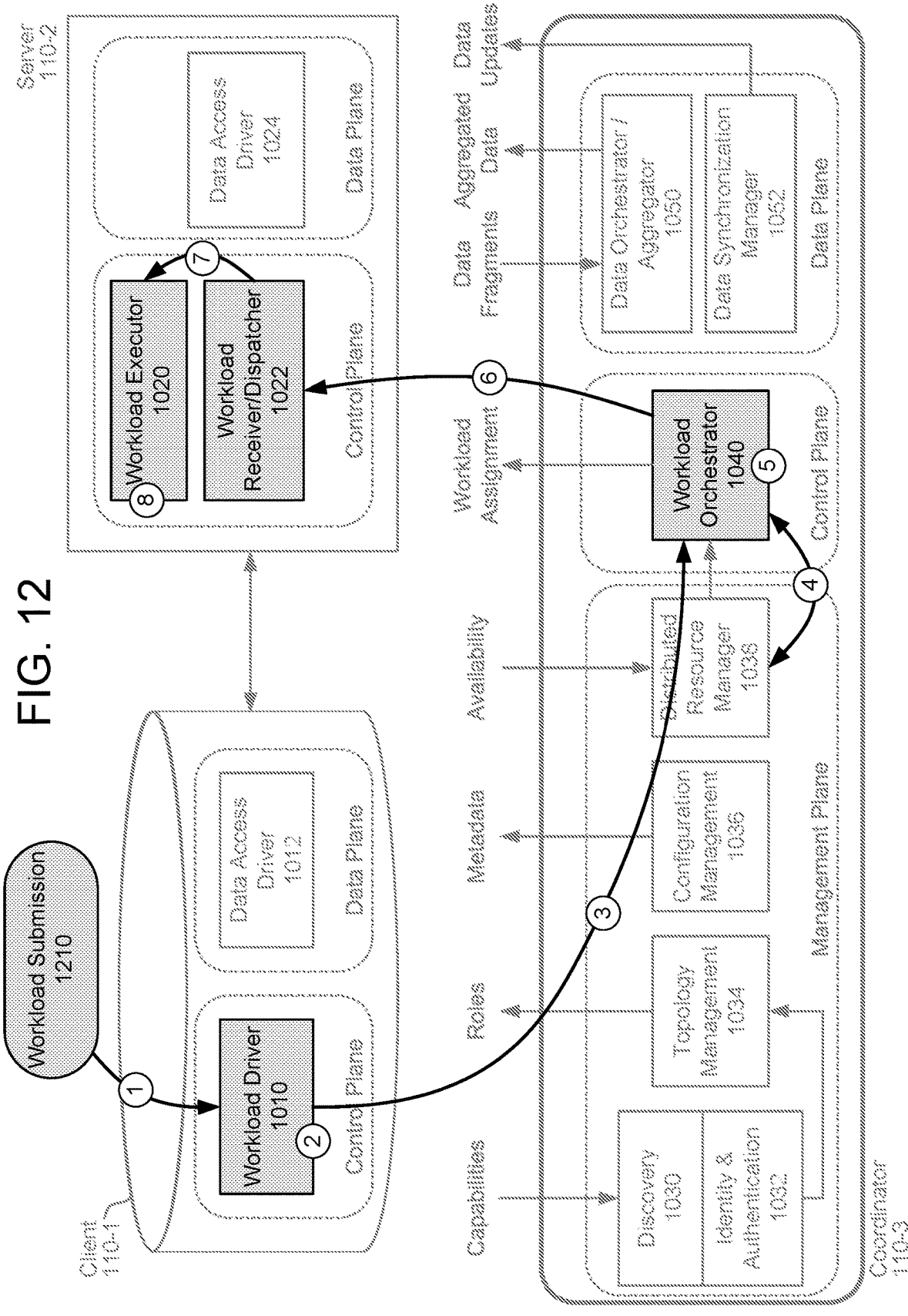
FIG. 12 is a component diagram illustrating an example of workload routing and execution using a distributed computing framework according to embodiments of the present disclosure.

FIG. 12 is a component diagram illustrating an example of workload routing and execution using a distributed computing framework according to embodiments of the present disclosure. As illustrated in FIG. 12, the workload driver component 1010 on a client device 110-1 may receive a workload submission 1210 (step "1"), may determine information about routing and/or the workload orchestrator component 1040 (step "2"), and may publish the workload request to the workload orchestrator component 1040 (step "3"). The workload orchestrator component 1040 may communicate with the distributed resource manager component 1038 to determine availability of distributed resources (step "4"), and may match quality of service requirements of the workload request with resource availability to determine how to route the workload request (step "5").

As illustrated in FIG. 12, the workload orchestrator component 1040 may route the workload request to the workload receiver/dispatcher component 1022 (step "6"). While not illustrated in FIG. 12, in some examples, the workload orchestrator component 1040 may split the workload request and/or coordinate execution dependency. The workload receiver/dispatcher component 1022 may deliver the workload request to the workload executor component 1020 (step "7") and the workload executor component 1020 may adapt the workload to the local execution environment (e.g., container, local skills) and execute the workload request (step "8"). Thus, the control plane enables the distributed computing framework to collectively execute workloads, whether locally (e.g., executing the workload on the client device 110-1) or by delegating the workload to another resource/device with spare capacity (e.g., executing the workload on the server device 110-2).

Figure 13:
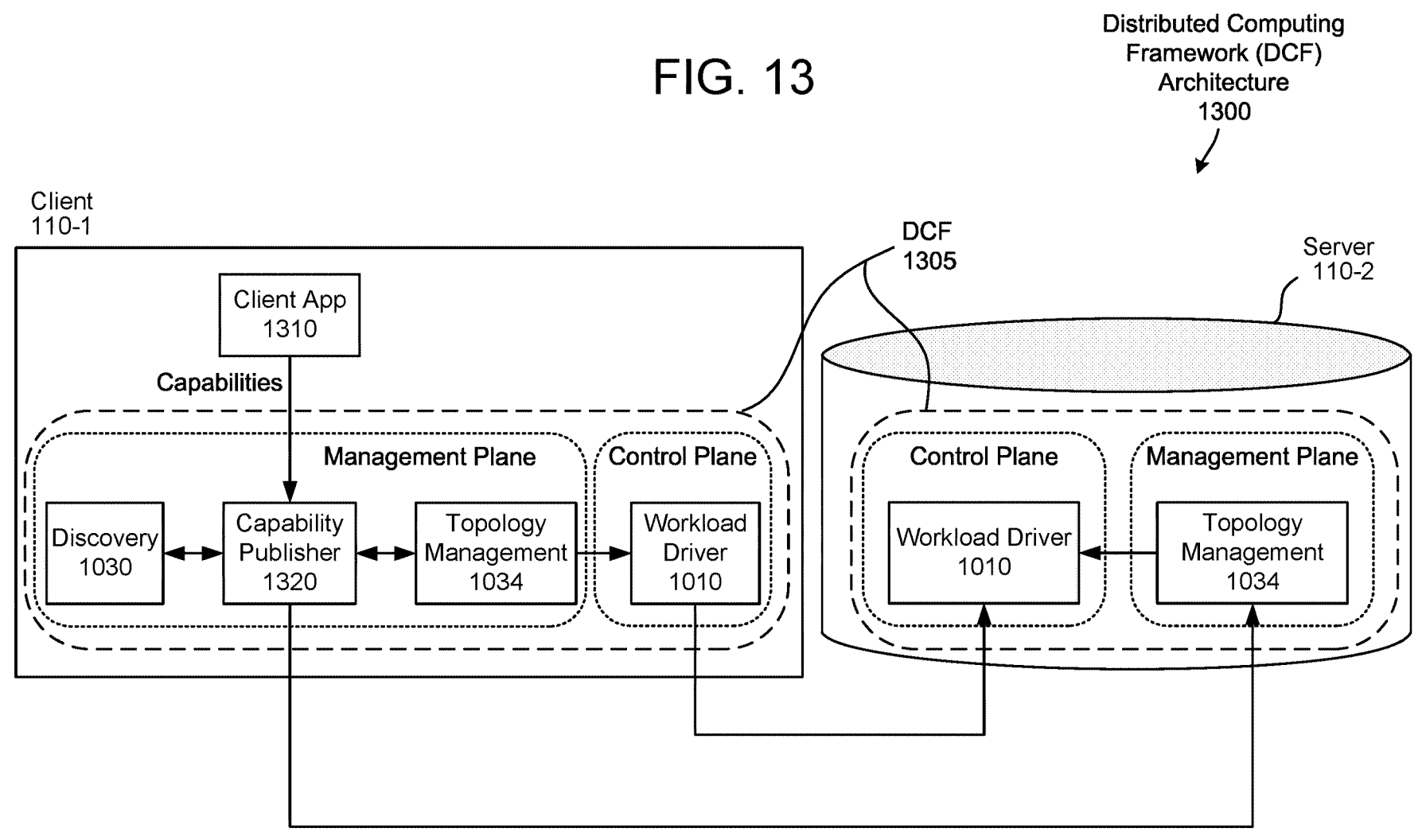

FIG. 13 is a component diagram illustrating an example of a distributed computing framework architecture according to embodiments of the present disclosure. To conceptually illustrate the process of delegating and routing workload requests, FIG. 13 illustrates an example of distributed computing framework (DCF) architecture 1300 without illustrating the coordinator device 110-3. As illustrated in FIG. 13, the client device 110-1 may interface with the DCF 1305 using a client application 1310 (e.g., client app) that is associated with the client device 110-1 but exists outside the DCF 1305. For example, the client app 1310 may send capabilities to a capability publisher component 1320 within the DCF 1305.

The capability publisher component 1320 may be associated with the management plane and may communicate with other components within the management plane. For example, the capability publisher component 1320 may communicate with the discovery component 1030, a first topology management component 1034a, and/or the like. While FIG. 10A described these components with regard to the coordinator device 110-3, the disclosure is not limited thereto and the client device 110-1 may include local versions of these components without departing from the disclosure. The first topology management component 1034a may send information about the topology (e.g., device map) and/or the like to a first workload driver component 1010a associated with the client device 110-1.

As illustrated in FIG. 13, the capability publisher component 1320 may send capabilities and/or additional information to a second topology management component 1034b associated with the server device 110-2. In addition, the first workload driver component 1010a may send the workload request to a second workload driver component 1010b associated with the server device 110-2.

Figure 14:
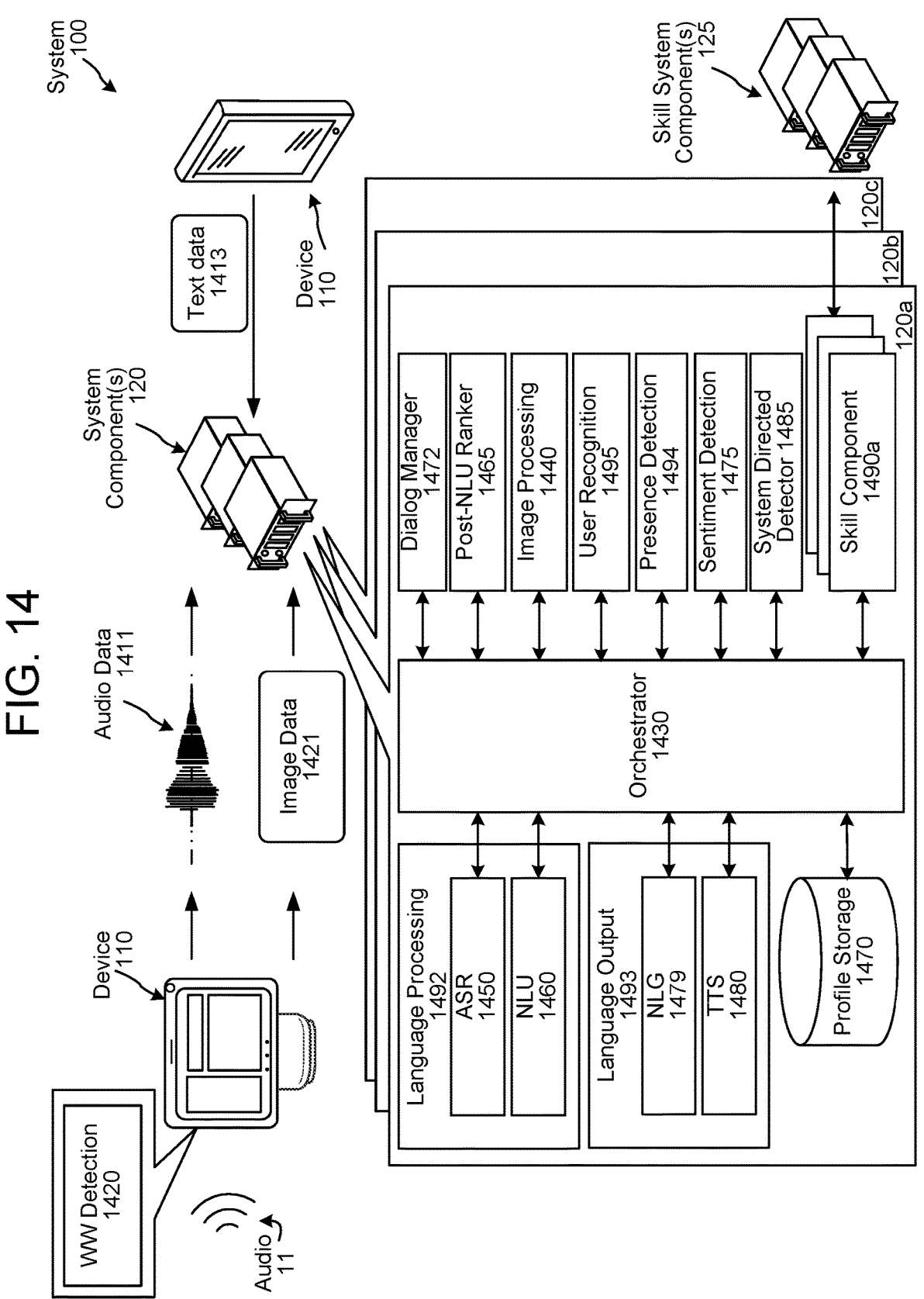
FIG. 14 is a conceptual diagram of components of the system to execute virtual assistant functionality, according to embodiments of the present disclosure.

The system 100 may operate using various components as described in FIG. 14. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s). In at least some embodiments, such determination may be made using a wakeword detection component 1420 (e.g., wakeword detector). The wakeword detection component 1420 may be configured to detect various wakewords. In at least some examples, each wakeword may correspond to a name of a different digital assistant. An example wakeword/digital assistant name is "Alexa." In another example, input to the system may be in form of text data 1413, for example as a result of a user typing an input into a user interface of device 110. Other input forms may include indication that the user has pressed a physical or virtual button on device 110, the user has made a gesture, etc. The device 110 may also capture images using camera(s) 2418 of the device 110 and may send image data 1421 representing those image(s) to the system component(s). The image data 1421 may include raw image data or image data processed by the device 110 before sending to the system component(s). The image data 1421 may be used in various manners by different components of the system to perform operations such as determining whether a user is directing an utterance to the system, interpreting a user command, responding to a user command, etc.

The wakeword detection component 1420 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1420 and/or input is detected by an input detector, the device 110 may "wake" and begin transmitting audio data 1411, representing the audio 11, to the system component(s) 120. The audio data 1411 may include data corresponding to the wakeword; in other embodiments, the portion of the audio corresponding to the wakeword is removed by the device 110 prior to sending the audio data 1411 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1420 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill(s) 1490 of one or more system component(s) 120.

The device 110 may also include a system directed input detector component 1585. (The system component(s) may also include a system directed input detector 1485 which may operate in a manner similar to system directed input detector component 1585.) The system directed input detector component 1585 may be configured to determine whether an input to the system (for example speech, a gesture, etc.) is directed to the system or not directed to the system (for example directed to another user, etc.). The system directed input detector component 1585 may work in conjunction with the wakeword detection component 1420. If the system directed input detector component 1585 determines an input is directed to the system, the device 110 may "wake" and begin sending captured data for further processing (for example, processing audio data using the language processing component 1492/1592, processing captured image data using image processing component 1440/1540 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector component 1585 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector component 1585 is determining whether an input is potentially device directed. For example, the system may output an orange indicator while considering an input, and may output a green indicator if a system directed input is detected. Other such configurations are possible. Further details regarding the system directed input detector component 1585 are included below with regard to FIG. 17.

Upon receipt by the system component(s) 120, the audio data 1411 may be sent to an orchestrator component 1430. The orchestrator component 1430 may include memory and logic that enables the orchestrator component 1430 to transmit various pieces and forms of data to various components of the system, as well as perform other operations as described herein.

The orchestrator component 1430 may send the audio data 1411 to a language processing component 1492. The language processing component 1492 (sometimes also referred to as a spoken language understanding (SLU) component) includes an automatic speech recognition (ASR) component 1450 and a natural language understanding (NLU) component 1460. The ASR component 1450 may transcribe the audio data 1411 into text data. The text data output by the ASR component 1450 represents one or more than one (e.g., in the form of an N-best list) ASR hypotheses representing speech represented in the audio data 1411. The ASR component 1450 interprets the speech in the audio data 1411 based on a similarity between the audio data 1411 and pre-established language models. For example, the ASR component 1450 may compare the audio data 1411 with models for sounds (e.g., acoustic units such as phonemes, senons, phones, etc.) and sequences of sounds to identify words that match the sequence of sounds of the speech represented in the audio data 1411. The ASR component 1450 sends the text data generated thereby to an NLU component 1460, via, in some embodiments, the orchestrator component 1430. The text data sent from the ASR component 1450 to the NLU component 1460 may include a single top-scoring ASR hypothesis or may include an N-best list including multiple top-scoring ASR hypotheses. An N-best list may additionally include a respective score associated with each ASR hypothesis represented therein. The ASR component 1450 is described in greater detail below with regard to FIG. 16.

The speech processing system 1492 may further include a NLU component 1460. The NLU component 1460 may receive the text data from the ASR component. The NLU component 1460 may attempts to make a semantic interpretation of the phrase(s) or statement(s) represented in the text data input therein by determining one or more meanings associated with the phrase(s) or statement(s) represented in the text data. The NLU component 1460 may determine an intent representing an action that a user desires be performed and may determine information that allows a device (e.g., the device 110, the system component(s) 120, a skill component 1490, a skill system component(s) 125, etc.) to execute the intent. For example, if the text data corresponds to "play the 5th Symphony by Beethoven," the NLU component 1460 may determine an intent that the system output music and may identify "Beethoven" as an artist/composer and "5th Symphony" as the piece of music to be played. For further example, if the text data corresponds to "what is the weather," the NLU component 1460 may determine an intent that the system output weather information associated with a geographic location of the device 110. In another example, if the text data corresponds to "turn off the lights," the NLU component 1460 may determine an intent that the system turn off lights associated with the device 110 or the user. However, if the NLU component 1460 is unable to resolve the entity—for example, because the entity is referred to by anaphora such as "this song" or "my next appointment"—the speech processing system 1492 can send a decode request to another speech processing system 1492 for information regarding the entity mention and/or other context related to the utterance. The speech processing system 1492 may augment, correct, or base results data upon the audio data 1411 as well as any data received from the other speech processing system 1492.

The NLU component 1460 may return NLU results data 1985/1925 (which may include tagged text data, indicators of intent, etc.) back to the orchestrator component 1430. The orchestrator component 1430 may forward the NLU results data to a skill component(s) 1490. If the NLU results data includes a single NLU hypothesis, the NLU component 1460 and the orchestrator component 1430 may direct the NLU results data to the skill component(s) 1490 associated with the NLU hypothesis. If the NLU results data 1985/1925 includes an N-best list of NLU hypotheses, the NLU component 1460 and the orchestrator component 1430 may direct the top scoring NLU hypothesis to a skill component(s) 1490 associated with the top scoring NLU hypothesis. The system may also include a post-NLU ranker 1465 which may incorporate other information to rank potential interpretations determined by the NLU component 1460. The local device 110 may also include its own post-NLU ranker 1565, which may operate similarly to the post-NLU ranker 1465. The NLU component 1460, post-NLU ranker 1465 and other components are described in greater detail below with regard to FIGS. 18 and 19.

A skill component may be software running on the system component(s) 120 that is akin to a software application. That is, a skill component 1490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 1490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 1490 may operate in conjunction between the system component(s) 120 and other devices, such as the device 110, in order to complete certain functions. Inputs to a skill component 1490 may come from speech processing interactions or through other interactions or input sources. A skill component 1490 may include hardware, software, firmware, or the like that may be dedicated to a particular skill component 1490 or shared among different skill components 1490.

A skill system component(s) 125 may communicate with a skill component(s) 1490 within the system component(s) 120 and/or directly with the orchestrator component 1430 or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 1490 dedicated to interacting with the skill system component(s) 125. Unless expressly stated otherwise, reference to a skill, skill device, or skill component may include a skill component 1490 operated by the system component(s) 120 and/or skill operated by the skill system component(s) 125. Moreover, the functionality described herein as a skill or skill may be referred to using many different terms, such as an action, bot, app, or the like. The skill 1490 and or skill system component(s) 125 may return output data to the orchestrator component 1430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 1472 that manages and/or monitors a dialog between a user and a device. As used herein, a "dialog" may refer to multiple related user inputs and system 100 outputs (e.g., through device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 1472 may associate a dialog session identifier with the dialog upon identifying that the user is engaging in a dialog with the user. The dialog manager component 1472 may track a user input and the corresponding system generated response to the user input as a turn. The dialog session identifier may correspond to multiple turns of user input and corresponding system generated response. The dialog manager component 1472 may transmit data identified by the dialog session identifier directly to the orchestrator component 1430 or other component. Depending on system configuration the dialog manager component 1472 may determine the appropriate system generated response to give to a particular utterance or user input of a turn. Or creation of the system generated response may be managed by another component of the system (e.g., the language output component 1493, NLG component 1479, orchestrator component 1430, etc.) while the dialog manager component 1472 selects the appropriate responses. Alternatively, another component of the system component(s) 120 may select responses using techniques discussed herein. The text of a system generated response may be sent to a TTS component 1480 for creation of audio data corresponding to the response. The audio data may then be sent to a user device (e.g., device 110) for ultimate output to the user. Alternatively (or in addition) a dialog response may be returned in text or some other form.

The dialog manager component 1472 may receive the ASR hypothesis/hypotheses (i.e., text data) and make a semantic interpretation of the phrase(s) or statement(s) represented therein. That is, the dialog manager component 1472 determines one or more meanings associated with the phrase(s) or statement(s) represented in the text data based on words represented in the text data. The dialog manager component 1472 determines a goal corresponding to an action that a user desires be performed as well as pieces of the text data that allow a device (e.g., the device 110, the system component(s) 120, a skill 1490, a skill system component(s) 125, etc.) to execute the intent. If, for example, the text data corresponds to "what is the weather," the dialog manager component 1472 may determine that that the system component(s) 120 is to output weather information associated with a geographic location of the device 110. In another example, if the text data corresponds to "turn off the lights," the dialog manager component 1472 may determine that the system component(s) 120 is to turn off lights associated with the device(s) 110 or the user(s) 5.

The dialog manager component 1472 may send the results data to one or more skill(s) 1490. If the results data includes a single hypothesis, the orchestrator component 1430 may send the results data to the skill(s) 1490 associated with the hypothesis. If the results data includes an N-best list of hypotheses, the orchestrator component 1430 may send the top scoring hypothesis to a skill(s) 1490 associated with the top scoring hypothesis.

The system component(s) includes a language output component 1493. The language output component 1493 includes a natural language generation (NLG) component 1479 and a text-to-speech (TTS) component 1480. The NLG component 1479 can generate text for purposes of TTS output to a user. For example, the NLG component 1479 may generate text corresponding to directions corresponding to a particular action for the user to perform. The NLG component 1479 may generate appropriate text for various outputs as described herein. The NLG component 1479 may include one or more trained models configured to output text appropriate for a particular input. The text output by the NLG component 1479 may become input for the TTS component 1480. Alternatively or in addition, the TTS component 1480 may receive text data from a skill 1490 or other system component for output. In some examples, the text output by the NLG component 1479 may be sent directly to the device 110 and/or a mobile device (e.g., smart phone) associated with the user. Thus, the system 100 may enable a conversational interface using the NLG component 1479, the TTS component 1480, and/or additional components, although the disclosure is not limited thereto.

The NLG component 1479 may include a trained model. The NLG component 1479 generates text data from dialog data received by the dialog manager component 1472 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates.

Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1480.

The TTS component 1480 may generate audio data (e.g., synthesized speech) from text data using one or more different methods. Text data input to the TTS component 1480 may come from a skill component 1490, the orchestrator component 1430, or another component of the system. In one method of synthesis called unit selection, the TTS component 1480 matches text data against a database of recorded speech. The TTS component 1480 selects matching units of recorded speech and concatenates the units together to form audio data. In another method of synthesis called parametric synthesis, the TTS component 1480 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user to request capture of image or video data. The device 110 may process the commands locally or send audio data 1411 representing the commands to the system component(s) 120 for processing, after which the system component(s) 120 may return output data that can cause the device 110 to engage its camera.

Upon receipt by the system component(s) 120, the image data 1421 may be sent to an orchestrator component 1430. The orchestrator component 1430 may send the image data 1421 to an image processing component 1440. The image processing component 1440 can perform computer vision functions such as object recognition, modeling, reconstruction, etc. For example, the image processing component 1440 may detect a person, face, etc. (which may then be identified using user recognition component 1495). The device may also include an image processing component 1540 which operates similarly to image processing component 1440.

In some implementations, the image processing component 1440 can detect the presence of text in an image. In such implementations, the image processing component 1440 can recognize the presence of text, convert the image data to text data, and send the resulting text data via the orchestrator component 1430 to the language processing component 1492 for processing by the NLU component 1460.

The system component(s) 120 may include a user recognition component 1495 that recognizes one or more users using a variety of data, as described in greater detail below with regard to FIG. 20. However, the disclosure is not limited thereto, and the device 110 may include a user recognition component 1595 instead of and/or in addition to user recognition component 1495 of the system component(s) 120 without departing from the disclosure. User recognition component 1595 operates similarly to user recognition component 1495.

The user recognition component 1495 may take as input the audio data 1411 and/or text data output by the ASR component 1450. The user recognition component 1495 may perform user recognition by comparing audio characteristics in the audio data 1411 to stored audio characteristics of users. The user recognition component 1495 may also perform user recognition by comparing biometric data (e.g., fingerprint data, iris data, etc.), received by the system in correlation with the present user input, to stored biometric data of users assuming user permission and previous authorization. The user recognition component 1495 may further perform user recognition by comparing image data (e.g., including a representation of at least a feature of a user), received by the system in correlation with the present user input, with stored image data including representations of features of different users. The user recognition component 1495 may perform additional user recognition processes, including those known in the art.

The user recognition component 1495 determines scores indicating whether user input originated from a particular user. For example, a first score may indicate a likelihood that the user input originated from a first user, a second score may indicate a likelihood that the user input originated from a second user, etc. The user recognition component 1495 also determines an overall confidence regarding the accuracy of user recognition operations.

Output of the user recognition component 1495 may include a single user identifier corresponding to the most likely user that originated the user input. Alternatively, output of the user recognition component 1495 may include an N-best list of user identifiers with respective scores indicating likelihoods of respective users originating the user input. The output of the user recognition component 1495 may be used to inform NLU processing as well as processing performed by other components of the system.

The system component(s) 120/device 110 may include a presence detection component 1494/1594 that determines the presence and/or location of one or more users using a variety of data, as described in greater detail below with regard to FIG. 21.

The system 100 (either on device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 1475 that may be configured to detect a sentiment of a user from audio data representing speech/utterances from the user, image data representing an image of the user, and/or the like as described in greater detail below with regard to FIG. 22. The sentiment detection component 1475 may be included in system component(s) 120, as illustrated in FIG. 14, although the disclosure is not limited thereto and the sentiment detection component 1475 may be included in other components without departing from the disclosure. For example the sentiment detection component 1575 may be included in the device 110, as a separate component, etc. Sentiment detection component 1575 may operate similarly to sentiment detection component 1475. The system component(s) may use the sentiment detection component 1475 to, for example, customize a response for a user based on an indication that the user is happy or frustrated.

Figure 15A:
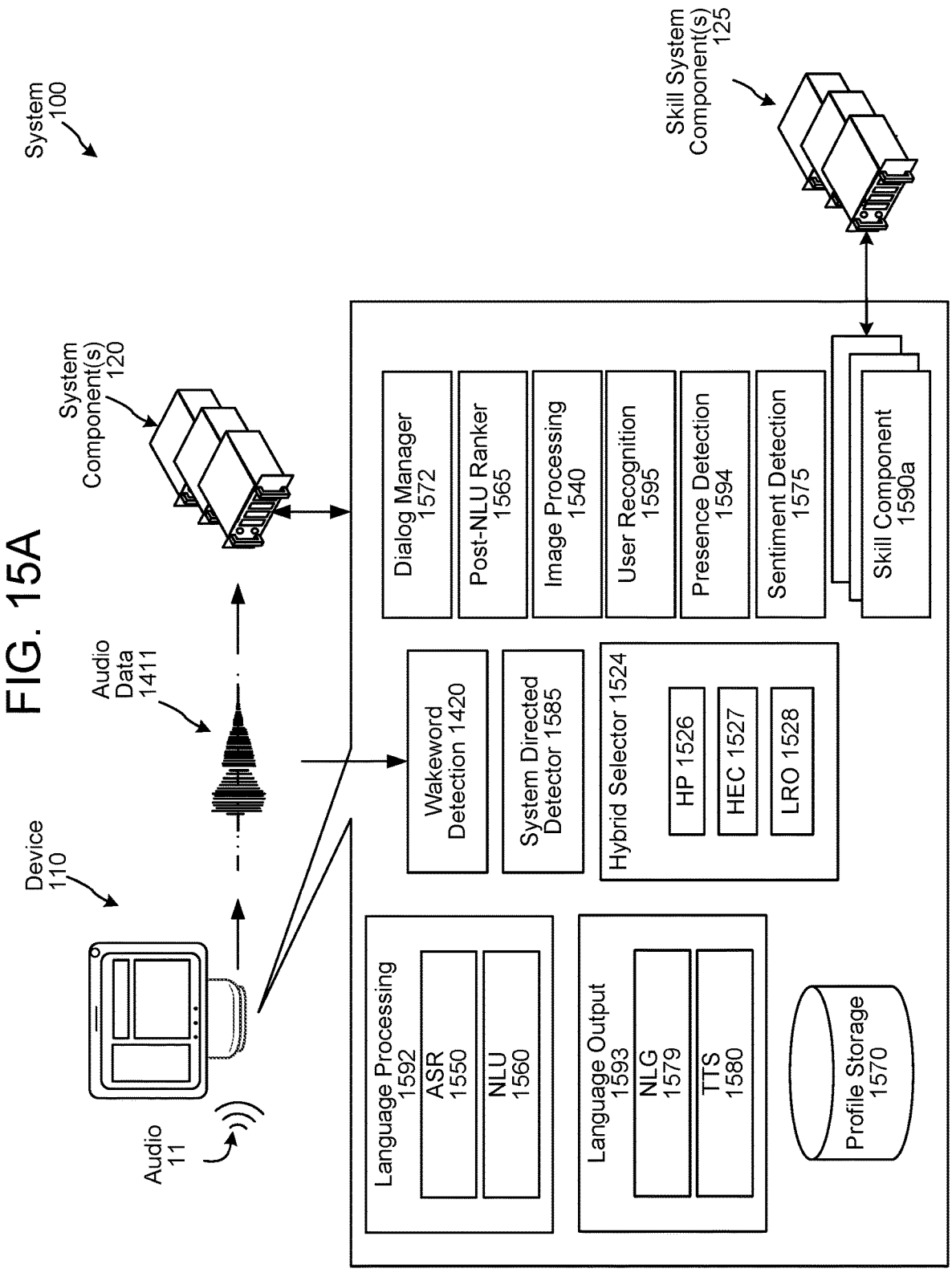
FIGS. 15A-15B are conceptual diagrams illustrating components that may be included in a speech interface device, according to embodiments of the present disclosure.
Figure 15B:
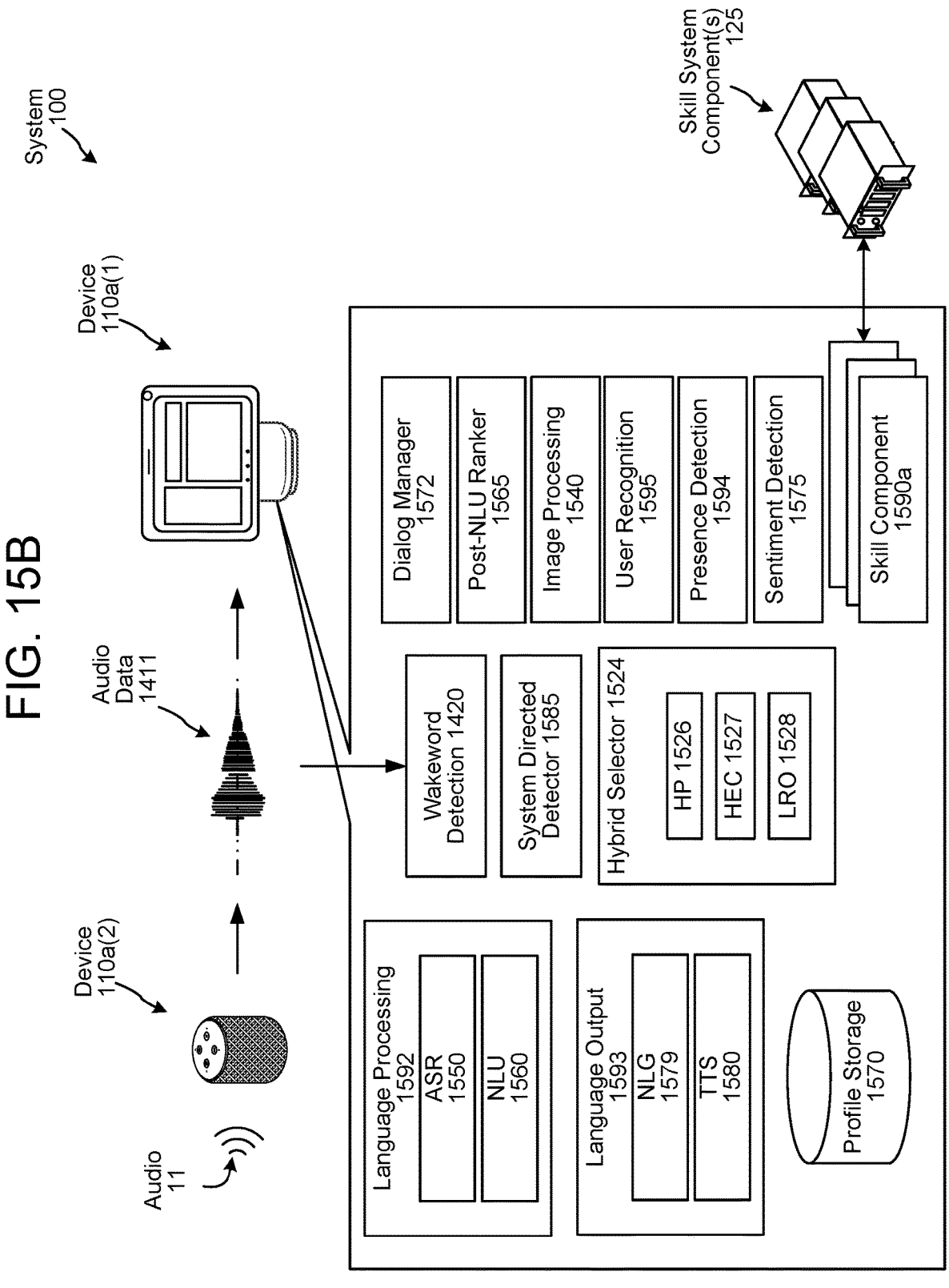

Although the components of FIG. 14 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIGS. 15A-15B illustrate such a configured device 110.

In at least some embodiments, the system component(s) may receive the audio data 1411 from the device 110, to recognize speech corresponding to a spoken input in the received audio data 1411, and to perform functions in response to the recognized speech. In at least some embodiments, these functions involve sending directives (e.g., commands), from the system component(s) to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may direct the device 110 to output an audible response (e.g., using TTS processing performed by an on-device TTS component 1580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user as part of a shopping function, establishing a communication session (e.g., a video call) between the user and another user, and so on.

As noted with respect to FIG. 14, the device 110 may include a wakeword detection component 1420 configured to compare the audio data 1411 to stored models used to detect a wakeword (e.g., "Alexa") that indicates to the device 110 that the audio data 1411 is to be processed for determining NLU output data (e.g., slot data that corresponds to a named entity, label data, and/or intent data, etc.). In at least some embodiments, a hybrid selector 1524, of the device 110, may send the audio data 1411 to the wakeword detection component 1420. If the wakeword detection component 1420 detects a wakeword in the audio data 1411, the wakeword detection component 1420 may send an indication of such detection to the hybrid selector 1524. In response to receiving the indication, the hybrid selector 1524 may send the audio data 1411 to the system component(s) and/or the ASR component 1550. The wakeword detection component 1420 may also send an indication, to the hybrid selector 1524, representing a wakeword was not detected. In response to receiving such an indication, the hybrid selector 1524 may refrain from sending the audio data 1411 to the system component(s) and may prevent the ASR component 1550 from further processing the audio data 1411. In this situation, the audio data 1411 can be discarded.

In general, the device 110 (e.g., speech interface device 110a(1)) may be capable of capturing utterances with microphone(s) and responding in various ways, such as by outputting content (e.g., audio) via an output device(s), which may be loudspeaker(s), a display(s), or any other suitable output device. In addition, the device 110a may be configured to respond to user speech by controlling other devices 110 and/or secondary devices that are collocated in the environment with the device 110a, such as by sending a command to a second device via an input/output communications interface (e.g., a short range radio), the command directing an operation to be performed at the second device (e.g., to turn on/off a light in the environment). Optimizing the utilization of on-device computing resources (e.g., processing resources, etc.) of the device 110a can a reduce latency so that the user experience with the device 110a is not negatively impacted by local processing tasks taking too long.

As illustrated in FIG. 15B, in addition to using a built-in microphone(s) to capture utterances and convert them into digital audio data, a first device 110a(1) may additionally, or alternatively, receive audio data 1411 from a second device (e.g., device 110a(2)) in the environment, such as when the second device 110a(2) captures an utterance from the user and sends the audio data to the first device 110a(1). This may occur in situations where the second device 110a(2) is closer to the user (for example, earbuds 110k) and would like to leverage the "hybrid" capabilities of the first device 110a(1).

The device 110 may conduct its own speech processing using on-device language processing components, such as an SLU/language processing component 1592 (which may include an ASR component 1550 and an NLU component 1560), similar to the manner discussed herein with respect to the SLU component 1492 (or ASR component 1450 and the NLU component 1460) of the system component(s). Language processing component 1592 may operate similarly to language processing component 1492, ASR component 1550 may operate similarly to ASR component 1450 and NLU component 1560 may operate similarly to NLU component 1460. The device 110 may also internally include, or otherwise have access to, other components such as one or more skill components 1590 capable of executing commands based on NLU output data or other results determined by the device 110/system component(s) (which may operate similarly to skill components 1490), a user recognition component 1595 (configured to process in a similar manner to that discussed herein with respect to the user recognition component 1495 of the system component(s)), profile storage 1570 (configured to store similar profile data to that discussed herein with respect to the profile storage 1470 of the system component(s)), or other components. In at least some embodiments, the profile storage 1570 may only store profile data for a user or group of users specifically associated with the device 110. Similar to as described above with respect to skill component 1490, a skill component 1590 may communicate with a skill system component(s) 125. The device 110 may also have its own language output component 1593 which may include NLG component 1579 and TTS component 1580. Language output component 1593 may operate similarly to language output component 1493, NLG component 1579 may operate similarly to NLG component 1479 and TTS component 1580 may operate similarly to TTS component 1480.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s).

The hybrid selector 1524, of the device 110, may include a hybrid proxy (HP) 1526 configured to proxy traffic to/from the system component(s). For example, the HP 1526 may be configured to send messages to/from a hybrid execution controller (HEC) 1527 of the hybrid selector 1524. For example, command/directive data received from the system component(s) can be sent to the HEC 1527 using the HP 1526. The HP 1526 may also be configured to allow the audio data 1411 to pass to the system component(s) while also receiving (e.g., intercepting) this audio data 1411 and sending the audio data 1411 to the HEC 1527.

In at least some embodiments, the hybrid selector 1524 may further include a local request orchestrator (LRO) 1528 configured to notify the ASR component 1550 about the availability of new audio data 1411 that represents user speech, and to otherwise initiate the operations of local language processing when new audio data 1411 becomes available. In general, the hybrid selector 1524 may control execution of local language processing, such as by sending "execute" and "terminate" events/directives. An "execute" event may direct a component to continue any suspended execution (e.g., by directing the component to execute on a previously-determined intent in order to determine a directive). Meanwhile, a "terminate" event may direct a component to terminate further execution, such as when the device 110 receives directive data from the system component(s) and chooses to use that remotely-determined directive data.

Thus, when the audio data 1411 is received, the HP 1526 may allow the audio data 1411 to pass through to the system component(s) and the HP 1526 may also input the audio data 1411 to the on-device ASR component 1550 by routing the audio data 1411 through the HEC 1527 of the hybrid selector 1524, whereby the LRO 1528 notifies the ASR component 1550 of the audio data 1411. At this point, the hybrid selector 1524 may wait for response data from either or both of the system component(s) or the local language processing components. However, the disclosure is not limited thereto, and in some examples the hybrid selector 1524 may send the audio data 1411 only to the local ASR component 1550 without departing from the disclosure. For example, the device 110 may process the audio data 1411 locally without sending the audio data 1411 to the system component(s).

The local ASR component 1550 is configured to receive the audio data 1411 from the hybrid selector 1524, and to recognize speech in the audio data 1411, and the local NLU component 1560 is configured to determine a user intent from the recognized speech, and to determine how to act on the user intent by generating NLU output data which may include directive data (e.g., directing a component to perform an action). Such NLU output data may take a form similar to that as determined by the NLU component 1460 of the system component(s). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 1560) may be selected as usable to respond to a natural language user input, and local response data may be sent (e.g., local NLU output data, local knowledge base information, internet search results, and/or local directive data) to the hybrid selector 1524, such as a "ReadyToExecute" response. The hybrid selector 1524 may then determine whether to use directive data from the on-device components to respond to the natural language user input, to use directive data received from the system component(s), assuming a remote response is even received (e.g., when the device 110 is able to access the system component(s) over the network(s) 199), or to determine output audio requesting additional information from the user.

The device 110 and/or the system component(s) may associate a unique identifier with each natural language user input. The device 110 may include the unique identifier when sending the audio data 1411 to the system component(s), and the response data from the system component(s) may include the unique identifier to identify which natural language user input the response data corresponds.

In at least some embodiments, the device 110 may include, or be configured to use, one or more skill components 1590 that may work similarly to the skill component(s) 1490 implemented by the system component(s). The skill component(s) 1590 may correspond to one or more domains that are used in order to determine how to act on a spoken input in a particular way, such as by outputting a directive that corresponds to the determined intent, and which can be processed to implement the desired operation. The skill component(s) 1590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill system component(s) 125. For example, a skill system component(s) 125 may be located in a remote environment (e.g., separate location) such that the device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the device 110 may communicate with the skill system component(s) 125 via a private network, such as a local area network (LAN).

As used herein, a "skill" may refer to a skill component 1590, a skill system component(s) 125, or a combination of a skill component 1590 and a corresponding skill system component(s) 125.

Similar to the manner discussed with regard to FIG. 14, the local device 110 may be configured to recognize multiple different wakewords and/or perform different categories of tasks depending on the wakeword. Such different wakewords may invoke different processing components of local device 110 (not illustrated in FIGS. 15A-15B). For example, detection of the wakeword "Alexa" by the wakeword detection component 1420 may result in sending audio data to certain language processing components 1592/skills 1590 for processing while detection of the wakeword "Computer" by the wakeword detector may result in sending audio data different language processing components 1592/skills 1590 for processing.

The components illustrated in FIGS. 14-15B may enable some of the functionality that may be managed using the distributed computing framework, as described above. For example, the user recognition component 1495/1595 may be configured to perform user identification, the wakeword detection component 1420 may be configured to perform wakeword detection, the presence detection component 1494/1594 may be configured to perform human presence detection, the sentiment detection component 1575 may be configured to perform sentiment detection, the system directed detector component 1485/1585 may be configured to detect system directed inputs, a voice activity detector (VAD) component may be configured to perform voice activity detection, and so on. As described above, the system 100 may determine a capability of a device with regard to a specific functionality and may enable or disable this functionality without departing from the disclosure. For example, the system 100 may enable functionality for a single device within a logical grouping and may disable the functionality for remaining devices within the logical grouping, although the disclosure is not limited thereto.

Figure 16:
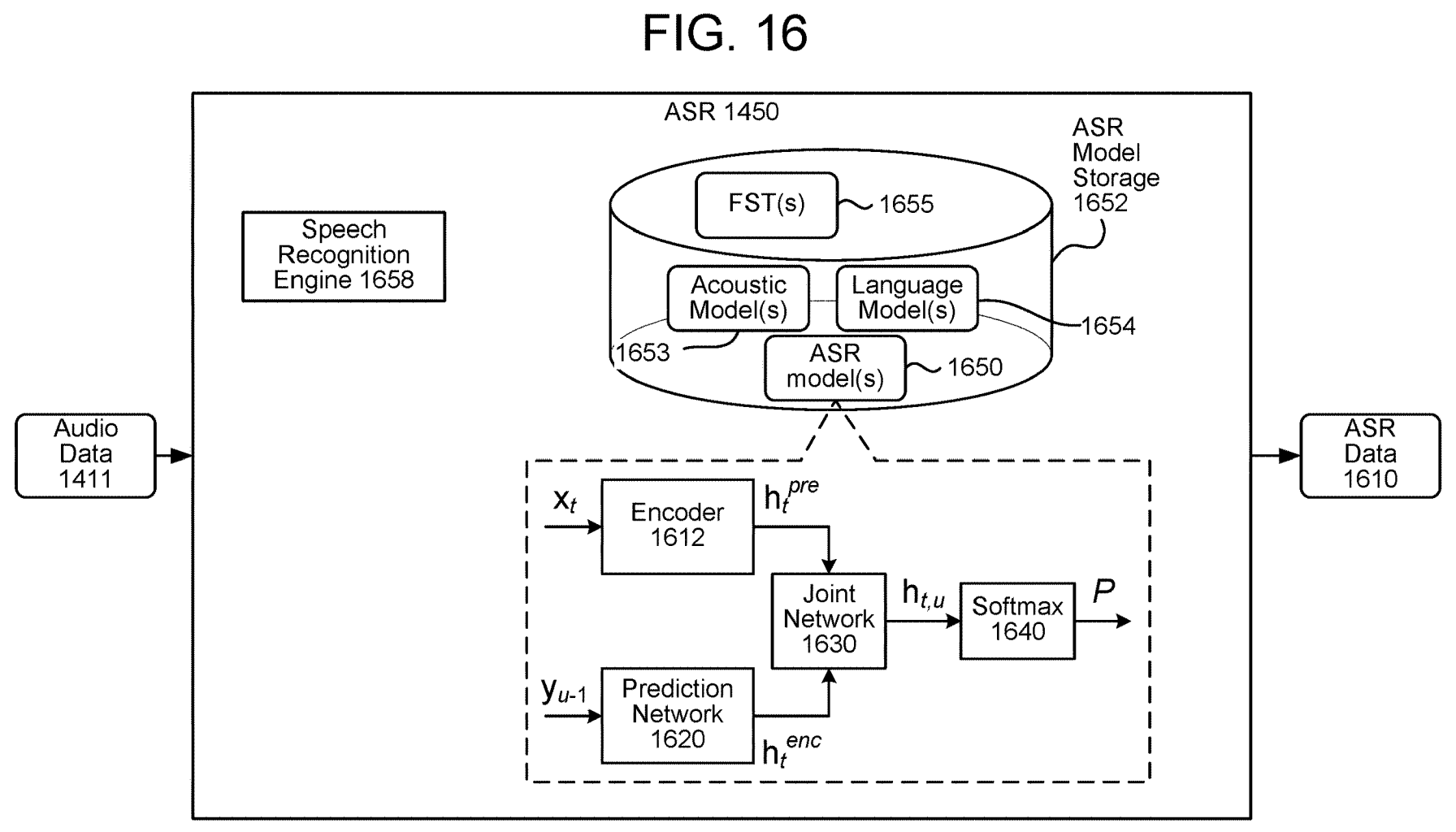

FIG. 16 is a conceptual diagram of an ASR component, according to embodiments of the present disclosure. FIG. 16 is a conceptual diagram of an ASR component 1450, according to embodiments of the present disclosure. The ASR component 1450 may interpret a spoken natural language input based on the similarity between the spoken natural language input and pre-established language models 1654 stored in an ASR model storage 1652. For example, the ASR component 1450 may compare the audio data with models for sounds (e.g., subword units or phonemes) and sequences of sounds to identify words that match the sequence of sounds spoken in the natural language input. Alternatively, the ASR component 1450 may use a finite state transducer (FST) 1655 to implement the language model functions.

When the ASR component 1450 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1653 stored in the ASR model storage 1652), and the likelihood that a particular word, which matches the sounds, would be included in the sentence at the specific location (e.g., using a language or grammar model 1654). Based on the considered factors and the assigned confidence score, the ASR component 1450 may output an ASR hypothesis that most likely matches the spoken natural language input, or may output multiple ASR hypotheses in the form of a lattice or an N-best list, with each ASR hypothesis corresponding to a respective score.

The ASR component 1450 may include a speech recognition engine 1658. The ASR component 1450 receives audio data 1411 (for example, received from a local device 110 having processed audio detected by a microphone by an acoustic front end (AFE) or other component). The speech recognition engine 1658 compares the audio data 1411 with acoustic models 1653, language models 1654, FST(s) 1655, and/or other data models and information for recognizing the speech conveyed in the audio data. The audio data 1411 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 120 encoded, in which case they may be decoded by the speech recognition engine 1658 and/or prior to processing by the speech recognition engine 1658.

In some implementations, the ASR component 1450 may process the audio data 1411 using the ASR model 1650. The ASR model 1650 may be, for example, a recurrent neural network such as an RNN-T. An example RNN-T architecture is illustrated in FIG. 16. The ASR model 1650 may predict a probability (y|x) of labels y=(y1, . . . , yu) given acoustic features x=(x1, . . . , xt). During inference, the ASR model 1650 can generate an N-best list using, for example, a beam search decoding algorithm. The ASR model 1650 may include an encoder 1612, a prediction network 1620, a joint network 1630, and a softmax 1640. The encoder 1612 may be similar or analogous to an acoustic model (e.g., similar to the acoustic model 1653 described below), and may process a sequence of acoustic input features to generate encoded hidden representations. The prediction network 1620 may be similar or analogous to a language model (e.g., similar to the language model 1654 described below), and may process the previous output label predictions, and map them to corresponding hidden representations. The joint network 1630 may be, for example, a feed forward neural network (NN) that may process hidden representations from both the encoder 1612 and prediction network 1620, and predict output label probabilities. The softmax 1640 may be a function implemented (e.g., as a layer of the joint network 1630) to normalize the predicted output probabilities.

The speech recognition engine 1658 may process the audio data 1411 with reference to information stored in the ASR model storage 1652. Feature vectors of the audio data 1411 may arrive at the system component(s) encoded, in which case they may be decoded prior to processing by the speech recognition engine 1658.

The speech recognition engine 1658 attempts to match received feature vectors to language acoustic units (e.g., phonemes) and words as known in the stored acoustic models 1653, language models 1654, and FST(s) 1655. For example, audio data 1411 may be processed by one or more acoustic model(s) 1653 to determine acoustic unit data. The acoustic unit data may include indicators of acoustic units detected in the audio data 1411 by the ASR component 1450. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1654 (and/or using FST 1655) to determine ASR data 1610. The ASR data 1610 can include one or more hypotheses. One or more of the hypotheses represented in the ASR data 1610 may then be sent to further components (such as the NLU component 1460) for further processing as discussed herein. The ASR data 1610 may include representations of text of an utterance, such as words, subword units, or the like.

The speech recognition engine 1658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 1450 will output ASR hypotheses that make sense grammatically. The specific models used may be general models or may be models corresponding to a particular domain, such as music, banking, etc.

The speech recognition engine 1658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1658 may use the acoustic model(s) 1653 to attempt to match received audio feature vectors to words or subword acoustic units. An acoustic unit may be a senone, phoneme, phoneme in context, syllable, part of a syllable, syllable in context, or any other such portion of a word. The speech recognition engine 1658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 1450 outputs ASR hypotheses that make sense grammatically.

The speech recognition engine 1658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1658 may also compute scores of branches of the paths based on language models or grammars. Language modeling involves determining scores for what words are likely to be used together to form coherent words and sentences. Application of a language model may improve the likelihood that the ASR component 1450 correctly interprets the speech contained in the audio data. For example, for an input audio sounding like "hello," acoustic model processing that returns the potential phoneme paths of "H E L O", "HAL O", and "Y EL O" may be adjusted by a language model to adjust the recognition scores of "H E L O" (interpreted as the word "hello"), "H A LO" (interpreted as the word "halo"), and "Y EL O" (interpreted as the word "yellow") based on the language context of each word within the spoken utterance.

Figure 17:
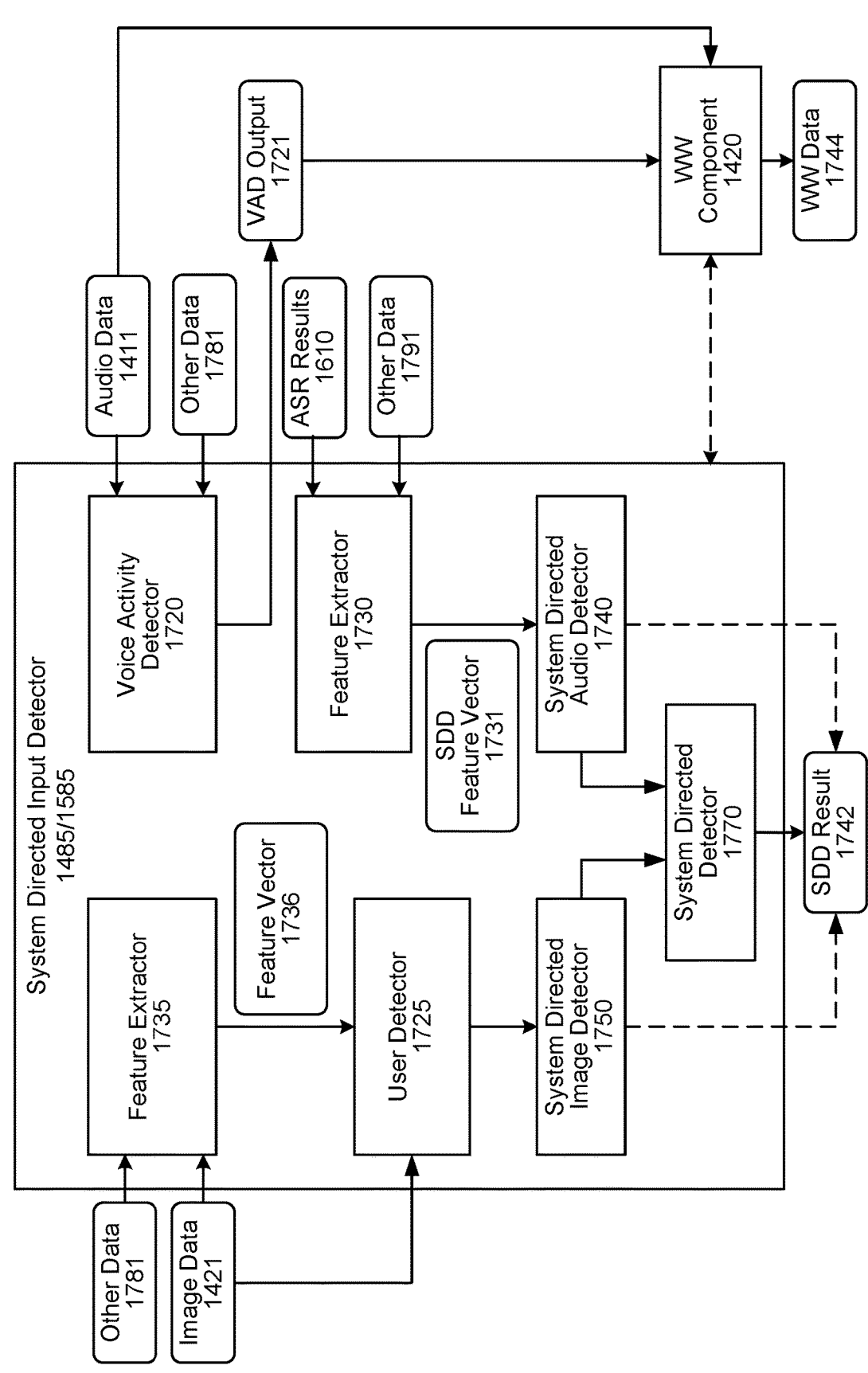
FIG. 17 is a conceptual diagram of components of a system to detect if input audio data includes system directed speech, according to embodiments of the present disclosure.

FIG. 17 is a conceptual diagram of components of a system to detect if input audio data includes system directed speech, according to embodiments of the present disclosure. Configuration and operation of the system directed input detector component 1585 is illustrated in FIG. 17. As shown in FIG. 17, the system directed input detector component 1585 may include a number of different components. First, the system directed input detector component 1585 may include a voice activity detector (VAD) 1720. The VAD 1720 may operate to detect whether the incoming audio data 1411 includes speech or not. The VAD output 1721 may be a binary indicator. Thus, if the incoming audio data 1411 includes speech, the VAD 1720 may output an indicator that the audio data 1411 does includes speech (e.g., a 1) and if the incoming audio data 1411 does not includes speech, the VAD 1720 may output an indicator that the audio data 1411 does not includes speech (e.g., a 0). The VAD output 1721 may also be a score (e.g., a number between 0 and 1) corresponding to a likelihood that the audio data 1411 includes speech. The VAD 1720 may also perform start-point detection as well as end-point detection where the VAD 1720 determines when speech starts in the audio data 1411 and when it ends in the audio data 1411. Thus the VAD output 1721 may also include indicators of a speech start point and/or a speech endpoint for use by other components of the system. (For example, the start-point and end-points may demarcate the audio data 1411 that is sent to the speech processing component 240.) The VAD output 1721 may be associated with a same unique ID as the audio data 1411 for purposes of tracking system processing across various components.

The VAD 1720 may operate using a variety of VAD techniques, including those described above with regard to VAD operations performed by device 110. The VAD may be configured to be robust to background noise so as to accurately detect when audio data actually includes speech or not. The VAD 1720 may operate on raw audio data 1411 such as that sent by device 110 or may operate on feature vectors or other data representing the audio data 1411. For example, the VAD 1720 may take the form of a deep neural network (DNN) and may operate on a single feature vector representing the entirety of audio data 1411 received from the device or may operate on multiple feature vectors, for example feature vectors representing frames of audio data where each frame covers a certain amount of time of audio data (e.g., 25 ms). The VAD 1720 may also operate on other data 1781 that may be useful in detecting voice activity in the audio data 1411. For example, the other data 1781 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 1411 to determine if that voice matches a voice in the reference section of speech. If the voices match, that may be an indicator to the VAD 1720 that speech was detected. If not, that may be an indicator to the VAD 1720 that speech was not detected. (For example, a representation may be taken of voice data in the first input audio data which may then be compared to the second input audio data to see if the voices match. If they do (or do not) that information may be considered by the VAD 1720.) The VAD 1720 may also consider other data when determining if speech was detected. The VAD 1720 may also consider speaker ID information (such as may be output by user recognition component 1495), directionality data that may indicate what direction (relative to the capture device 110) the incoming audio was received from. Such directionality data may be received from the device 110 and may have been determined by a beamformer or other component of device 110. The VAD 1720 may also consider data regarding a previous utterance which may indicate whether the further audio data received by the system is likely to include speech. Other VAD techniques may also be used.

If the VAD output 1721 indicates that no speech was detected the system (through orchestrator component 1430 or some other component) may discontinue processing with regard to the audio data 1411, thus saving computing resources that might otherwise have been spent on other processes (e.g., ASR for the audio data 1411, etc.). If the VAD output 1721 indicates that speech was detected, the system may make a determination as to whether the speech was or was not directed to the speech-processing system. Such a determination may be made by the system directed audio detector 1740. The system directed audio detector 1740 may include a trained model, such as a DNN, that operates on a feature vector which represent certain data that may be useful in determining whether or not speech is directed to the system. To create the feature vector operable by the system directed audio detector 1740, a feature extractor 1730 may be used. The feature extractor 1730 may input ASR results 1610 which include results from the processing of the audio data 1411 by the speech recognition component 1550. For privacy protection purposes, in certain configurations the ASR results 1610 may be obtained from a language processing component 1592/ASR component 1550 located on device 110 or on a home remote component as opposed to a language processing component 1492/ASR component 1450 located on a cloud or other remote system component(s) so that audio data 1411 is not sent remote from the user's home unless the system directed input detector component 1585 has determined that the input is system directed. Though this may be adjusted depending on user preferences/system configuration.

The ASR results 1610 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1610 may include a trellis, which may include a raw search graph as scored during ASR decoding. The ASR results 1610 may also include a lattice, which may be a trellis as scored that has been pruned to remove certain hypotheses that do not exceed a score threshold or number of hypotheses threshold. The ASR results 1610 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1610 may also include corresponding respective scores (such as for a trellis, lattice, confusion network, individual hypothesis, N-best list, etc.)

The ASR results 1610 (or other data 1791) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 1550 being less confident about its best hypothesis, which in turn may correlate to detected speech not being device directed. The entropy may be a feature included in other data 1791 to be considered by the system directed audio detector 1740.

The system may also determine and consider ASR decoding costs, which may include features from Viterbi decoding costs of the ASR. Such features may indicate how well the input acoustics and vocabulary match with the acoustic models 1653 and language models 1654. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 1550 is less confident about the top hypothesis, which may correlate to detected speech not being device directed. Other such features or data from the ASR results 1610 may also be used as other data 1791.

The ASR results 1610 may be represented in a system directed detector (SDD) feature vector 1731 (e.g., feature data) that can be used to determine whether speech was system-directed. The feature vector 1731 may represent the ASR results 1610 but may also represent audio data 1411 (which may be input to feature extractor 1730) or other information. Such ASR results may be helpful in determining if speech was system-directed. For example, if ASR results include a high scoring single hypothesis, that may indicate that the speech represented in the audio data 1411 is directed at, and intended for, the device 110. If, however, ASR results do not include a single high scoring hypothesis, but rather many lower scoring hypotheses, that may indicate some confusion on the part of the speech recognition component 1550 and may also indicate that the speech represented in the audio data 1411 was not directed at, nor intended for, the device 110.

The ASR results 1610 may include complete ASR results, for example ASR results corresponding to all speech between a startpoint and endpoint (such as a complete lattice, etc.). In this configuration the system may wait until all ASR processing for a certain input audio has been completed before operating the feature extractor 1730 and system directed audio detector 1740. Thus the system directed audio detector 1740 may receive a feature vector 1731 that includes all the representations of the audio data 1411 created by the feature extractor 1730. The system directed audio detector 1740 may then operate a trained model (such as a DNN) on the feature vector 1731 to determine a score corresponding to a likelihood that the audio data 1411 includes a representation of system-directed speech. If the score is above a threshold, the system directed audio detector 1740 may determine that the audio data 1411 does include a representation of system-directed speech. The SDD result 1742 may include an indicator of whether the audio data includes system-directed speech, a score, and/or some other data.

The ASR results 1610 may also include incomplete ASR results, for example ASR results corresponding to only some speech between a between a startpoint and endpoint (such as an incomplete lattice, etc.). In this configuration the feature extractor 1730/system directed audio detector 1740 may be configured to operate on incomplete ASR results 1610 and thus the system directed audio detector 1740 may be configured to output an SSD result 1742 that provides an indication as to whether the portion of audio data processed (that corresponds to the incomplete ASR results) corresponds to system directed speech. The system may thus be configured to perform ASR at least partially in parallel with the system directed audio detector 1740 to process ASR result data as it is ready and thus continually update an SDD result 1742. Once the system directed input detector component 1585 has processed enough ASR results and/or the SDD result 1742 exceeds a threshold, the system may determine that the audio data 1411 includes system-directed speech. Similarly, once the system directed input detector component 1585 has processed enough ASR results and/or the SDD result 1742 drops below another threshold, the system may determine that the audio data 1411 does not include system-directed speech.

The SDD result 1742 may be associated with a same unique ID as the audio data 1411 and VAD output 1721 for purposes of tracking system processing across various components.

The feature extractor 1730 may also incorporate in a feature vector 1731 representations of other data 1791. Other data 1791 may include, for example, word embeddings from words output by the speech recognition component 1550 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 1730 processing and representing a word embedding in a feature vector 1731 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 1791 may also include, for example, NLU output from the natural language 260 component may be considered. Thus, if natural language output data 1985/1925 indicates a high correlation between the audio data 1411 and an out-of-domain indication (e.g., no intent classifier scores from IC components 1864 or overall domain scores from recognizers 1863 reach a certain confidence threshold), this may indicate that the audio data 1411 does not include system-directed speech. Other data 1791 may also include, for example, an indicator of a user/speaker as output user recognition component 1495. Thus, for example, if the user recognition component 1495 does not indicate the presence of a known user, or indicates the presence of a user associated with audio data 1411 that was not associated with a previous utterance, this may indicate that the audio data 1411 does not include system-directed speech. The other data 1791 may also include an indication that a voice represented in audio data 1411 is the same (or different) as the voice detected in previous input audio data corresponding to a previous utterance. The other data 1791 may also include directionality data, for example using beamforming or other audio processing techniques to determine a direction/location of a source of detected speech and whether that source direction/location matches a speaking user. The other data 1791 may also include data indicating that a direction of a user's speech is toward a device 110 or away from a device 110, which may indicate whether the speech was system directed or not.

Other data 1791 may also include image data 1421. For example, if image data is detected from one or more devices that are nearby to the device 110 (which may include the device 110 itself) that captured the audio data being processed using the system directed input detector (1585), the image data may be processed to determine whether a user is facing an audio capture device for purposes of determining whether speech is system-directed as further explained below.

Other data 1791 may also dialog history data. For example, the other data 1791 may include information about whether a speaker has changed from a previous utterance to the current audio data 1411, whether a topic of conversation has changed from a previous utterance to the current audio data, how NLU results from a previous utterance compare to NLU results obtained using the current audio data 1411, other system context information. The other data 1791 may also include an indicator as to whether the audio data 1411 was received as a result of a wake command or whether the audio data 1411 was sent without the device 110 detecting a wake command (e.g., the device 110 being directed by remote system component(s) and/or determining to send the audio data without first detecting a wake command).

Other data 1791 may also include information from the profile storage 1470.

Other data 1791 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 1791 may also include acoustic feature data such as pitch, prosody, intonation, volume, or other data descriptive of the speech in the audio data 1411. As a user may use a different vocal tone to speak with a machine than with another human, acoustic feature information may be useful in determining if speech is device-directed.

Other data 1791 may also include an indicator that indicates whether the audio data 1411 includes a wakeword. For example, if a device 110 detects a wakeword prior to sending the audio data 1411 to the remote system component(s), the device 110 may send along an indicator that the device 110 detected a wakeword in the audio data 1411. In another example, the remote system component(s) may include another component that processes incoming audio data 1411 to determine if it includes a wakeword. If it does, the component may create an indicator indicating that the audio data 1411 includes a wakeword. The indicator may then be included in other data 1791 to be incorporated in the feature vector 1731 and/or otherwise considered by the system directed audio detector 1740.

Other data 1791 may also include device history data such as information about previous operations related to the device 110 that sent the audio data 1411. For example, the other data 1791 may include information about a previous utterance that was just executed, where the utterance originated with the same device 110 as a current utterance and the previous utterance was within a certain time window of the current utterance. Device history data may be stored in a manner associated with the device identifier (which may also be included in other data 1791), which may also be used to track other information about the device, such as device hardware, capability, location, etc.

The other data 1781 used by the VAD 1720 may include similar data and/or different data from the other data 1791 used by the feature extractor 1730. The other data 1781/1791 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 1740 and/or the VAD 1720) may be based on the data from the previous utterance. For example, a score threshold (for the system directed audio detector 1740 and/or the VAD 1720) may be based on acoustic data from a previous utterance.

The feature extractor 1730 may output a single feature vector 1731 for one utterance/instance of input audio data 1411. The feature vector 1731 may consistently be a fixed length, or may be a variable length vector depending on the relevant data available for particular audio data 1411. Thus, the system directed audio detector 1740 may output a single SDD result 1742 per utterance/instance of input audio data 1411. The SDD result 1742 may be a binary indicator. Thus, if the incoming audio data 1411 includes system-directed speech, the system directed audio detector 1740 may output an indicator that the audio data 1411 does includes system-directed speech (e.g., a 1) and if the incoming audio data 1411 does not includes system-directed speech, the system directed audio detector 1740 may output an indicator that the audio data 1411 does not system-directed includes speech (e.g., a 0). The SDD result 1742 may also be a score (e.g., a number between 0 and 1) corresponding to a likelihood that the audio data 1411 includes system-directed speech. Although not illustrated in FIG. 17, the flow of data to and from the system directed input detector component 1585 may be managed by the orchestrator component 1430 or by one or more other components.

The trained model(s) of the system directed audio detector 1740 may be trained on many different examples of SDD feature vectors that include both positive and negative training samples (e.g., samples that both represent system-directed speech and non-system directed speech) so that the DNN and/or other trained model of the system directed audio detector 1740 may be capable of robustly detecting when speech is system-directed versus when speech is not system-directed.

A further input to the system directed input detector component 1585 may include output data from TTS component 1480 to avoid synthesized speech output by the system being confused as system-directed speech spoken by a user. The output from the TTS component 1480 may allow the system to ignore synthesized speech in its considerations of whether speech was system directed. The output from the TTS component 1480 may also allow the system to determine whether a user captured utterance is responsive to the TTS output, thus improving system operation.

The system directed input detector component 1585 may also use echo return loss enhancement (ERLE) and/or acoustic echo cancellation (AEC) data to avoid processing of audio data generated by the system.

As shown in FIG. 17, the system directed input detector component 1585 may simply user audio data to determine whether an input is system directed (for example, system directed audio detector 1740 may output an SDD result 1742). This may be true particularly when no image data is available (for example for a device without a camera). If image data 1421 is available, however, the system may also be configured to use image data 1421 to determine if an input is system directed. The image data 1421 may include image data captured by device 110 and/or image data captured by other device(s) in the environment of device 110. The audio data 1411, image data 1421 and other data 1781 may be timestamped or otherwise correlated so that the system directed input detector component 1585 may determine that the data being analyzed all relates to a same time window so as to ensure alignment of data considered with regard to whether a particular input is system directed. For example, the system directed input detector component 1585 may determine system directedness scores for every frame of audio data/every image of a video stream and may align and/or window them to determine a single overall score for a particular input that corresponds to a group of audio frames/images.

Image data 1421 along with other data 1781 may be received by feature extractor 1735. The feature extractor may create one or more feature vectors 1736 (e.g., feature data) which may represent the image data 1421/other data 1781. In certain examples, other data 1781 may include data from image processing component 1540 which may include information about faces, gesture, etc. detected in the image data 1421. For privacy protection purposes, in certain configurations any image processing/results thereof may be obtained from an image processing component 1540 located on device 110 or on a home remote component as opposed to a image processing component 1440 located on a cloud or other remote system component(s) so that image data 1421 is not sent remote from the user's home unless the system directed input detector component 1585 has determined that the input is system directed. Though this may be adjusted depending on user preferences/system configuration.

The feature vector 1736 may be passed to the user detector component 1725. The user detector component 1725 (which may use various components/operations of image processing component 1540, user recognition component 1495, etc.) may be configured to process image data 1421 and/or feature vector 1736 to determine information about the user's behavior which in turn may be used to determine if an input is system directed. For example, the user detector component 1725 may be configured to determine the user's position/behavior with respect to device 110/system 100. The user detector component 1725 may also be configured to determine whether a user's mouth is opening/closing in a manner that suggests the user is speaking. The user detector component 1725 may also be configured to determine whether a user is nodding or shaking his/her head. The user detector component 1725 may also be configured to determine whether a user's gaze is directed to the device 110, to another user, or to another object. For example, the user detector component 1725 may include, or be configured to use data from, a gaze detector. The user detector component 1725 may also be configured to determine gestures of the user such as a shoulder shrug, pointing toward an object, a wave, a hand up to indicate a directive to stop, or a fingers moving to indicate a directive to continue, holding up a certain number of fingers, putting a thumb up, etc. The user detector component 1725 may also be configured to determine a user's position/orientation such as facing another user, facing the device 110, whether their back is turned, etc. The user detector component 1725 may also be configured to determine relative positions of multiple users that appear in image data (and/or are speaking in audio data 1411 which may also be considered by the user detector component 1725 along with feature vector 1731), for example which users are closer to a device 110 and which are farther away. The user detector component 1725 (and/or other component) may also be configured to identify other objects represented in image data and determine whether objects are relevant to a dialog or system interaction (for example determining if a user is referring to an object through a movement or speech).

The user detector component 1725 may operate one or more models (e.g., one or more classifiers) to determine if certain situations are represented in the image data 1421. For example, the user detector component 1725 may employ a visual directedness classifier that may determine, for each face detected in the image data 1421 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector component 1725 (or other component(s) such as those in image processing component 1540) may be configured to follow a face in image data to determine which faces represented may belong to a same person. The system may user IOU based tracker, a mean-shift based tracker, a particle filter based tracker or other technique.

The user detector component 1725 (or other component(s) such as those in user recognition component 1495) may be configured to determine whether a face represented in image data belongs to a person who is speaking or not, thus performing active speaker detection. The system may take the output from the user detector component 1725 and aggregate a sequence of face from the same person as input and predict whether this person is speaking or not. Lip motion, user ID, detected voice data, and other data may be used to determine whether a user is speaking or not.

The system directed image detector 1750 may then determine, based on information from the user detector component 1725 as based on the image data whether an input relating to the image data is system directed. The system directed image detector 1750 may also operate on other input data, for example image data including raw image data 1421, image data including feature vectors 1736 based on raw image data, other data 1781, or other data. The determination by the system directed image detector 1750 may result in a score indicating whether the input is system directed based on the image data. If no audio data is available, the indication may be output as SDD result 1742. If audio data is available, the indication may be sent to system directed detector 1770 which may consider information from both system directed audio detector 1740 and system directed image detector 1750. The system directed detector 1770 may then process the data from both system directed audio detector 1740 and system directed image detector 1750 to come up with an overall determination as to whether an input was system directed, which may be output as SDD result 1742. The system directed detector 1770 may consider not only data output from system directed audio detector 1740 and system directed image detector 1750 but also other data/metadata corresponding to the input (for example, image data/feature vectors 1736, audio data/feature vector 1731, image data 1421, audio data 1411, or the like discussed with regard to FIG. 17. The system directed detector 1770 may include one or more models which may analyze the various input data to make a determination regarding SDD result 1742.

In one example the determination of the system directed detector 1770 may be based on "AND" logic, for example determining an input is system directed only if affirmative data is received from both system directed audio detector 1740 and system directed image detector 1750. In another example the determination of the system directed detector 1770 may be based on "OR" logic, for example determining an input is system directed if affirmative data is received from either system directed audio detector 1740 or system directed image detector 1750. In another example the data received from system directed audio detector 1740 and system directed image detector 1750 are weighted individually based on other information available to system directed detector 1770 to determine to what extend audio and/or image data should impact the decision of whether an input is system directed.

The system directed input detector component 1585 may also receive information from a wakeword detection component 1420. For example, an indication that a wakeword was detected (e.g., WW data 1744) may be considered by the system directed input detector component 1585 (e.g., by system directed audio detector 1740, system directed detector 1770, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing component 1492). If an input is determined not to be system directed, the system may take no further action regarding the data related to the input and may allow it to be deleted. In certain configurations, to maintain privacy, the operations to determine whether an input is system directed are performed by device 110 (or home server(s)) and only if the input is determined to be system directed is further data (such as audio data 1411 or image data 1421) sent to a remote system component(s) that is outside a user's home or other direct control.

Figure 18:
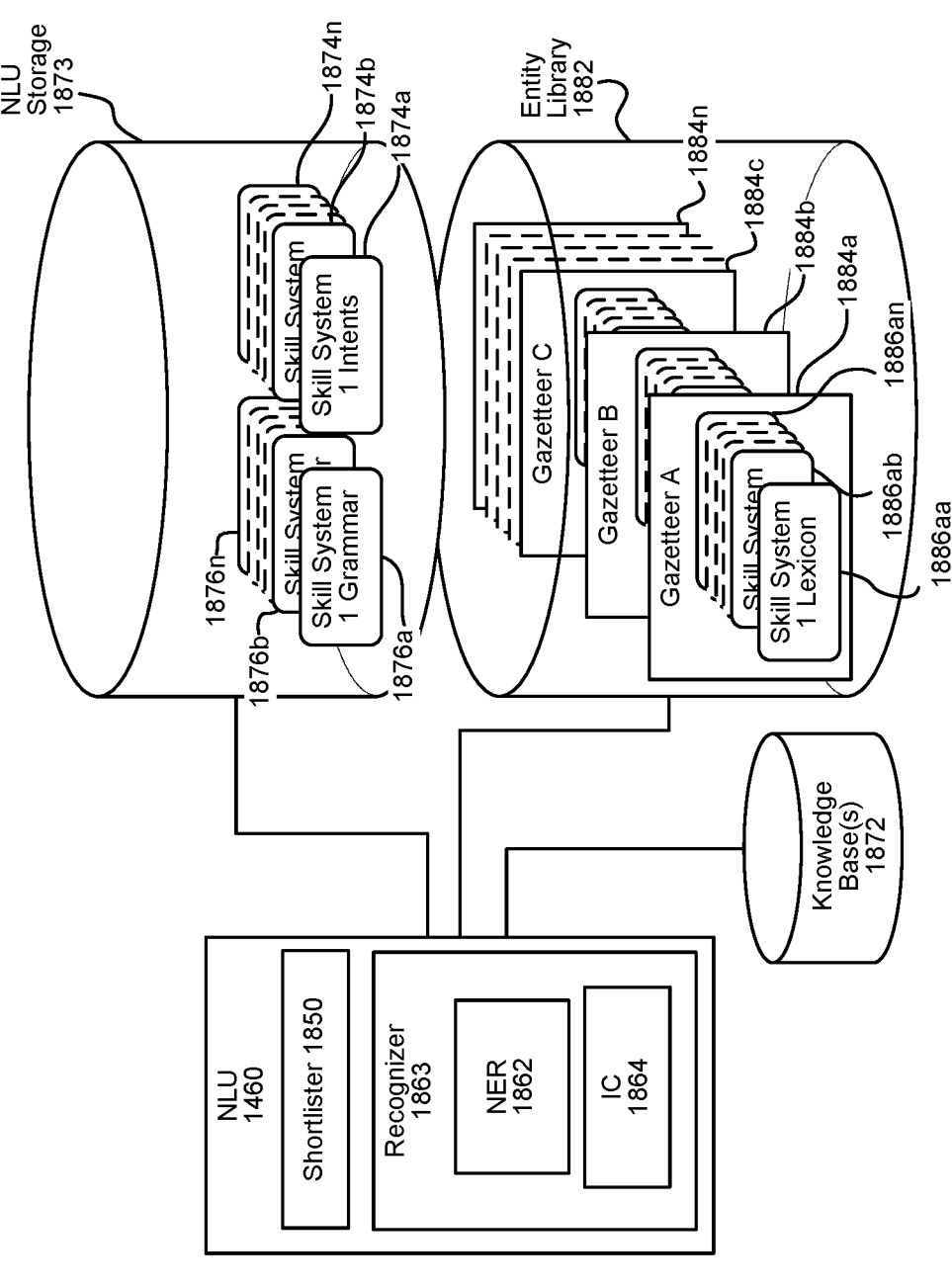
FIG. 18 is a conceptual diagram of how natural language processing is performed, according to embodiments of the present disclosure.
Figure 19:
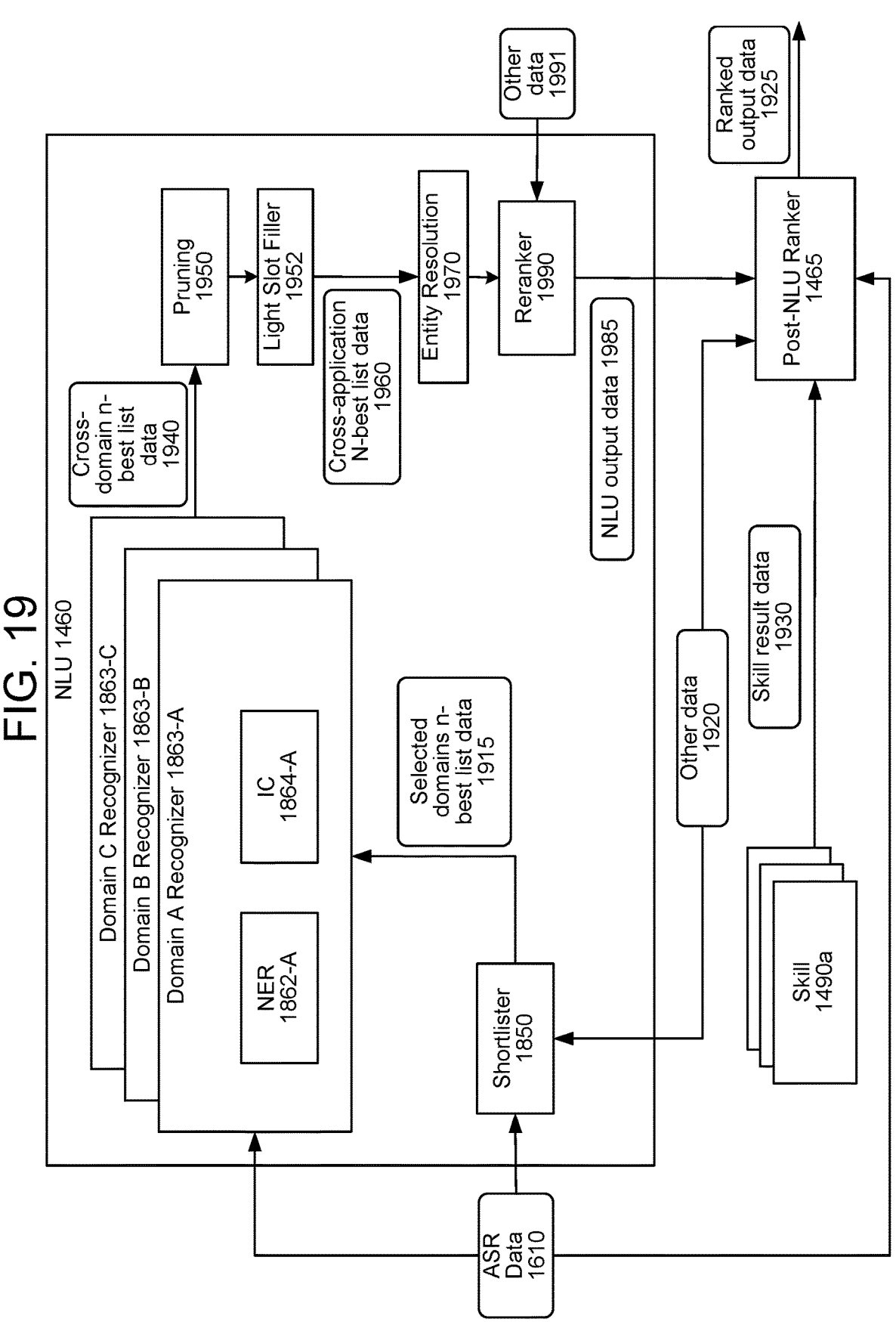
FIG. 19 is a conceptual diagram of how natural language processing is performed, according to embodiments of the present disclosure.

FIGS. 18 and 19 illustrates how the NLU component 1460 may perform NLU processing. FIG. 18 is a conceptual diagram of how natural language processing is performed, according to embodiments of the present disclosure. And FIG. 19 is a conceptual diagram of how natural language processing is performed, according to embodiments of the present disclosure.

FIG. 18 illustrates how NLU processing is performed on text data. The NLU component 1460 may process text data including several ASR hypotheses of a single user input. For example, if the ASR component 1450 outputs text data including an n-best list of ASR hypotheses, the NLU component 1460 may process the text data with respect to all (or a portion of) the ASR hypotheses represented therein.

The NLU component 1460 may annotate text data by parsing and/or tagging the text data. For example, for the text data "tell me the weather for Seattle," the NLU component 1460 may tag "tell me the weather for Seattle" as an <OutputWeather> intent as well as separately tag "Seattle" as a location for the weather information.

The NLU component 1460 may include a shortlister component 1850. The shortlister component 1850 selects skills that may execute with respect to ASR output data 1610 input to the NLU component 1460 (e.g., applications that may execute with respect to the user input). The ASR output data 1610 (which may also be referred to as ASR data 1610) may include representations of text of an utterance, such as words, subword units, or the like. The shortlister component 1850 thus limits downstream, more resource intensive NLU processes to being performed with respect to skills that may execute with respect to the user input.

Without a shortlister component 1850, the NLU component 1460 may process ASR output data 1610 input thereto with respect to every skill of the system, either in parallel, in series, or using some combination thereof. By implementing a shortlister component 1850, the NLU component 1460 may process ASR output data 1610 with respect to only the skills that may execute with respect to the user input. This reduces total compute power and latency attributed to NLU processing.

The shortlister component 1850 may include one or more trained models. The model(s) may be trained to recognize various forms of user inputs that may be received by the system component(s) 120. For example, during a training period skill system component(s) 125 associated with a skill may provide the system component(s) 120 with training text data representing sample user inputs that may be provided by a user to invoke the skill. For example, for a ride sharing skill, a skill system component(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 1850 may be trained, using the training text data representing sample user inputs, to determine other potentially related user input structures that users may try to use to invoke the particular skill. During training, the system component(s) 120 may solicit the skill system component(s) 125 associated with the skill regarding whether the determined other user input structures are permissible, from the perspective of the skill system component(s) 125, to be used to invoke the skill. The alternate user input structures may be derived by one or more trained models during model training and/or may be based on user input structures provided by different skills. The skill system component(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1850 may be trained with respect to a different skill. Alternatively, the shortlister component 1850 may use one trained model per domain, such as one trained model for skills associated with a weather domain, one trained model for skills associated with a ride sharing domain, etc.

The system component(s) 120 may use the sample user inputs provided by a skill system component(s) 125, and related sample user inputs potentially determined during training, as binary examples to train a model associated with a skill associated with the skill system component(s) 125. The model associated with the particular skill may then be operated at runtime by the shortlister component 1850. For example, some sample user inputs may be positive examples (e.g., user inputs that may be used to invoke the skill). Other sample user inputs may be negative examples (e.g., user inputs that may not be used to invoke the skill).

As described above, the shortlister component 1850 may include a different trained model for each skill of the system, a different trained model for each domain, or some other combination of trained model(s). For example, the shortlister component 1850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1850 to output indications of only a portion of the skills that the ASR output data 1610 may relate to. For example, a user input may correspond to "tell me about Tom Collins." If the model is clustered based on domain, the shortlister component 1850 may determine the user input corresponds to a recipe skill (e.g., a drink recipe) even though the user input may also correspond to an information skill (e.g., including information about a person named Tom Collins).

The NLU component 1460 may include one or more recognizers 1863. In at least some embodiments, a recognizer 1863 may be associated with a skill system component(s) 125 (e.g., the recognizer may be configured to interpret text data to correspond to the skill system component(s) 125). In at least some other examples, a recognizer 1863 may be associated with a domain such as smart home, video, music, weather, custom, etc. (e.g., the recognizer may be configured to interpret text data to correspond to the domain).

If the shortlister component 1850 determines ASR output data 1610 is potentially associated with multiple domains, the recognizers 1863 associated with the domains may process the ASR output data 1610, while recognizers 1863 not indicated in the shortlister component 1850's output may not process the ASR output data 1610. The "shortlisted" recognizers 1863 may process the ASR output data 1610 in parallel, in series, partially in parallel, etc. For example, if ASR output data 1610 potentially relates to both a communications domain and a music domain, a recognizer associated with the communications domain may process the ASR output data 1610 in parallel, or partially in parallel, with a recognizer associated with the music domain processing the ASR output data 1610.

Each recognizer 1863 may include a named entity recognition (NER) component 1862. The NER component 1862 attempts to identify grammars and lexical information that may be used to construe meaning with respect to text data input therein. The NER component 1862 identifies portions of text data that correspond to a named entity associated with a domain, associated with the recognizer 1863 implementing the NER component 1862. The NER component 1862 (or other component of the NLU component 1460) may also determine whether a word refers to an entity whose identity is not explicitly mentioned in the text data, for example "him," "her," "it" or other anaphora, exophora, or the like.

Each recognizer 1863, and more specifically each NER component 1862, may be associated with a particular grammar database 1876, a particular set of intents/actions 1874, and a particular personalized lexicon 1886. The grammar databases 1876, and intents/actions 1874 may be stored in an NLU storage 1873. Each gazetteer 1884 may include domain/skill-indexed lexical information associated with a particular user and/or device 110. For example, a Gazetteer A (1884a) includes skill-indexed lexical information 1886aa to 1886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1862 applies grammar information 1876 and lexical information 1886 associated with a domain (associated with the recognizer 1863 implementing the NER component 1862) to determine a mention of one or more entities in text data. In this manner, the NER component 1862 identifies "slots" (each corresponding to one or more particular words in text data) that may be useful for later processing. The NER component 1862 may also label each slot with a type (e.g., noun, place, city, artist name, song name, etc.).

Each grammar database 1876 includes the names of entities (i.e., nouns) commonly found in speech about the particular domain to which the grammar database 1876 relates, whereas the lexical information 1886 is personalized to the user and/or the device 110 from which the user input originated. For example, a grammar database 1876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 1460 may utilize gazetteer information (1884a-1884n) stored in an entity library storage 1882. The gazetteer information 1884 may be used to match text data (representing a portion of the user input) with text data representing known entities, such as song titles, contact names, etc. Gazetteers 1884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1863 may also include an intent classification (IC) component 1864. An IC component 1864 parses text data to determine an intent(s) (associated with the domain associated with the recognizer 1863 implementing the IC component 1864) that potentially represents the user input. An intent represents to an action a user desires be performed. An IC component 1864 may communicate with a database 1874 of words linked to intents. For example, a music intent database may link words and phrases such as "quiet," "volume off," and "mute" to a <Mute> intent. An IC component 1864 identifies potential intents by comparing words and phrases in text data (representing at least a portion of the user input) to the words and phrases in an intents database 1874 (associated with the domain that is associated with the recognizer 1863 implementing the IC component 1864).

The intents identifiable by a specific IC component 1864 are linked to domain-specific (i.e., the domain associated with the recognizer 1863 implementing the IC component 1864) grammar frameworks 1876 with "slots" to be filled. Each slot of a grammar framework 1876 corresponds to a portion of text data that the system believes corresponds to an entity. For example, a grammar framework 1876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1876 may not be structured as sentences, but rather based on associating slots with grammatical tags.

For example, an NER component 1862 may parse text data to identify words as subject, object, verb, preposition, etc. based on grammar rules and/or models prior to recognizing named entities in the text data. An IC component 1864 (implemented by the same recognizer 1863 as the NER component 1862) may use the identified verb to identify an intent. The NER component 1862 may then determine a grammar model 1876 associated with the identified intent. For example, a grammar model 1876 for an intent corresponding to <PlayMusic> may specify a list of slots applicable to play the identified "object" and any object modifier (e.g., a prepositional phrase), such as {Artist Name}, {Album Name}, {Song name}, etc. The NER component 1862 may then search corresponding fields in a lexicon 1886 (associated with the domain associated with the recognizer 1863 implementing the NER component 1862), attempting to match words and phrases in text data the NER component 1862 previously tagged as a grammatical object or object modifier with those identified in the lexicon 1886.

An NER component 1862 may perform semantic tagging, which is the labeling of a word or combination of words according to their type/semantic meaning. An NER component 1862 may parse text data using heuristic grammar rules, or a model may be constructed using techniques such as Hidden Markov Models, maximum entropy models, log linear models, conditional random fields (CRF), and the like. For example, an NER component 1862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1862 identifies "Play" as a verb based on a word database associated with the music domain, which an IC component 1864 (also implemented by the music domain recognizer) may determine corresponds to a <PlayMusic> intent. At this stage, no determination has been made as to the meaning of "mother's little helper" or "the rolling stones," but based on grammar rules and models, the NER component 1862 has determined the text of these phrases relates to the grammatical object (i.e., entity) of the user input represented in the text data.

An NER component 1862 may tag text data to attribute meaning thereto. For example, an NER component 1862 may tag "play mother's little helper by the rolling stones" as: {domain} Music, {intent}<PlayMusic>, {artist name} rolling stones, {media type} SONG, and {song title} mother's little helper. For further example, the NER component 1862 may tag "play songs by the rolling stones" as: {domain} Music, {intent}<PlayMusic>, {artist name} rolling stones, and {media type} SONG.

The shortlister component 1850 may receive ASR output data 1610 output from the ASR component 1450 or output from the device 110*b* (as illustrated in FIG. 19). The ASR component 1450 may embed the ASR output data 1610 into a form processable by a trained model(s) using sentence embedding techniques as known in the art. Sentence embedding results in the ASR output data 1610 including text in a structure that enables the trained models of the shortlister component 1850 to operate on the ASR output data 1610. For example, an embedding of the ASR output data 1610 may be a vector representation of the ASR output data 1610.

The shortlister component 1850 may make binary determinations (e.g., yes or no) regarding which domains relate to the ASR output data 1610. The shortlister component 1850 may make such determinations using the one or more trained models described herein above. If the shortlister component 1850 implements a single trained model for each domain, the shortlister component 1850 may simply run the models that are associated with enabled domains as indicated in a user profile associated with the device 110 and/or user that originated the user input.

The shortlister component 1850 may generate n-best list data 1915 representing domains that may execute with respect to the user input represented in the ASR output data 1610. The size of the n-best list represented in the n-best list data 1915 is configurable. In an example, the n-best list data 1915 may indicate every domain of the system as well as contain an indication, for each domain, regarding whether the domain is likely capable to execute the user input represented in the ASR output data 1610. In another example, instead of indicating every domain of the system, the n-best list data 1915 may only indicate the domains that are likely to be able to execute the user input represented in the ASR output data 1610. In yet another example, the shortlister component 1850 may implement thresholding such that the n-best list data 1915 may indicate no more than a maximum number of domains that may execute the user input represented in the ASR output data 1610. In an example, the threshold number of domains that may be represented in the n-best list data 1915 is ten. In another example, the domains included in the n-best list data 1915 may be limited by a threshold a score, where only domains indicating a likelihood to handle the user input is above a certain score (as determined by processing the ASR output data 1610 by the shortlister component 1850 relative to such domains) are included in the n-best list data 1915.

The ASR output data 1610 may correspond to more than one ASR hypothesis. When this occurs, the shortlister component 1850 may output a different n-best list (represented in the n-best list data 1915) for each ASR hypothesis. Alternatively, the shortlister component 1850 may output a single n-best list representing the domains that are related to the multiple ASR hypotheses represented in the ASR output data 1610.

As indicated above, the shortlister component 1850 may implement thresholding such that an n-best list output therefrom may include no more than a threshold number of entries. If the ASR output data 1610 includes more than one ASR hypothesis, the n-best list output by the shortlister component 1850 may include no more than a threshold number of entries irrespective of the number of ASR hypotheses output by the ASR component 1450. Alternatively or in addition, the n-best list output by the shortlister component 1850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1610, the shortlister component 1850 may generate confidence scores representing likelihoods that domains relate to the ASR output data 1610. If the shortlister component 1850 implements a different trained model for each domain, the shortlister component 1850 may generate a different confidence score for each individual domain trained model that is run. If the shortlister component 1850 runs the models of every domain when ASR output data 1610 is received, the shortlister component 1850 may generate a different confidence score for each domain of the system. If the shortlister component 1850 runs the models of only the domains that are associated with skills indicated as enabled in a user profile associated with the device 110 and/or user that originated the user input, the shortlister component 1850 may only generate a different confidence score for each domain associated with at least one enabled skill. If the shortlister component 1850 implements a single trained model with domain specifically trained portions, the shortlister component 1850 may generate a different confidence score for each domain who's specifically trained portion is run. The shortlister component 1850 may perform matrix vector modification to obtain confidence scores for all domains of the system in a single instance of processing of the ASR output data 1610.

N-best list data 1915 including confidence scores that may be output by the shortlister component 1850 may be represented as, for example:

Search domain, 0.67
Recipe domain, 0.62
Information domain, 0.57
Shopping domain, 0.42

As indicated, the confidence scores output by the shortlister component 1850 may be numeric values. The confidence scores output by the shortlister component 1850 may alternatively be binned values (e.g., high, medium, low).

The n-best list may only include entries for domains having a confidence score satisfying (e.g., equaling or exceeding) a minimum threshold confidence score. Alternatively, the shortlister component 1850 may include entries for all domains associated with user enabled skills, even if one or more of the domains are associated with confidence scores that do not satisfy the minimum threshold confidence score.

The shortlister component 1850 may consider other data 1920 when determining which domains may relate to the user input represented in the ASR output data 1610 as well as respective confidence scores. The other data 1920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1920 may include an indicator of the user associated with the ASR output data 1610, for example as determined by the user recognition component 1495.

The other data 1920 may be character embedded prior to being input to the shortlister component 1850. The other data 1920 may alternatively be embedded using other techniques known in the art prior to being input to the shortlister component 1850.

The other data 1920 may also include data indicating the domains associated with skills that are enabled with respect to the device 110 and/or user that originated the user input. The shortlister component 1850 may use such data to determine which domain-specific trained models to run. That is, the shortlister component 1850 may determine to only run the trained models associated with domains that are associated with user-enabled skills. The shortlister component 1850 may alternatively use such data to alter confidence scores of domains.

As an example, considering two domains, a first domain associated with at least one enabled skill and a second domain not associated with any user-enabled skills of the user that originated the user input, the shortlister component 1850 may run a first model specific to the first domain as well as a second model specific to the second domain. Alternatively, the shortlister component 1850 may run a model configured to determine a score for each of the first and second domains. The shortlister component 1850 may determine a same confidence score for each of the first and second domains in the first instance. The shortlister component 1850 may then alter those confidence scores based on which domains is associated with at least one skill enabled by the present user. For example, the shortlister component 1850 may increase the confidence score associated with the domain associated with at least one enabled skill while leaving the confidence score associated with the other domain the same. Alternatively, the shortlister component 1850 may leave the confidence score associated with the domain associated with at least one enabled skill the same while decreasing the confidence score associated with the other domain. Moreover, the shortlister component 1850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 1470. When the shortlister component 1850 receives the ASR output data 1610, the shortlister component 1850 may determine whether profile data associated with the user and/or device 110 that originated the command includes an indication of enabled skills.

The other data 1920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1850 may use such data to determine which domain-specific trained models to run. For example, if the device 110 corresponds to a displayless type device, the shortlister component 1850 may determine not to run trained models specific to domains that output video data. The shortlister component 1850 may alternatively use such data to alter confidence scores of domains.

As an example, considering two domains, one that outputs audio data and another that outputs video data, the shortlister component 1850 may run a first model specific to the domain that generates audio data as well as a second model specific to the domain that generates video data. Alternatively the shortlister component 1850 may run a model configured to determine a score for each domain. The shortlister component 1850 may determine a same confidence score for each of the domains in the first instance. The shortlister component 1850 may then alter the original confidence scores based on the type of the device 110 that originated the user input corresponding to the ASR output data 1610. For example, if the device 110 is a displayless device, the shortlister component 1850 may increase the confidence score associated with the domain that generates audio data while leaving the confidence score associated with the domain that generates video data the same. Alternatively, if the device 110 is a displayless device, the shortlister component 1850 may leave the confidence score associated with the domain that generates audio data the same while decreasing the confidence score associated with the domain that generates video data. Moreover, if the device 110 is a displayless device, the shortlister component 1850 may increase the confidence score associated with the domain that generates audio data as well as decrease the confidence score associated with the domain that generates video data.

The type of device information represented in the other data 1920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones.

Thus, the other data 1920 may represent the smart TV of other display device, and not the displayless device that captured the spoken user input.

The other data 1920 may also include data indicating the user input originating device's speed, location, or other mobility information. For example, the device may correspond to a vehicle including a display. If the vehicle is moving, the shortlister component 1850 may decrease the confidence score associated with a domain that generates video data as it may be undesirable to output video content to a user while the user is driving. The device may output data to the system component(s) 120 indicating when the device is moving.

The other data 1920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1850 may use such data to alter confidence scores of domains. For example, the shortlister component 1850 may run a first model specific to a first domain as well as a second model specific to a second domain. Alternatively, the shortlister component 1850 may run a model configured to determine a score for each domain. The shortlister component 1850 may also determine a same confidence score for each of the domains in the first instance. The shortlister component 1850 may then alter the original confidence scores based on the first domain being invoked to cause the system to output content while the current user input was received. Based on the first domain being invoked, the shortlister component 1850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1915 generated by the shortlister component 1850 as well as the different types of other data 1920 considered by the shortlister component 1850 are configurable. For example, the shortlister component 1850 may update confidence scores as more other data 1920 is considered. For further example, the n-best list data 1915 may exclude relevant domains if thresholding is implemented. Thus, for example, the shortlister component 1850 may include an indication of a domain in the n-best list 1915 unless the shortlister component 1850 is one hundred percent confident that the domain may not execute the user input represented in the ASR output data 1610 (e.g., the shortlister component 1850 determines a confidence score of zero for the domain).

The shortlister component 1850 may send the ASR output data 1610 to recognizers 1863 associated with domains represented in the n-best list data 1915. Alternatively, the shortlister component 1850 may send the n-best list data

1915 or some other indicator of the selected subset of domains to another component (such as the orchestrator component 1430) which may in turn send the ASR output data 1610 to the recognizers 1863 corresponding to the domains included in the n-best list data 1915 or otherwise indicated in the indicator. If the shortlister component 1850 generates an n-best list representing domains without any associated confidence scores, the shortlister component 1850/orchestrator component 1430 may send the ASR output data 1610 to recognizers 1863 associated with domains that the shortlister component 1850 determines may execute the user input. If the shortlister component 1850 generates an n-best list representing domains with associated confidence scores, the shortlister component 1850/orchestrator component 1430 may send the ASR output data 1610 to recognizers 1863 associated with domains associated with confidence scores satisfying (e.g., meeting or exceeding) a threshold minimum confidence score.

A recognizer 1863 may output tagged text data generated by an NER component 1862 and an IC component 1864, as described herein above. The NLU component 1460 may compile the output tagged text data of the recognizers 1863 into a single cross-domain n-best list 1940 and may send the cross-domain n-best list 1940 to a pruning component 1950. Each entry of tagged text (e.g., each NLU hypothesis) represented in the cross-domain n-best list data 1940 may be associated with a respective score indicating a likelihood that the NLU hypothesis corresponds to the domain associated with the recognizer 1863 from which the NLU hypothesis was output. For example, the cross-domain n-best list data 1940 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1950 may sort the NLU hypotheses represented in the cross-domain n-best list data 1940 according to their respective scores. The pruning component 1950 may perform score thresholding with respect to the cross-domain NLU hypotheses. For example, the pruning component 1950 may select NLU hypotheses associated with scores satisfying (e.g., meeting and/or exceeding) a threshold score. The pruning component 1950 may also or alternatively perform number of NLU hypothesis thresholding. For example, the pruning component 1950 may select the top scoring NLU hypothesis(es). The pruning component 1950 may output a portion of the NLU hypotheses input thereto. The purpose of the pruning component 1950 is to create a reduced list of NLU hypotheses so that downstream, more resource intensive, processes may only operate on the NLU hypotheses that most likely represent the user's intent.

The NLU component 1460 may include a light slot filler component 1952. The light slot filler component 1952 can take text from slots represented in the NLU hypotheses output by the pruning component 1950 and alter them to make the text more easily processed by downstream components. The light slot filler component 1952 may perform low latency operations that do not involve heavy operations such as reference to a knowledge base (e.g., 1872. The purpose of the light slot filler component 1952 is to replace words with other words or values that may be more easily understood by downstream components. For example, if a NLU hypothesis includes the word "tomorrow," the light slot filler component 1952 may replace the word "tomorrow" with an actual date for purposes of downstream processing. Similarly, the light slot filler component 1952 may replace the word "CD" with "album" or the words "compact disc." The replaced words are then included in the cross-domain n-best list data 1960.

The cross-domain n-best list data 1960 may be input to an entity resolution component 1970. The entity resolution component 1970 can apply rules or other directives to standardize labels or tokens from previous stages into an intent/slot representation. The precise transformation may depend on the domain. For example, for a travel domain, the entity resolution component 1970 may transform text corresponding to "Boston airport" to the standard BOS three-letter code referring to the airport. The entity resolution component 1970 can refer to a knowledge base (e.g., 1872) that is used to specifically identify the precise entity referred to in each slot of each NLU hypothesis represented in the cross-domain n-best list data 1960. Specific intent/slot combinations may also be tied to a particular source, which may then be used to resolve the text. In the example "play songs by the stones," the entity resolution component 1970 may reference a personal music catalog, Amazon Music account, a user profile, or the like. The entity resolution component 1970 may output an altered n-best list that is based on the cross-domain n-best list 1960 but that includes more detailed information (e.g., entity IDs) about the specific entities mentioned in the slots and/or more detailed slot data that can eventually be used by a skill. The NLU component 1460 may include multiple entity resolution components 1970 and each entity resolution component 1970 may be specific to one or more domains.

The NLU component 1460 may include a reranker 1990. The reranker 1990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1970.

The reranker 1990 may apply re-scoring, biasing, or other techniques. The reranker 1990 may consider not only the data output by the entity resolution component 1970, but may also consider other data 1991. The other data 1991 may include a variety of information. For example, the other data 1991 may include skill rating or popularity data. For example, if one skill has a high rating, the reranker 1990 may increase the score of a NLU hypothesis that may be processed by the skill. The other data 1991 may also include information about skills that have been enabled by the user that originated the user input. For example, the reranker 1990 may assign higher scores to NLU hypothesis that may be processed by enabled skills than NLU hypothesis that may be processed by non-enabled skills. The other data 1991 may also include data indicating user usage history, such as if the user that originated the user input regularly uses a particular skill or does so at particular times of day. The other data 1991 may additionally include data indicating date, time, location, weather, type of device 110, user identifier, context, as well as other information. For example, the reranker 1990 may consider when any particular skill is currently active (e.g., music being played, a game being played, etc.).

As illustrated and described, the entity resolution component 1970 is implemented prior to the reranker 1990. The entity resolution component 1970 may alternatively be implemented after the reranker 1990. Implementing the entity resolution component 1970 after the reranker 1990 limits the NLU hypotheses processed by the entity resolution component 1970 to only those hypotheses that successfully pass through the reranker 1990.

The reranker 1990 may be a global reranker (e.g., one that is not specific to any particular domain). Alternatively, the NLU component 1460 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 1460 may perform NLU processing described above with respect to domains associated with skills wholly implemented as part of the system component(s) 120 (e.g., designated 1490 in FIG. 14). The NLU component 1460 may separately perform NLU processing described above with respect to domains associated with skills that are at least partially implemented as part of the skill system component(s) 125. In an example, the shortlister component 1850 may only process with respect to these latter domains. Results of these two NLU processing paths may be merged into NLU results data 1985, which may be sent to a post-NLU ranker 1465, which may be implemented by the system component(s) 120.

The post-NLU ranker 1465 may include a statistical component that produces a ranked list of intent/skill pairs with associated confidence scores. Each confidence score may indicate an adequacy of the skill's execution of the intent with respect to NLU results data associated with the skill. The post-NLU ranker 1465 may operate one or more trained models configured to process the NLU results data 1985, skill result data 1930, and the other data 1920 in order to output ranked output data 1925. The ranked output data 1925 may include an n-best list where the NLU hypotheses in the NLU results data 1985 are reordered such that the n-best list in the ranked output data 1925 represents a prioritized list of skills to respond to a user input as determined by the post-NLU ranker 1465. The ranked output data 1925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1465 enables the system to better determine the best skill to execute the user input. For example, first and second NLU hypotheses in the NLU results data 1985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1465 (or other scheduling component such as orchestrator component 1430) may solicit the first skill and the second skill to provide potential result data 1930 based on the first NLU hypothesis and the second NLU hypothesis, respectively. For example, the post-NLU ranker 1465 may send the first NLU hypothesis to the first skill 1490*a* along with a request for the first skill 1490*a* to at least partially execute with respect to the first NLU hypothesis. The post-NLU ranker 1465 may also send the second NLU hypothesis to the second skill 1490*b* along with a request for the second skill 1490*b* to at least partially execute with respect to the second NLU hypothesis. The post-NLU ranker 1465 receives, from the first skill 1490*a*, first result data 1930*a* generated from the first skill 1490*a*'s execution with respect to the first NLU hypothesis. The post-NLU ranker 1465 also receives, from the second skill 1490*b*, second results data 1930*b* generated from the second skill 1490*b*'s execution with respect to the second NLU hypothesis.

The result data 1930 may include various portions. For example, the result data 1930 may include content (e.g., audio data, text data, and/or video data) to be output to a user. The result data 1930 may also include a unique identifier used by the system component(s) 120 and/or the skill system component(s) 125 to locate the data to be output to a user. The result data 1930 may also include a directive (e.g., directing a device to perform an action). For example, if the user input corresponds to "turn on the light," the result data 1930 may include a directive causing the system to turn on a light associated with a profile of the device (110*a*/110*b*) and/or user.

The post-NLU ranker 1465 may consider the first result data 1930*a* and the second result data 1930*b* to alter the first confidence score and the second confidence score of the first NLU hypothesis and the second NLU hypothesis, respectively. That is, the post-NLU ranker 1465 may generate a third confidence score based on the first result data 1930*a* and the first confidence score. The third confidence score may correspond to how likely the post-NLU ranker 1465 determines the first skill will correctly respond to the user input. The post-NLU ranker 1465 may also generate a fourth confidence score based on the second result data 1930*b* and the second confidence score. One skilled in the art will appreciate that a first difference between the third confidence score and the fourth confidence score may be greater than a second difference between the first confidence score and the second confidence score. The post-NLU ranker 1465 may also consider the other data 1920 to generate the third confidence score and the fourth confidence score. While it has been described that the post-NLU ranker 1465 may alter the confidence scores associated with first and second NLU hypotheses, one skilled in the art will appreciate that the post-NLU ranker 1465 may alter the confidence scores of more than two NLU hypotheses. The post-NLU ranker 1465 may select the result data 1930 associated with the skill 1490 with the highest altered confidence score to be the data output in response to the current user input. The post-NLU ranker 1465 may also consider the ASR output data 1610 to alter the NLU hypotheses confidence scores.

The orchestrator component 1430 may, prior to sending the NLU results data 1985 to the post-NLU ranker 1465, associate intents in the NLU hypotheses with skills 1490. For example, if a NLU hypothesis includes a <PlayMusic> intent, the orchestrator component 1430 may associate the NLU hypothesis with one or more skills 1490 that can execute the <PlayMusic> intent. Thus, the orchestrator component 1430 may send the NLU results data 1985, including NLU hypotheses paired with skills 1490, to the post-NLU ranker 1465. In response to ASR output data 1610 corresponding to "what should I do for dinner today," the orchestrator component 1430 may generates pairs of skills 1490 with associated NLU hypotheses corresponding to:

Skill 1/NLU hypothesis including <Help> intent

Skill 2/NLU hypothesis including <Order> intent

Skill 3/NLU hypothesis including <DishType> intent

The post-NLU ranker 1465 queries each skill 1490, paired with a NLU hypothesis in the NLU results data 1985, to provide result data 1930 based on the NLU hypothesis with which it is associated. That is, with respect to each skill, the post-NLU ranker 1465 colloquially asks the each skill "if given this NLU hypothesis, what would you do with it." According to the above example, the post-NLU ranker 1465 may send skills 1490 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 1465 may query each of the skills 1490 in parallel or substantially in parallel.

A skill 1490 may provide the post-NLU ranker 1465 with various data and indications in response to the post-NLU ranker 1465 soliciting the skill 1490 for result data 1930. A skill 1490 may simply provide the post-NLU ranker 1465 with an indication of whether or not the skill can execute with respect to the NLU hypothesis it received. A skill 1490 may also or alternatively provide the post-NLU ranker 1465 with output data generated based on the NLU hypothesis it received. In some situations, a skill 1490 may need further information in addition to what is represented in the received NLU hypothesis to provide output data responsive to the user input. In these situations, the skill 1490 may provide the post-NLU ranker 1465 with result data 1930 indicating slots of a framework that the skill 1490 further needs filled or entities that the skill 1490 further needs resolved prior to the skill 1490 being able to provided result data 1930 responsive to the user input. The skill 1490 may also provide the post-NLU ranker 1465 with a directive and/or computer-generated speech indicating how the skill 1490 recommends the system solicit further information needed by the skill 1490. The skill 1490 may further provide the post-NLU ranker 1465 with an indication of whether the skill 1490 will have all needed information after the user provides additional information a single time, or whether the skill 1490 will need the user to provide various kinds of additional information prior to the skill 1490 having all needed information. According to the above example, skills 1490 may provide the post-NLU ranker 1465 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1930 includes an indication provided by a skill 1490 indicating whether or not the skill 1490 can execute with respect to a NLU hypothesis; data generated by a skill 1490 based on a NLU hypothesis; as well as an indication provided by a skill 1490 indicating the skill 1490 needs further information in addition to what is represented in the received NLU hypothesis.

The post-NLU ranker 1465 uses the result data 1930 provided by the skills 1490 to alter the NLU processing confidence scores generated by the reranker 1990. That is, the post-NLU ranker 1465 uses the result data 1930 provided by the queried skills 1490 to create larger differences between the NLU processing confidence scores generated by the reranker 1990. Without the post-NLU ranker 1465, the system may not be confident enough to determine an output in response to a user input, for example when the NLU hypotheses associated with multiple skills are too close for the system to confidently determine a single skill 1490 to invoke to respond to the user input. For example, if the system does not implement the post-NLU ranker 1465, the system may not be able to determine whether to obtain output data from a general reference information skill or a medical information skill in response to a user input corresponding to "what is acne."

The post-NLU ranker 1465 may prefer skills 1490 that provide result data 1930 responsive to NLU hypotheses over skills 1490 that provide result data 1930 corresponding to an indication that further information is needed, as well as skills 1490 that provide result data 1930 indicating they can provide multiple responses to received NLU hypotheses. For example, the post-NLU ranker 1465 may generate a first score for a first skill 1490a that is greater than the first skill's NLU confidence score based on the first skill 1490a providing result data 1930a including a response to a NLU hypothesis. For further example, the post-NLU ranker 1465 may generate a second score for a second skill 1490b that is less than the second skill's NLU confidence score based on the second skill 1490b providing result data 1930b indicating further information is needed for the second skill 1490b to provide a response to a NLU hypothesis. Yet further, for example, the post-NLU ranker 1465 may generate a third score for a third skill 1490c that is less than the third skill's NLU confidence score based on the third skill 1490c providing result data 1930c indicating the third skill 1490c can provide multiple responses to a NLU hypothesis.

The post-NLU ranker 1465 may consider other data 1920 in determining scores. The other data 1920 may include rankings associated with the queried skills 1490. A ranking may be a system ranking or a user-specific ranking. A ranking may indicate a veracity of a skill from the perspective of one or more users of the system. For example, the post-NLU ranker 1465 may generate a first score for a first skill 1490a that is greater than the first skill's NLU processing confidence score based on the first skill 1490a being associated with a high ranking. For further example, the post-NLU ranker 1465 may generate a second score for a second skill 1490b that is less than the second skill's NLU processing confidence score based on the second skill 1490b being associated with a low ranking.

The other data 1920 may include information indicating whether or not the user that originated the user input has enabled one or more of the queried skills 1490. For example, the post-NLU ranker 1465 may generate a first score for a first skill 1490a that is greater than the first skill's NLU processing confidence score based on the first skill 1490a being enabled by the user that originated the user input. For further example, the post-NLU ranker 1465 may generate a second score for a second skill 1490b that is less than the second skill's NLU processing confidence score based on the second skill 1490b not being enabled by the user that originated the user input. When the post-NLU ranker 1465 receives the NLU results data 1985, the post-NLU ranker

1465 may determine whether profile data, associated with the user and/or device that originated the user input, includes indications of enabled skills.

The other data 1920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1465 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1465 may increase the NLU processing confidence score associated with a first skill configured to output visual data and/or decrease the NLU processing confidence score associated with a second skill configured to output audio data.

The other data 1920 may include information indicating the veracity of the result data 1930 provided by a skill 1490. For example, if a user says "tell me a recipe for pasta sauce," a first skill 1490a may provide the post-NLU ranker 1465 with first result data 1930a corresponding to a first recipe associated with a five star rating and a second skill 1490b may provide the post-NLU ranker 1465 with second result data 1930b corresponding to a second recipe associated with a one star rating. In this situation, the post-NLU ranker 1465 may increase the NLU processing confidence score associated with the first skill 1490a based on the first skill 1490a providing the first result data 1930a associated with the five star rating and/or decrease the NLU processing confidence score associated with the second skill 1490b based on the second skill 1490b providing the second result data 1930b associated with the one star rating.

The other data 1920 may include information indicating the type of device that originated the user input. For example, the device may correspond to a "hotel room" type if the device is located in a hotel room. If a user inputs a command corresponding to "order me food" to the device located in the hotel room, the post-NLU ranker 1465 may increase the NLU processing confidence score associated with a first skill 1490a corresponding to a room service skill associated with the hotel and/or decrease the NLU processing confidence score associated with a second skill 1490b corresponding to a food skill not associated with the hotel.

The other data 1920 may include information indicating a location of the device and/or user that originated the user input. The system may be configured with skills 1490 that may only operate with respect to certain geographic locations. For example, a user may provide a user input corresponding to "when is the next train to Portland." A first skill 1490a may operate with respect to trains that arrive at, depart from, and pass through Portland, Oregon. A second skill 1490b may operate with respect to trains that arrive at, depart from, and pass through Portland, Maine. If the device and/or user that originated the user input is located in Seattle, Washington, the post-NLU ranker 1465 may increase the NLU processing confidence score associated with the first skill 1490a and/or decrease the NLU processing confidence score associated with the second skill 1490b. Likewise, if the device and/or user that originated the user input is located in Boston, Massachusetts, the post-NLU ranker 1465 may increase the NLU processing confidence score associated with the second skill 1490*b* and/or decrease the NLU processing confidence score associated with the first skill 1490*a*.

The other data 1920 may include information indicating a time of day. The system may be configured with skills 1490 that operate with respect to certain times of day. For example, a user may provide a user input corresponding to "order me food." A first skill 1490*a* may generate first result data 1930*a* corresponding to breakfast. A second skill 1490*b* may generate second result data 1930*b* corresponding to dinner. If the system component(s) 120 receives the user input in the morning, the post-NLU ranker 1465 may increase the NLU processing confidence score associated with the first skill 1490*a* and/or decrease the NLU processing score associated with the second skill 1490*b*. If the system component(s) 120 receives the user input in the afternoon or evening, the post-NLU ranker 1465 may increase the NLU processing confidence score associated with the second skill 1490*b* and/or decrease the NLU processing confidence score associated with the first skill 1490*a*.

The other data 1920 may include information indicating user preferences. The system may include multiple skills 1490 configured to execute in substantially the same manner. For example, a first skill 1490*a* and a second skill 1490*b* may both be configured to order food from respective restaurants. The system may store a user preference (e.g., in the profile storage 1470) that is associated with the user that provided the user input to the system component(s) 120 as well as indicates the user prefers the first skill 1490*a* over the second skill 1490*b*. Thus, when the user provides a user input that may be executed by both the first skill 1490*a* and the second skill 1490*b*, the post-NLU ranker 1465 may increase the NLU processing confidence score associated with the first skill 1490*a* and/or decrease the NLU processing confidence score associated with the second skill 1490*b*.

The other data 1920 may include information indicating system usage history associated with the user that originated the user input. For example, the system usage history may indicate the user originates user inputs that invoke a first skill 1490*a* more often than the user originates user inputs that invoke a second skill 1490*b*. Based on this, if the present user input may be executed by both the first skill 1490*a* and the second skill 1490*b*, the post-NLU ranker 1465 may increase the NLU processing confidence score associated with the first skill 1490*a* and/or decrease the NLU processing confidence score associated with the second skill 1490*b*.

The other data 1920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 1465 may increase the NLU processing confidence score associated with a first skill 1490*a* that generates audio data. The post-NLU ranker 1465 may also or alternatively decrease the NLU processing confidence score associated with a second skill 1490*b* that generates image data or video data.

The other data 1920 may include information indicating how long it took a skill 1490 to provide result data 1930 to the post-NLU ranker 1465. When the post-NLU ranker 1465 multiple skills 1490 for result data 1930, the skills 1490 may respond to the queries at different speeds. The post-NLU ranker 1465 may implement a latency budget. For example, if the post-NLU ranker 1465 determines a skill 1490 responds to the post-NLU ranker 1465 within a threshold amount of time from receiving a query from the post-NLU ranker 1465, the post-NLU ranker 1465 may increase the NLU processing confidence score associated with the skill 1490. Conversely, if the post-NLU ranker 1465 determines a skill 1490 does not respond to the post-NLU ranker 1465 within a threshold amount of time from receiving a query from the post-NLU ranker 1465, the post-NLU ranker 1465 may decrease the NLU processing confidence score associated with the skill 1490.

It has been described that the post-NLU ranker 1465 uses the other data 1920 to increase and decrease NLU processing confidence scores associated with various skills 1490 that the post-NLU ranker 1465 has already requested result data from. Alternatively, the post-NLU ranker 1465 may use the other data 1920 to determine which skills 1490 to request result data from. For example, the post-NLU ranker 1465 may use the other data 1920 to increase and/or decrease NLU processing confidence scores associated with skills 1490 associated with the NLU results data 1985 output by the NLU component 1460. The post-NLU ranker 1465 may select n-number of top scoring altered NLU processing confidence scores. The post-NLU ranker 1465 may then request result data 1930 from only the skills 1490 associated with the selected n-number of NLU processing confidence scores.

As described, the post-NLU ranker 1465 may request result data 1930 from all skills 1490 associated with the NLU results data 1985 output by the NLU component 1460. Alternatively, the system component(s) 120 may prefer result data 1930 from skills implemented entirely by the system component(s) 120 rather than skills at least partially implemented by the skill system component(s) 125. Therefore, in the first instance, the post-NLU ranker 1465 may request result data 1930 from only skills associated with the NLU results data 1985 and entirely implemented by the system component(s) 120. The post-NLU ranker 1465 may only request result data 1930 from skills associated with the NLU results data 1985, and at least partially implemented by the skill system component(s) 125, if none of the skills, wholly implemented by the system component(s) 120, provide the post-NLU ranker 1465 with result data 1930 indicating either data response to the NLU results data 1985, an indication that the skill can execute the user input, or an indication that further information is needed.

As indicated above, the post-NLU ranker 1465 may request result data 1930 from multiple skills 1490. If one of the skills 1490 provides result data 1930 indicating a response to a NLU hypothesis and the other skills provide result data 1930 indicating either they cannot execute or they need further information, the post-NLU ranker 1465 may select the result data 1930 including the response to the NLU hypothesis as the data to be output to the user. If more than one of the skills 1490 provides result data 1930 indicating responses to NLU hypotheses, the post-NLU ranker 1465 may consider the other data 1920 to generate altered NLU processing confidence scores, and select the result data 1930 of the skill associated with the greatest score as the data to be output to the user.

A system that does not implement the post-NLU ranker 1465 may select the highest scored NLU hypothesis in the NLU results data 1985. The system may send the NLU hypothesis to a skill 1490 associated therewith along with a request for output data. In some situations, the skill 1490 may not be able to provide the system with output data. This results in the system indicating to the user that the user input could not be processed even though another skill associated with lower ranked NLU hypothesis could have provided output data responsive to the user input.

The post-NLU ranker 1465 reduces instances of the aforementioned situation. As described, the post-NLU ranker 1465 queries multiple skills associated with the NLU results data 1985 to provide result data 1930 to the post-NLU ranker 1465 prior to the post-NLU ranker 1465 ultimately determining the skill 1490 to be invoked to respond to the user input. Some of the skills 1490 may provide result data 1930 indicating responses to NLU hypotheses while other skills 1490 may providing result data 1930 indicating the skills cannot provide responsive data. Whereas a system not implementing the post-NLU ranker 1465 may select one of the skills 1490 that could not provide a response, the post-NLU ranker 1465 only selects a skill 1490 that provides the post-NLU ranker 1465 with result data corresponding to a response, indicating further information is needed, or indicating multiple responses can be generated.

The post-NLU ranker 1465 may select result data 1930, associated with the skill 1490 associated with the highest score, for output to the user. Alternatively, the post-NLU ranker 1465 may output ranked output data 1925 indicating skills 1490 and their respective post-NLU ranker rankings. Since the post-NLU ranker 1465 receives result data 1930, potentially corresponding to a response to the user input, from the skills 1490 prior to post-NLU ranker 1465 selecting one of the skills or outputting the ranked output data 1925, little to no latency occurs from the time skills provide result data 1930 and the time the system outputs responds to the user.

If the post-NLU ranker 1465 selects result audio data to be output to a user and the system determines content should be output audibly, the post-NLU ranker 1465 (or another component of the system component(s) 120) may cause the device 110a and/or the device 110b to output audio corresponding to the result audio data. If the post-NLU ranker 1465 selects result text data to output to a user and the system determines content should be output visually, the post-NLU ranker 1465 (or another component of the system component(s) 120) may cause the device 110b to display text corresponding to the result text data. If the post-NLU ranker 1465 selects result audio data to output to a user and the system determines content should be output visually, the post-NLU ranker 1465 (or another component of the system component(s) 120) may send the result audio data to the ASR component 1450. The ASR component 1450 may generate output text data corresponding to the result audio data. The system component(s) 120 may then cause the device 110b to display text corresponding to the output text data. If the post-NLU ranker 1465 selects result text data to output to a user and the system determines content should be output audibly, the post-NLU ranker 1465 (or another component of the system component(s) 120) may send the result text data to the TTS component 1480. The TTS component 1480 may generate output audio data (corresponding to computer-generated speech) based on the result text data. The system component(s) 120 may then cause the device 110a and/or the device 110b to output audio corresponding to the output audio data.

As described, a skill 1490 may provide result data 1930 either indicating a response to the user input, indicating more information is needed for the skill 1490 to provide a response to the user input, or indicating the skill 1490 cannot provide a response to the user input. If the skill 1490 associated with the highest post-NLU ranker score provides the post-NLU ranker 1465 with result data 1930 indicating a response to the user input, the post-NLU ranker 1465 (or another component of the system component(s) 120, such as the orchestrator component 1430) may simply cause content corresponding to the result data 1930 to be output to the user. For example, the post-NLU ranker 1465 may send the result data 1930 to the orchestrator component 1430. The orchestrator component 1430 may cause the result data 1930 to be sent to the device (110a/110b), which may output audio and/or display text corresponding to the result data 1930. The orchestrator component 1430 may send the result data 1930 to the ASR component 1450 to generate output text data and/or may send the result data 1930 to the TTS component 1480 to generate output audio data, depending on the situation.

The skill 1490 associated with the highest post-NLU ranker score may provide the post-NLU ranker 1465 with result data 1930 indicating more information is needed as well as instruction data. The instruction data may indicate how the skill 1490 recommends the system obtain the needed information. For example, the instruction data may correspond to text data or audio data (i.e., computer-generated speech) corresponding to "please indicate." The instruction data may be in a format (e.g., text data or audio data) capable of being output by the device (110a/110b). When this occurs, the post-NLU ranker 1465 may simply cause the received instruction data be output by the device (110a/110b). Alternatively, the instruction data may be in a format that is not capable of being output by the device (110a/110b). When this occurs, the post-NLU ranker 1465 may cause the ASR component 1450 or the TTS component 1480 to process the instruction data, depending on the situation, to generate instruction data that may be output by the device (110a/110b). Once the user provides the system with all further information needed by the skill 1490, the skill 1490 may provide the system with result data 1930 indicating a response to the user input, which may be output by the system as detailed above.

The system may include "informational" skills 1490 that simply provide the system with information, which the system outputs to the user. The system may also include "transactional" skills 1490 that require a system instruction to execute the user input. Transactional skills 1490 include ride sharing skills, flight booking skills, etc. A transactional skill 1490 may simply provide the post-NLU ranker 1465 with result data 1930 indicating the transactional skill 1490 can execute the user input. The post-NLU ranker 1465 may then cause the system to solicit the user for an indication that the system is permitted to cause the transactional skill 1490 to execute the user input. The user-provided indication may be an audible indication or a tactile indication (e.g., activation of a virtual button or input of text via a virtual keyboard). In response to receiving the user-provided indication, the system may provide the transactional skill 1490 with data corresponding to the indication. In response, the transactional skill 1490 may execute the command (e.g., book a flight, book a train ticket, etc.). Thus, while the system may not further engage an informational skill 1490 after the informational skill 1490 provides the post-NLU ranker 1465 with result data 1930, the system may further engage a transactional skill 1490 after the transactional skill 1490 provides the post-NLU ranker 1465 with result data 1930 indicating the transactional skill 1490 may execute the user input.

In some instances, the post-NLU ranker 1465 may generate respective scores for first and second skills that are too close (e.g., are not different by at least a threshold difference) for the post-NLU ranker 1465 to make a confident determination regarding which skill should execute the user input. When this occurs, the system may request the user indicate which skill the user prefers to execute the user input. The system may output TTS-generated speech to the user to solicit which skill the user wants to execute the user input.

Figure 20:
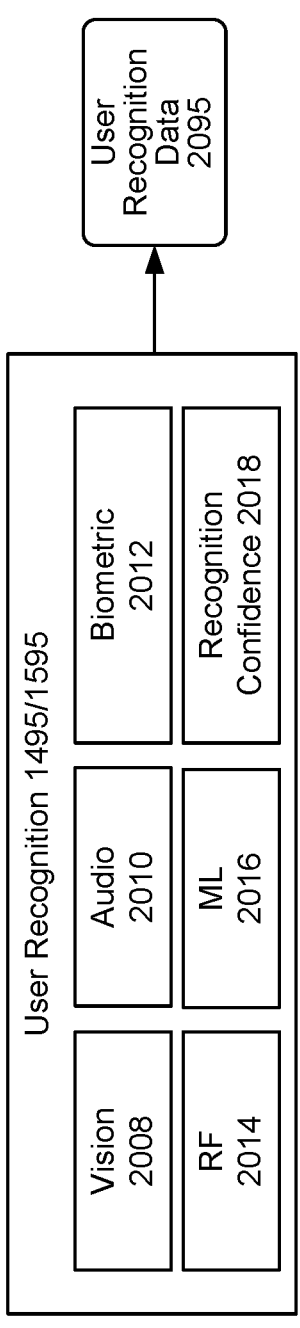
FIG. 20 is a schematic diagram of an illustrative architecture in which sensor data is combined to recognize one or more users according to embodiments of the present disclosure.

FIG. 20 is a schematic diagram of an illustrative architecture in which sensor data is combined to recognize one or more users according to embodiments of the present disclosure. The device 110 and/or the system component(s) 120 may include a user recognition component 1495 that recognizes one or more users using a variety of data. As illustrated in FIG. 20, the user recognition component 1495 may include one or more subcomponents including a vision component 2008, an audio component 2010, a biometric component 2012, a radio frequency (RF) component 2014, a machine learning (ML) component 2016, and a recognition confidence component 2018. In some instances, the user recognition component 1495 may monitor data and determinations from one or more subcomponents to determine an identity of one or more users associated with data input to the device 110 and/or the system component(s) 120. The user recognition component 1495 may output user recognition data 2095, which may include a user identifier associated with a user the user recognition component 1495 determines originated data input to the device 110 and/or the system component(s) 120. The user recognition data 2095 may be used to inform processes performed by various components of the device 110 and/or the system component(s) 120.

The vision component 2008 may receive data from one or more sensors capable of providing images (e.g., cameras) or sensors indicating motion (e.g., motion sensors). The vision component 2008 can perform facial recognition or image analysis to determine an identity of a user and to associate that identity with a user profile associated with the user. In some instances, when a user is facing a camera, the vision component 2008 may perform facial recognition and identify the user with a high degree of confidence. In other instances, the vision component 2008 may have a low degree of confidence of an identity of a user, and the user recognition component 1495 may utilize determinations from additional components to determine an identity of a user. The vision component 2008 can be used in conjunction with other components to determine an identity of a user. For example, the user recognition component 1495 may use data from the vision component 2008 with data from the audio component 2010 to identify what user's face appears to be speaking at the same time audio is captured by a device 110 the user is facing for purposes of identifying a user who spoke an input to the device 110 and/or the system component(s) 120.

The overall system of the present disclosure may include biometric sensors that transmit data to the biometric component 2012. For example, the biometric component 2012 may receive data corresponding to fingerprints, iris or retina scans, thermal scans, weights of users, a size of a user, pressure (e.g., within floor sensors), etc., and may determine a biometric profile corresponding to a user. The biometric component 2012 may distinguish between a user and sound from a television, for example. Thus, the biometric component 2012 may incorporate biometric information into a confidence level for determining an identity of a user. Biometric information output by the biometric component

2012 can be associated with specific user profile data such that the biometric information uniquely identifies a user profile of a user.

The radio frequency (RF) component 2014 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 2014 the strength of the signal (e.g., as a received signal strength indication (RSSI)). The RF component 2014 may use the RSSI to determine an identity of a user (with an associated confidence level). In some instances, the RF component 2014 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 2016 may consider the behavior of various users as a factor in determining a confidence level of the identity of the user. By way of example, a user may adhere to a regular schedule such that the user is at a first location during the day (e.g., at work or at school). In this example, the ML component 2016 would factor in past behavior and/or trends in determining the identity of the user that provided input to the device 110 and/or the system component(s) 120. Thus, the ML component 2016 may use historical data and/or usage patterns over time to increase or decrease a confidence level of an identity of a user.

In at least some instances, the recognition confidence component 2018 receives determinations from the various components 2008, 2010, 2012, 2014, and 2016, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 2095.

The audio component 2010 may receive data from one or more sensors capable of providing an audio signal (e.g., one or more microphones) to facilitate recognition of a user. The audio component 2010 may perform audio recognition on an audio signal to determine an identity of the user and associated user identifier. In some instances, aspects of device 110 and/or the system component(s) 120 may be configured at a computing device (e.g., a local server). Thus, in some instances, the audio component 2010 operating on a computing device may analyze all sound to facilitate recognition of a user. In some instances, the audio component 2010 may perform voice recognition to determine an identity of a user.

The audio component 2010 may also perform user identification based on audio data 1411 input into the device 110 and/or the system component(s) 120 for speech processing. The audio component 2010 may determine scores indicating whether speech in the audio data 1411 originated from particular users. For example, a first score may indicate a likelihood that speech in the audio data 1411 originated from a first user associated with a first user identifier, a second score may indicate a likelihood that speech in the audio data 1411 originated from a second user associated with a second user identifier, etc. The audio component 2010 may perform user recognition by comparing speech characteristics represented in the audio data 1411 to stored speech characteristics of users (e.g., stored voice profiles associated with the device 110 that captured the spoken user input).

Figure 21:
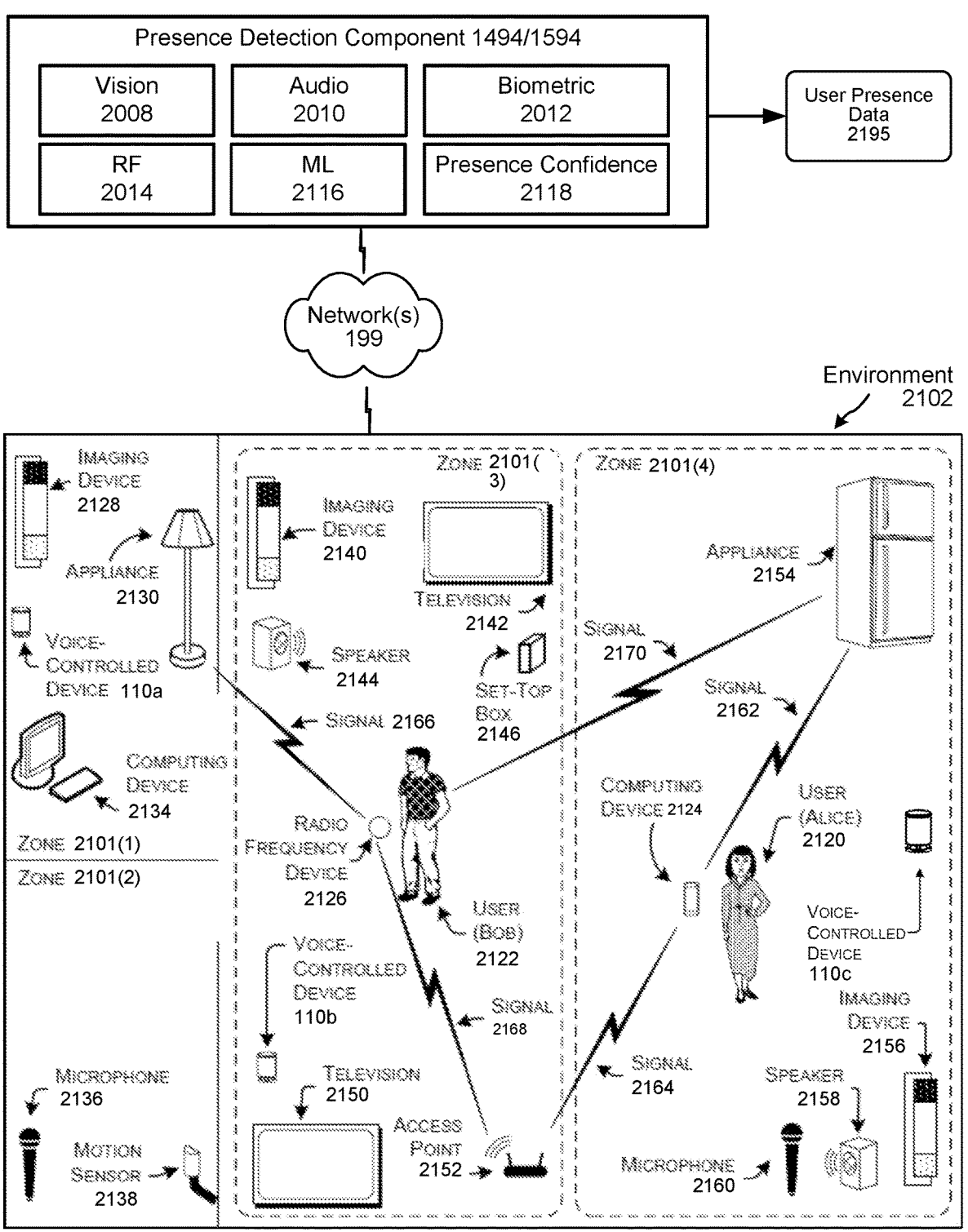
FIG. 21 is a schematic diagram of an illustrative architecture in which sensor data is combined to determine the presence and/or location of one or more users according to embodiments of the present disclosure.

FIG. 21 is a schematic diagram of an illustrative architecture in which sensor data is combined to determine the presence and/or location of one or more users according to embodiments of the present disclosure. A presence detection component 1494/1594 may determine the presence and/or location of one or more users using a variety of data. As illustrated in FIG. 21, the presence detection component 1494/1594 may include one or more components, similar to (but potentially separate from) those used in the user recognition component 1495, such as a vision component 2008, an audio component 2010, a biometric component 2012, a radio frequency component 2014, or the like. The presence detection component 1494 may use these components to determine the presence of users within an environment. The presence detection component 1494 may base its operation on sensor data detected by a variety of devices, for example devise such as those shown in FIG. 21 which may provide image data, audio data, RF data or even data from other sensors not expressly shown in FIG. 21 such as a RADAR sensor, LIDAR sensor, proximity sensor, etc.

Thus, in some instances, the presence detection component 1494 may monitor data and determinations from one or more components to determine an identity of a user and/or a location of a user in an environment 2102. The presence detection component 1494 may output user presence data 2195 which may indicate the presence of one or more users in an environment. The user presence data 2195 may also indicate a location of the user within the environment if the system has determined such information. The user presence data 2195 may also include a user identifier (e.g., user recognition data 2095) matched with location information as to where the system believes the particular user of the user identifier is located. Such data may rely on processing by the user recognition component 1495.

The location information may include geographic information (such as an address, city, state, country, geo-position (e.g., GPS coordinates), velocity, latitude, longitude, altitude, or the like). The location information may also include a device identifier, zone identifier or environment identifier corresponding to a device/zone/environment the particular user is nearby/within. Output of the presence detection component 1494 may be used to inform natural language component 1460 processes as well as processing performed by skills 1490, routing of output data, permission access to further information, etc. The details of the vision component 2008, the audio component 2010, the biometric component 2012, the radio frequency component 2014, the machine learning component 2116, and the presence confidence component 2118 are provided below following a description of the environment 2102.

In some instances, the environment 2102 may represent a home or office associated with a user 2120 "Alice" and/or a user 2122 "Bob." In some instances, the user 2120 "Alice" may be associated with a computing device 2124, such as a smartphone. In some instances, the user 2122 "Bob" may be associated with a radio frequency device 2126, such as a wearable device (e.g., a smartwatch) or an identifier beacon.

The environment 2102 may include, but is not limited to, a number of devices that may be used to locate a user. For example, within zone 2101(1), the environment 2102 may include an imaging device 2128, an appliance 2130, a voice-controlled device 110a, and a computing device 2134. Within zone 2101(2), the environment 2102 may include a microphone 2136 and a motion sensor 2138. Within zone 2101(3), the environment may include an imaging device 2140, a television 2142, a speaker 2144, a set-top box 2146, a voice-controlled device 110b, a television 2150, and an access point 2152. Within zone 2101(4), the environment 2102 may include an appliance 2154, an imaging device 2156, a speaker 2158, a voice-controlled device 110c, and a microphone 2160.

Further, in some instances, the presence detection component 1494 may have information regarding the layout of the environment 2102, include details regarding which devices are in which zones, the relationship between zones (e.g., which rooms are adjacent), and/or the placement of individual devices within each zone. In some instances, the presence detection component 1494 can leverage knowledge of the relationships between zones and the devices within each zone to increase a confidence level of user identity and location as a user moves about the environment 2102. For example, in a case where the user 2122 is in zone 2101(3), and subsequently moves beyond a field of view of the imaging device 2140 into the zone 2101(2), the presence detection component 1494 may infer a location and/or identity of the user to determine with a high confidence level (in combination with data from one or more other devices) that any motion detected by the motion sensor 2138 corresponds to movement by the user 2122.

In some instances, the vision component 2008 may receive data from one or more sensors capable of providing images (e.g., such as the imaging devices 2128, 2140, 2156 and the computing devices 2124 and 2134) or sensors indicating motion (e.g., such as the motion sensor 2138). In some instances, the vision component 2008 can perform facial recognition or image analysis to determine an identity of a user and to associate that identity with a user profile associated with the user. In some instances, when a user (e.g., the user 2122 "Bob") is facing the imaging device 2140, the vision component 2008 may perform facial recognition and identify the user 2122 with a high degree of confidence. In some instances, the vision component 2008 may have a low degree of confidence of an identity of a user, and the presence detection component 1494 may utilize determinations from additional components to determine an identity and/or location of a user. In some instances, the vision component 2008 can be used in conjunction with other components to determine when a user is moving to a new location within the environment 2102. In some instances, the vision component 2008 can receive data from one or more imaging devices to determine a layout of a zone or room, and/or to determine which devices are in a zone and where they are located. In some instances, data from the vision component 2008 may be used with data from the audio component 2010 to identify what face appears to be speaking at the same time audio is captured by a particular device the user is facing for purposes of identifying a user who spoke an utterance.

In some instances, the environment 2102 may include biometric sensors that may transmit data to the biometric component 2012. For example, the biometric component 2012 may receive data corresponding to fingerprints, iris or retina scans, thermal scans, weights of users, a size of a user, pressure (e.g., within floor sensors), etc., and may determine a biometric profile corresponding to a user. In some instances, the biometric component 2012 may distinguish between a user and sound from a television, for example. Thus, the biometric component 2012 may incorporate biometric information into a confidence level for determining an identity and/or location of a user. In some instances, the biometric information from the biometric component 2012 can be associated with a specific user profile such that the biometric information uniquely identifies a user profile of a user (for example in conjunction with user recognition component 1495).

In some instances, the radio frequency (RF) component 2014 may use RF localization to track devices that a user may carry or wear. For example, as discussed above, the user 2120 (and a user profile associated with the user) may be associated with a computing device 2124. The computing device 2124 may emit RF signals (e.g., Wi-Fi, Bluetooth®, etc.), which are illustrated as signals 2162 and 2164. As illustrated, the appliance 2154 may detect the signal 2162 and the access point 2152 may detect the signal 2164. In some instances, the access point 2152 and the appliance 2154 may indicate to the RF component 2014 the strength of the signals 2164 and 2162 (e.g., as a received signal strength indication (RSSI)), respectively. Thus, the RF component 2014 may compare the RSSI for various signals and for various appliances and may determine an identity and/or location of a user (with an associated confidence level). In some instances, the RF component 2014 may determine that a received RF signal is associated with a mobile device that is associated with a particular user. In some instances, a device (e.g., the access point 2152) may be configured with multiple antennas to determine a location of a user relative to the device using beamforming or spatial diversity techniques. In such a case, the RF component 2014 may receive an indication of the direction of the user relative to an individual device.

As illustrated, the appliance 2130 may receive a signal 2166 from the RF device 2126 associated with the user and a user profile, while the access point 2152 may receive a signal 2168. Further, the appliance 2154 can receive a signal 2170 from the RF device 2126. In an example where there is some uncertainty about an identity of the users in zones 2101(3) and 2101(4), the RF component 2014 may determine that the RSSI of the signals 2162, 2164, 2166, 2168, and/or 2170 increases or decreases a confidence level of an identity and/or location of the users, such as the user 2120 and 2122. For example, if an RSSI of the signal 2162 is higher than the RSSI of the signal 2170, the RF component may determine that it is more likely that a user in the zone 2101(4) is the user 2120 than the user 2122. In some instances, a confidence level of the determination may depend on a relative difference of the RSSIs, for example.

In some instances a voice controlled device 110, or another device proximate to the voice controlled device 110 may include some RF or other detection processing capabilities so that a user who speaks an utterance may scan, tap, or otherwise acknowledge his/her personal device (such as a phone) to a sensing device in the environment 2102. In this manner the user may "register" with the system for purposes of the system determining who spoke a particular utterance. Such a registration may occur prior to, during, or after speaking of an utterance.

In some instances, the audio component 2010 may receive data from one or more sensors capable of providing an audio signal (e.g., the voice-controlled devices 110a-c, the microphones 2136 and 2160, the computing devices 2124 and 2134, the set-top box 2146) to facilitate locating a user. In some instances, the audio component 2010 may perform audio recognition on an audio signal to determine an identity of the user and an associated user profile. Further, in some instances, the imaging devices 2128, 2140, and 2156 may provide an audio signal to the audio component 2010. In some instances, the audio component 2010 is configured to receive an audio signal from one or more devices and may determine a sound level or volume of the source of the audio. In some instances, if multiple sources of audio are available, the audio component 2010 may determine that two audio signals correspond to the same source of sound, and may compare the relative amplitudes or volumes of the audio signal to determine a location of the source of sound. In some instances, individual devices may include multiple microphone and may determine a direction of a user with respect to an individual device. In some instances, aspects of the system component(s) 120 may be configured at a computing device (e.g., a local server) within the environment 2102. Thus, in some instances, the audio component 2010 operating on a computing device in the environment 2102 may analyze all sound within the environment 2102 (e.g., without requiring a wake word) to facilitate locating a user.

Figure 22:
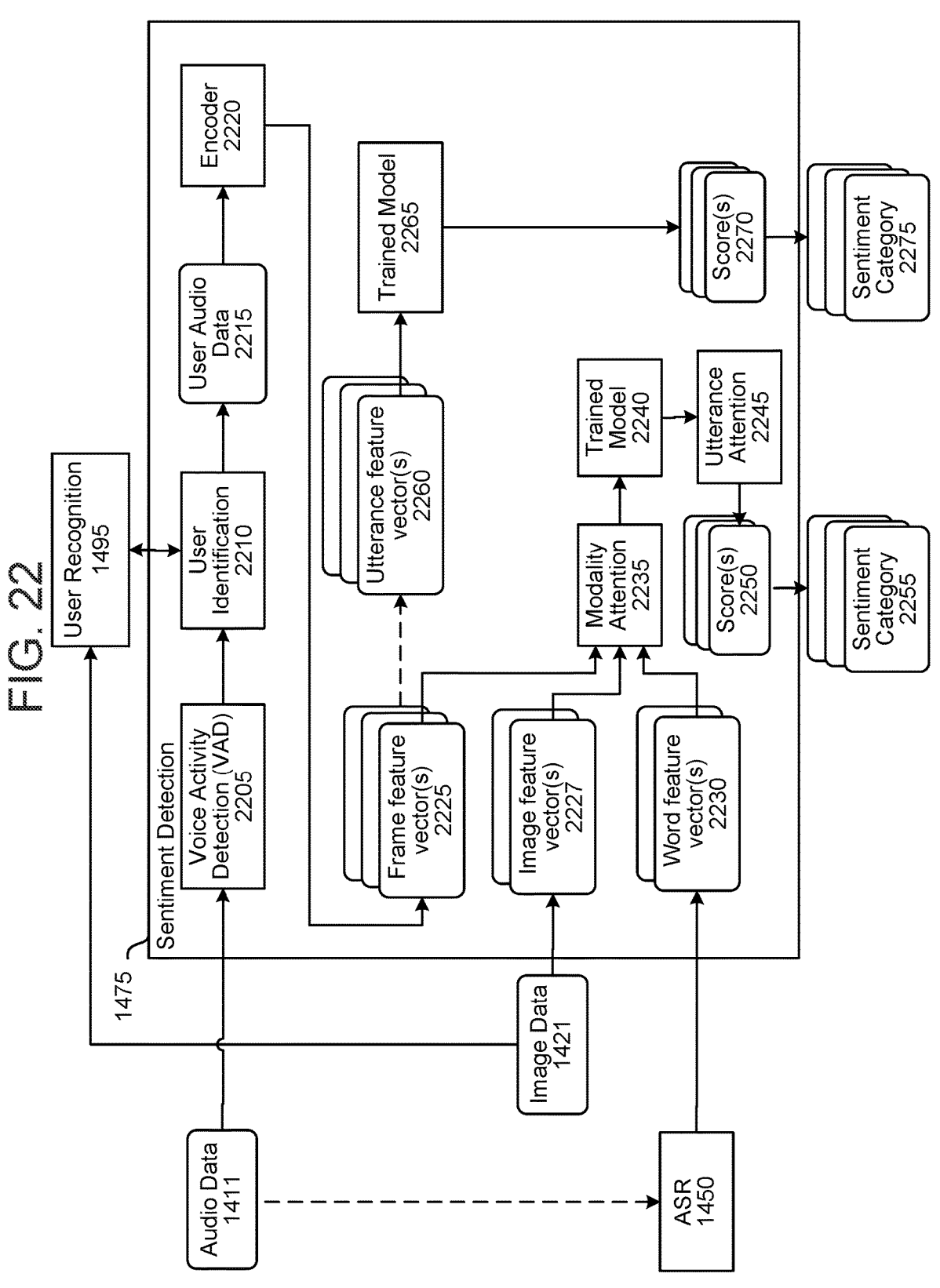
FIG. 22 is a conceptual diagram illustrating a sentiment detection component according to embodiments of the present disclosure.

FIG. 22 is a conceptual diagram illustrating sentiment detection component 1475 according to embodiments of the present disclosure. The sentiment detection component 1475 may determine a user sentiment based on audio data 1411, image data 1411, and other data. Although certain configurations/operations of the sentiment detection component 1475 are illustrated in FIG. 22 and described herein, other techniques/configurations of sentiment detection may be used depending on system configuration.

The sentiment detection component 1475 may include a voice activity detection (VAD) component 2205, a user identification component 2210, an encoder component 2220, a modality attention layer 2235, a trained model component 2240, an utterance attention layer 2245, and a trained model component 2265. The audio data 1411 captured by a device 110 may be inputted into the VAD component 2205. The VAD component 2205 may determine if the audio data 1411 includes speech spoken by a human or voice activity by a human, and may determine a portion of the audio data 1411 that includes speech or voice activity. The VAD component 2205 may send the portion of the audio data 1411 including speech or voice activity to the user identification component 2210. The VAD component 2205 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 2205 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 2210 may communicate with the user recognition component 1495 to determine user audio data 2215 that corresponds to a particular user profile. The user recognition component 1495 may recognize one or more users as described in connection with FIG. 20. The user audio data 2215 may be a portion of the audio data 1411 that includes speech or one or more utterances from a particular user associated with the user profile. In other words, audio data representing a particular user's speech may be isolated and stored as the user audio data 2215 for further analysis. In an example embodiment, the user may be associated with or using the device 110, and may have provided permission to the system 100 to record and analyze his or her voice/conversations to determine a sentiment category corresponding to the conversation.

The user audio data 2215 may be input into the encoder component 2220 to determine frame feature vector(s) 2225. The encoder component 2220 may be a bidirectional LSTM. The frame feature vector(s) 2225 may represent audio frame level features extracted from the user audio data 2215. One frame feature vector 2225 may represent audio frame level features for an audio frame of 20 ms of the user audio data 2215. The frame feature vector(s) 2225 may be derived by spectral analysis of the user audio data 2215. The sentiment detection component 1475 may determine the portions of user audio data 2215 that correspond to individual words and may extract acoustic features from the respective portions of audio using the encoder component 2220.

In some embodiments, the frame feature vector(s) 2225 may be used to determine utterance feature vector(s) 2260 representing utterance-level features of one or more utterances represented in the user audio data 2215. The utterance feature vector(s) 2260 may be determined by performing statistics calculations, delta calculation and other processing on the frame feature vector(s) 2225 for the audio frames corresponding to an utterance of interest. As such, the utterance feature vector(s) 2260 may be a feature matrix whose dimensions are based on the number of audio frames corresponding to the utterance of interest and the dimension of the corresponding frame feature vector 2225. The utterance feature vector(s) 2260 may be a high-level function or other mathematical functions representing the utterance-level features.

The ASR component 1450, as described above, may generate ASR output data, for example including text data representative of one or more utterances represented in the audio data 1411. In some examples, the system sends audio data 1411 to the ASR component 1450 for processing. In other examples, the system sends user audio data 2215 to the ASR component 1450 for processing. The ASR output may be represented as word feature vector(s) 2230, where each word feature vector 2230 may correspond to a word in the text data determined by the ASR component 1450 and may represent lexical information of the utterance. The word feature vector 2230 may be a word embedding.

In an example embodiment, the sentiment detection component 1475 determines that the user audio data 2215 includes an entire utterance. That is, the sentiment detection component 1475 may determine that a beginpoint of the user audio data 2215 corresponds to a beginpoint of an utterance, and an endpoint of the user audio data 2215 corresponds to an endpoint of the utterance. In this case, the frame feature vector(s) 2225 and the word feature vector(s) 2230 may represent all the words in one utterance.

The sentiment detection component 1475 may also input image data 1411 which may come from still images, an image feed of video data, or the like for example from one or more cameras of device 110 or otherwise. The image data 1411 may include a representation of a user which the system may analyze to determine the user's sentiment.

Image data 1411 may be processed by an encoder (not illustrated) to determine image feature vector(s) 2227. Such an encoder may be included as part of sentiment detection component 1475 or may be located separately, in which case image feature vector(s) 2227 may be input into sentiment detection component 1475 in addition to or instead of image data 1411. The image data/feature vectors may be analyzed separately by sentiment detection component 1475 if audio data/ASR data is unavailable. The image data/feature vectors may also be analyzed in conjunction with the audio data/ASR output data.

The sentiment detection component 1475 may align a frame feature vector 2225 with a corresponding word feature vector 2230 such that the pair represents acoustic information and lexical information, respectively, for an individual word in the utterance represented in user audio data 2215. The sentiment detection component 1475 may similarly align one or more image feature vector(s) 2227 with one or more frame feature vector(s) 2225 and/or corresponding word feature vector(s) 2230 so the appropriate image(s) are matched with the frames/ASR output data thus allowing the system to consider the audio, content and image of the user talking when performing sentiment analysis. The frame feature vectors 2225, image feature vector(s) 2227, and the word feature vectors 2230 may be processed by the trained model 2240 simultaneously.

The trained model 2240 may process the frame feature vector(s) 2225 and corresponding word feature vector(s) 2230 using a machine learning model. In some embodiments, the sentiment detection component 1475 includes a modality attention component 2235 configured to determine how much acoustic information versus how much lexical information versus how much image information from the respective feature vectors 2225/2227/2230 should be used by the trained model 2240. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 2235 may assign a weight or percentage to the data represented by the acoustic feature vectors, the data represented by the image feature vectors, and the data represented by the lexical feature vectors to indicate the importance of each to the trained model 2240.

The trained model 2240 may be a neural network, for example a bi-directional LSTM. The output of the trained model 2240 may be fed into an utterance attention component 2245. The utterance attention component 2245 may employ a neural network, for example a recurrent neural network, although the disclosure is not limited thereto. The utterance attention component 2245 may be configured to emphasize relevant portions of an input utterance. The utterance attention component 2245 may be configured to take in output data from the trained model 2240 and produce an output for every time step (e.g., a 10 ms audio frame). The utterance attention component 2245 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 2245 is configured to realize that the first word corresponds to an anger sentiment and that that should affect the processing of the other words in the utterance to ultimately determine a sentiment category corresponding to the utterance.

The utterance attention component 2245 may output score(s) 2250 indicating a sentiment category 2255 for the user audio data 2215. The sentiment detection component 1475 may predict from multiple sentiment categories, including but not limited to, happiness, sadness, anger and neutral. In an example embodiment, the sentiment category 2255 may be determined after score(s) 2250 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 1475 is configured to determine a sentiment category 2275 at an utterance-level. The sentiment detection component 1475 may use contextual information from the entire utterance to determine an overall sentiment of the speaker when speaking the utterance. The sentiment detection component 1475 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 1475 may be configured to determine a sentiment category on a word level (that is for each word within an utterance).

As illustrated in FIG. 22, the trained model component 2265 may process the utterance feature vector(s) 2260 using a fully-connected neural network trained using techniques known to one of skill in the art. The trained model component 2265 may output score(s) 2270 indicating a sentiment category 2275 for the user audio data 2215.

The sentiment detection component 1475 may predict one of three sentiment categories 2255/2275. In some examples, the sentiment categories 2255/2275 may be positive, neutral, and negative. However, the disclosure is not limited thereto, and in other examples the sentiment categories 2255/2275 may be angry, neutral (e.g., neutral/sad), and happy without departing from the disclosure. Additionally or alternatively, the sentiment detection component 1475 may predict any number of sentiment categories 2255/2275 without departing from the disclosure. For example, the sentiment detection component 1475 may predict one of four sentiment categories 2255/2275, such as angry, sad, neutral, and happy, although the disclosure is not limited thereto.

The machine learning model for the trained model component 2240/2265 may take many forms, including a neural network. The trained model component 2240/2265 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 23:
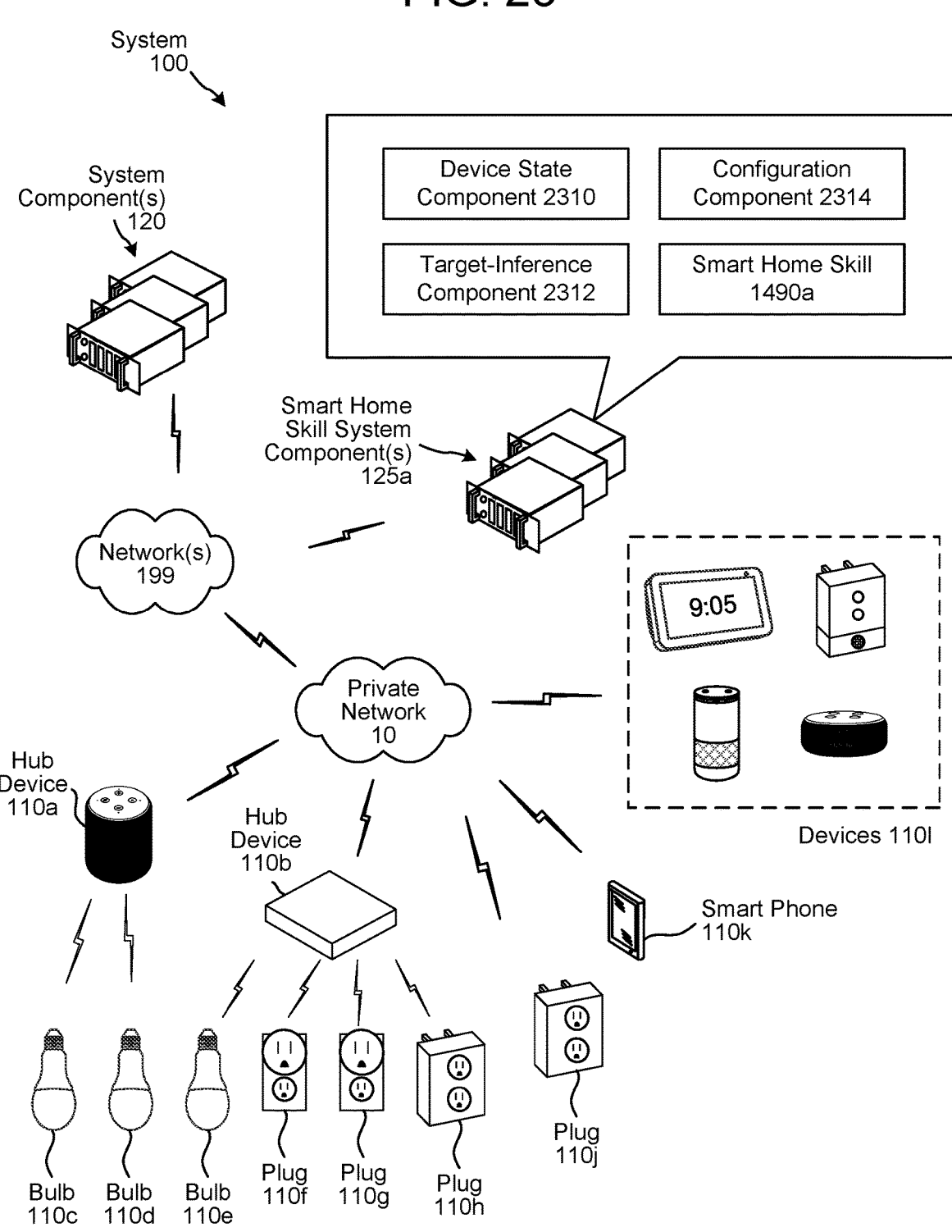
FIG. 23 illustrates a schematic diagram of an example system for a smart home environment according to embodiments of the present disclosure.

FIG. 23 illustrates a schematic diagram of an example system for a smart home environment according to embodiments of the present disclosure. As illustrated in FIG. 23, the system 100 may include the smart home skill system component(s) 125a configured to monitor device state data and/or event data associated with a plurality of devices 110. For example, the smart home skill system component(s) 125a may receive device state data from and/or send commands to each of the plurality of devices 110, enabling the smart home skill system component(s) 125a to remotely control and/or monitor the plurality of devices 110 in a smart home environment. Additionally or alternatively, the smart home skill system component(s) 125a may receive event data generated by the plurality of devices 110, enabling the smart home skill system component(s) 125a to monitor activity detected by sensors connected to the plurality of devices 110.

The system 100 may include a user device 110, local to a user, in communication with the smart home skill system component(s) 125a via the private network 10 and/or the network(s) 199. The system 100 may further include one or more smart home devices, such as a light bulb, an outlet, a light switch, etc. One or more of the smart home device(s) may be in communication with the smart home skill system component(s) 125a and/or the device 110 via the private network 10 and/or the network(s) 199. The network(s) 199 may include any combination of the Internet and/or any other wide- or local-area network, and may include wired, wireless, and/or cellular network hardware. In some embodiments, one or more of the smart home devices may be in communication with the device 110 via the private network 10 (e.g., a home network), Bluetooth, Near Field Communication (NFC), etc. However, the disclosure is not limited thereto, and in other examples one or more of the smart home devices may be in communication with the device 110 via a point-to-point communication path (e.g., Bluetooth, Zigbee, BLE Mesh, proprietary protocols over WiFi, Matter over WiFi and Thread, Local Adapter Platform, etc.) without departing from the disclosure.

The device 110 may include or may be in communication with one or more components that enable the user to operate the smart home device(s). Some smart home devices may also include components that enable the user to operate the smart home device. A device group, as used herein, may include a combination of user devices 110 and/or smart home devices. Example smart home devices include, but are not limited to, light switches, TVs, plugs, outlets, light bulbs, motion sensors, speakers, door locks, window locks, garage doors, security cameras, home monitoring devices, ovens, microwaves, washers, dryers, temperature sensors, and thermostats. The smart home devices may also include smart devices outside a home that may be in a different environment (such as an office, a hotel room, a lobby, a store, a vehicle, etc.). Control of the smart home devices may include control of device components attached to or in communication with the smart home device, such as, device sensors (e.g., gas tank sensor, tire pressure sensor, fridge door sensor, front door sensor, temperature sensors, etc.), device timers (e.g., washing machine timer, oven timer, etc.), and other components (e.g., washing machine settings, vehicle speakers, vehicle controls, etc.).

More than one environment, which may be referred to as "premises", may be associated with the user, where individual premises may include different sets of smart home devices and/or devices 110. For example, the user may have a primary home, including a first set of devices, a vacation home including a second set of devices, a vehicle including a third set of devices, etc.

The smart home skill system component(s) 125a may include various components. For example, the smart home skill system component(s) 125a may include a device control application, a device group storage component, and a group synchronization service (GSS), although the disclosure is not limited thereto. The device control application may receive user inputs, via, for example, a corresponding application on the device 110, that enables control of the device(s) 110 and/or smart home devices. The corresponding application on the device 110 may provide a user interface for the user to provide various inputs, such as authorization for synchronizing device groups, adding or removing devices 110 and/or smart home devices, modifying settings for the devices 110 and/or smart home devices, etc. In some examples, some of the functionalities described as being performed by the device control application may be performed by the corresponding application on the device 110. The device control application may be a first device control application that can be used to control a particular set of devices 110 and/or smart home devices. Control of a device 110 and/or smart home device by the device control application may depend on device configurations for the device, such as device type, device manufacturer, device settings, etc.

The system 100 may also include one or more device control supporting device(s), which are in communication with the smart home skill system component(s) 125a. The device control supporting device(s) may also be in communication with the device 110 via the network(s) 199 without departing from the disclosure. The device control supporting device(s) may include or support another device control application(s), separate from the device control application, that can be used to control another set of devices (depending on, for example, device configurations for the device). For example, a first smart home device may be controllable using the device control application, a second smart home device may be controllable using a second device control application of the device control supporting device(s), etc. Some devices may be controllable using more than one device control application, depending on how the user configures the device. The functionalities of the device control supporting device(s) may be provided as a skill component (e.g., skill component(s), skill supporting device(s)), an application, or other system components, The device 110 may include a first application corresponding to the smart home device supporting device(s) that enables the user to control first smart home devices (e.g., Amazon Alexa compatible devices). The device 110 may further include a second separate application corresponding to the device control supporting device(s) that enables the user to control second smart home devices (e.g., Philips Hue compatible devices). In some embodiments, the first smart home devices and the second smart home devices may include overlapping devices, for example, a light bulb that can be controlled using both the first application and the second application. Some operations of the smart home devices may be enabled via the application(s) on the device 110, without communications needed with the supporting devices. For example, the user may select a GUI button presented via a user interface of the application at the device 110 to turn on the light bulb. In some embodiments, the applications on the device 110 may also perform functions of synchronizing device groups, as described herein.

In some examples, the user may provide an input using the device 110, where such input may be a spoken input, a typed input, selection of GUI element, a gesture input, etc. Additionally or alternatively, the device 110 may be displaying a user interface (UI) screen corresponding to the device control application, where the UI screen may be requesting permission, from the user, to synchronize device groups across different device control applications, although the disclosure is not limited thereto.

In some embodiments, the UI screen may show data identifying the different device control applications available in the system 100 for device group synchronization, where such device control applications may be systems, skills or other components (e.g., the device control supporting device(s)) that are registered or otherwise configured to operate in conjunction with the smart home supporting device(s). In other embodiments, the UI screen may show data identifying the device control applications that the user has access to based on, for example, the user setting up/connecting the device control applications to a user profile of the user. The user profile may be stored in a profile storage component described above. In yet other embodiments, the device control applications shown to the user may be ones that correspond to the smart home devices within the user's environment.

As illustrated in FIG. 23, one or more devices 110 may be connected to a private network 10 associated with an environment of the devices 110 (e.g., home, business, etc.). For example, the devices 110 may communicate with each other using the private network 10, even if the private network 10 is not connected to remote networks (e.g., network(s) 199). In some examples, the devices 110, the system component(s) 120, and/or the smart home skill system component(s) 125a may communicate via the private network 10 and one or more network(s) 199. For example, the system component(s) 120 may be remote from the devices 110 and the devices 110 may communicate with the system component(s) 120 via the private network 10 and the network(s) 199. However, while FIG. 23 illustrates the private network 10 being connected to the network(s) 199, such that the devices 110 may communicate with the system component(s) 120 and/or the smart home skill system component(s) 125a via the private network 10 and the network(s) 199, the disclosure is not limited thereto.

Additionally or alternatively, while FIG. 23 illustrates the system component(s) 120 and/or the smart home skill system component(s) 125a being remote from the devices 110 and connected to the private network 10 indirectly via the network(s) 199, the disclosure is not limited thereto. In some examples, the system component(s) 120 and/or the smart home skill system component(s) 125a may be directly connected to the private network 10 without departing from the disclosure. For example, the system component(s) 120 and/or the smart home skill system component(s) 125a may correspond to home servers or other devices associated with the private network 10 without departing from the disclosure.

In some examples, the system 100 may include the system component(s) 120 and/or one or more on-device speech interface devices (e.g., first device 110a(1), illustrated in FIG. 23 as first hub device 110a) configured to enable a voice interface and interpret voice commands, although the disclosure is not limited thereto. For example, some of the devices 110 may be voice-enabled and configured to receive user utterances and perform operations in response to such user utterances. In these examples, the voice-enabled devices 110 may be "hands free" such that interactions with the devices are performed through audible requests and responses.

As described in greater detail above, the system 100 may perform language processing using the system component(s) 120 and/or the one or more language processing devices 110a. For example, the system 100 may perform remote speech processing (e.g., send audio data via the network(s) 199 to the system component(s) 120), perform local speech processing (e.g., send audio data via the private network 10 to one of the one or more language processing devices 110a, such as hub device 110a), and/or perform hybrid speech processing (e.g., send audio data to both the system component(s) 120 and one of the one or more language processing devices 110a).

As illustrated in FIG. 23, some of the devices 110 may be "smart" devices associated with the smart home skill system component(s) 125a. In some examples, some of the devices 110 (e.g., smart phone 110k, devices 1101, and smart plug 110j) may be configured to communicate with the smart home skill system component(s) 125a directly via the network(s) 199, while other devices 110 (e.g., 110c-110h) may be configured to communicate with the smart home skill system component(s) 125a indirectly via hub devices 110a-110b. For example, the smart plug 110j may send data to the smart home skill system component(s) 125a via the network(s) 199, whereas the smart plug 110h may send data to a second hub device 110b and the second hub device 110b may send the data to the smart home skill system component(s) 125a via the network(s) 199.

The system 100 may also include hub devices 110a-110b. A hub device may be referred to as a "home controller," gateway and/or other type of "hub," and may assist in controlling associated smart-home devices. In some examples, smart devices may be paired to the hub device, typically by following directions to physically place the smart device and the hub device into a join mode, which may also be described as a pairing mode, and/or by utilizing a hub-associated application stored on and/or accessed by a web and/or mobile phone. Thereafter, the hub device may be utilized to control operations associated with the smart device. As illustrated in FIG. 23, the first hub device 110a may correspond to a device 110 that is configured to interpret voice commands and perform other functionality while also connecting to one or more devices (e.g., smart bulbs 110c-110d). In contrast, the second hub device 110b may be configured specifically to connect to one or more devices (e.g., smart bulb 110e, smart plug 110f, smart plug 110g, smart plug 110h, etc.) without performing additional functionality without departing from the disclosure.

While FIG. 23 illustrates the hub devices 110a-110b connecting to smart bulbs 110c-110e and smart plugs 110f-110h, the disclosure is not limited thereto and the hub devices 110a-110b may connect to any number of devices 110 without departing from the disclosure.

While not illustrated in FIG. 23, any of the devices 110 may be configured to connect to sensor components that are external to the devices 110, using a wireless connection and/or a wired connection, without departing from the disclosure. Additionally or alternatively, while the smart bulbs 110c-110e and/or the smart plugs 110f-110j may not include a traditional sensor component, these devices 110c-110j may determine a current state (e.g., "ON" or "OFF") and the current state may be considered sensor data without departing from the disclosure. For example, the system 100 may detect that the smart bulb 110c switches from a first state (e.g., "OFF") to a second state (e.g., "ON") and use that information to generate event data without departing from the disclosure.

The devices 110 that connect to the hub devices 110a-110b may be described as "smart" devices, which may have certain computing components and be configured to send and/or receive data from other devices. For example, these smart devices may correspond to light bulbs, plugs, locks, televisions, appliances, doorbells, cameras, etc. These devices 110 may be "paired" or otherwise associated with a voice-enabled device (e.g., devices 1101), a hub device (e.g., hub devices 110a-110b), and/or a user account, although the disclosure is not limited thereto.

The devices 110 may be configured to send data to and/or receive data from the system component(s) 120 and/or the smart home skill system component(s) 125a via the network(s) 199. As discussed above, one or more of the components of the system 100 may communicate directly with the system component(s) 120 and/or the smart home skill system component(s) 125a via the network(s) 199. However, the disclosure is not limited thereto, and one or more the components of the system 100 may communicate indirectly with the system component(s) 120 and/or the smart home skill system component(s) 125a via another device 110, such as the hub devices 110a-110b. Additionally or alternatively, a personal device, such as a smart phone 110k, may communicate directly with the devices 110 and/or the system component(s) 120 and/or the smart home skill system component(s) 125a without departing from the disclosure.

The devices 110 may include one or more components, such as, for example, one or more microphones, one or more speakers, one or more displays, one or more cameras, and/or sensor components (e.g., motion sensor, proximity sensor, etc.). The microphones may be configured to capture audio, such as user utterances, and generate corresponding audio data. The speakers may be configured to output audio, such as audio corresponding to audio data received from another device 110, the system component(s) 120, and/or the smart home skill system component(s) 125a. The displays may be configured to present images, such as images corresponding to image data received from another device 110, the system component(s) 120 and/or the smart home skill system component(s) 125a.

In some examples, the devices 110 may be configured to activate and/or deactivate device functionality components. For example, the smart bulb 110c may be a light bulb, and in this example, the device functionality components may include a filament and/or light emitting diode that may produce and/or emit light. Additionally or alternatively, the smart plug 110f may be a wall plug, and in this example, the device functionality components may include an "on/off mechanism" for causing electricity to flow or not flow to a device that is plugged in to the wall plug. It should be noted that the device functionality components illustrated here are by way of example only and the disclosure is not limited thereto.

The personal device (e.g., smart phone 110k) may include one or more components such as one or more applications residing on memory of the personal device and/or residing elsewhere. The applications may be configured to cause processors of the personal device to display one or more user interfaces associated with operations of the devices 110. The user interfaces may be utilized to receive inputs from the user of the personal device and/or to provide content to the user.

As described in greater detail above, the system component(s) 120 may include an automatic speech recognition (ASR) component, a natural language understanding (NLU) component, a text-to-speech (TTS) component, and/or the like. Thus, the system component(s) 120 may be configured to enable a voice interface and perform additional functionality without departing from the disclosure.

As illustrated in FIG. 23, in some examples the smart home skill system component(s) 125a is located in a remote environment (e.g., separate location) relative to the devices 110 (e.g., not directly connected to the private network 10), such that the device 110 may only communicate with the smart home skill system component(s) 125a via the network(s) 199. However, the disclosure is not limited thereto, and in other examples the smart home skill system component(s) 125a may be configured in a local environment (e.g., home server and/or the like), such that the devices 110 may communicate with the smart home skill system component(s) 125a via the private network 10.

The smart home skill system component(s) 125a may include a device state component 2310, a target-inference component 2312, a configuration component 714, and/or a smart home skill 1490a/1590a. Each of the components described herein with respect to the smart home skill system component(s) 125a may be associated with their own systems, which collectively may be referred to herein as the smart home skill system component(s) 125a, and/or some or all of the components may be associated with a single system.

The device state component 2310 may be configured to monitor a device state for each of the individual devices 110. For example, a device 110 may undergo state changes, such as being turned on and off. Additionally or alternatively, the device 110 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill system component(s) 125a and stored by the device state component 2310.

The target-inference component 2312 may be configured to determine which of the plurality of devices 110 to operate based at least in part on receiving audio data representing a user utterance from a user. For example, a user may speak a user utterance to perform functionality and corresponding audio may be captured by the microphones of one of the devices 110. The device 110 may generate audio data representing the user utterance and may send the audio data to the speech interface device 110a and/or the system component(s) 120 for speech processing. In some examples, the system (e.g., the speech interface device 110*a* and/or the system component(s) 120) may attempt to determine which device 110 to operate in light of the user utterance. For example, the user utterance may include "turn on study light." The ASR component 1450/1550 may generate text data corresponding to the audio data and the NLU component 1460/1560 may generate intent data indicating that the user utterance is associated with a "turn on" intent and that the device to be acted on has a naming indicator of "study light." In these examples, the smart home skill system component(s) 125*a* may be designated as a component that may handle and/or otherwise perform operations corresponding to a "turn on" intent. The speech interface device 110*a*/system component(s) 120 may communicate the intent data and/or other data to the smart home skill system component(s) 125*a* using the smart home skill 1490*a*/1590*a*. The smart home skill 1490*a*/1590*a* may attempt to identify the device 110 to be operated using the data received from the speech interface device 110*a*/system component(s) 120 and/or from one or more other components, such as an internet-of-things component.

The user, the speech interface device 110*a*, the system component(s) 120, the smart home skill system component(s) 125*a*, and/or a third-party system may have given naming indicators to the devices 110 associated with the user profile associated with the user. However, in this example, none of the naming indicators may be "study light" and/or multiple naming indicators may correspond to "study light." Therefore, the target-inference component 2312 of the smart home skill system component(s) 125*a* may perform target inference operations to identify which of the multiple devices 110 is most likely to be the "study light." The target inference operations may include determining which device is most likely in the "on" state at the time the audio data was received by the system component(s) 120. For example, the target-inference component 2312 may determine that 1% of the devices 110 associated with a first device with the naming indicator of "kitchen light" are in the "unlocked" state. The target-inference component 2312 may further determine that 50% of the devices 110 associated with a second device with the naming indicator of "bedroom light" are in the "unlocked" state. The target-inference component 2312 may further determine that 97% of the devices 110 associated with a third device with the naming indicator of "office light" are in the "on" state. Based at least in part on this analysis, the target-inference component 2312 may determine that the third device is most likely the device that the user desires to operate.

Additionally or alternatively, the state prediction operations described herein may be utilized when configuring a device 110 for scheduled state changes. For example, a user may desire to set a schedule for a device 110 to be activated and deactivated during, for example, a given day. While the user may manually set such a schedule, the user may additionally, or alternatively, desire to automatically set a schedule based on typical usage patterns for devices like the selected device. To do so, the configuration component 714 may determine when state changes generally occur for a subset of the devices 110 that are similar to the selected device. Scheduling data indicating the schedule of such state changes may be generated and a recommendation indicating the schedule may be sent to the device 110 and/or the personal device associated with the user to configure the selected device for scheduled state changes utilizing the schedule. Based at least in part on receiving input data representing an acceptance of the recommendation, the configuration component 714 may configure the selected device using the schedule.

Additionally, or alternatively, the state prediction operations described herein may be utilized to determine which devices to transition states at a given time and/or in response to a user request. For example, a user may speak a "good night" or "good morning" user utterance to one of the device 110 configured to be voice enabled. In other examples, the user may provide input to a personal device (e.g., smart phone 110*k*) that corresponds to a "good night" or "good morning" request. In these examples, the user utterance may be associated with an intent to operate one or more devices 110 that a user would typically operate when they are going to bed and/or getting up for the morning. For example, when going to bed, the user may desire to lock the doors, turn off certain lights, turn on other lights, adjust thermostat temperatures, etc. The state prediction operations described herein may be utilized to determine which of the devices 110 to operate when a user command such as those described with respect to these examples is received.

Additionally, or alternatively, the state prediction operations described herein may be utilized to determine which devices 110 to operate and/or not operate when a user is not present in a space with the devices 110. For example, the system component(s) 120, the smart home skill system component(s) 125*a*, and/or the device 110 may determine that a user is not present in the space. This determination may be made, for example, by determining that audio has not been received at the microphones of the device 110 and/or audio is received below a threshold amount and/or a threshold intensity. Additionally, or alternatively, the determination may be made based at least in part on image data representing one or more images of the space not depicting a user. Additionally, or alternatively, the determination may be made based at least in part on a signal not being received from a personal device (e.g., smart phone 110*k*) associated with the user. In examples where it is determined that a user is not present in the space, devices 110 may be activated based at least in part on their predicted state. Additionally, or alternatively, devices 110 may restricted from activation during this time period, which may prevent such devices from being activated when not desired.

The smart home skill 1490*a*/1590*a* described herein may include a speech-enabled web component that may run in the system component(s) 120 and/or the smart home skill system component(s) 125*a*. Skill(s) may receive and respond to user-initiated requests. Skill(s) may define lifecycle events for a skill as experienced by a user, a way to process requests from the user, and/or call-backs from events happening on the device the user is interacting with. Given skill(s) may be capable of handling certain intents. For example, the NLU component 1460/1560 may generate intent data that indicates an intent as well as a payload associated with the intent. A skill may be associated with the intent, and thus the intent data, including the payload may be sent to and received by the skill. The skill may process that intent by analyzing the payload and generating data representing a directive and/or command to perform an action. The directive and/or command may be sent to other components of the system for performance of the action.

After processing a user request and generating the directive, the system component(s) 120 and/or the smart home skill system component(s) 125*a* may publish (i.e., write) some or all of this information to an event bus. That is, the system component(s) and/or the smart home skill system component(s) 125*a* may provide information regarding the initial request (e.g., the speech, the text, the domain/intent, etc.), the response to be provided to a device 110, or any other information pertinent to the interaction between the device 110 and the system component(s) 120 and/or the smart home skill system component(s) 125a to the event bus.

Within the system component(s) 120 and/or the smart home skill system component(s) 125a, one or more components or services may subscribe to the event bus so as to receive information regarding interactions between the devices 110 and the user. For example, the smart home skill system component(s) 125a may subscribe to the event bus and, thus, may monitor information regarding these interactions. In some examples, monitoring information in the event bus may comprise messages between various components of the system component(s) 120 and/or the smart home skill system component(s) 125a. For example, the device state component 2310 may monitor the event bus to identify device state data for the devices 110. In some examples, the event bus may "push" or send indications of events and/or device state data to one or more components and/or devices 110. For example, the event bus may send indications of events and/or device state data to the smart phone 110k and/or the smart home skill system component(s) 125a. Additionally, or alternatively, the event bus may be "pulled" where a component sends requests to the event bus to provide an indication of device state data for a particular device 110.

The event bus may store indications of the device states for the devices, such as in a database (e.g., profile storage 275, event database associated with the smart home skill system component(s) 125a, etc.), and using the stored indications of the device states, send the device state data for the devices 110 to the system component(s) 120 and/or the smart home skill system component(s) 125a. Thus, to identify device state data for a device 110, a component may send a request to the event bus (e.g., event component) to provide an indication of the device state data associated with a device 110, and receive, from the event bus, the device state data that was requested.

In some examples, the system component(s) 120 and/or the smart home skill system component(s) 125a may monitor information published to the event bus and identify events that may trigger action. For example, the system component(s) 120 and/or the smart home skill system component(s) 125a may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The system component(s) 120 and/or the smart home skill system component(s) 125a may reference a user registry to determine which voice-enabled devices are associated with secondary devices, as well as determine device types, states, and other capabilities of these secondary devices. For example, the system component(s) 120 and/or the smart home skill system component(s) 125a may determine, from the information published to the event bus, an identifier associated with the voice-enabled device making the corresponding request or the voice-enabled device selected to respond to or act upon the user utterance. The system component(s) 120 and/or the smart home skill system component(s) 125a may use this identifier to identify, from the user registry, a user profile associated with the voice-enabled device and/or determine whether any secondary devices have been registered with the identified user profile, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The system component(s) 120 and/or the smart home skill system component(s) 125a may determine whether a particular event identified is associated with supplemental content. That is, the system component(s) 120 and/or the smart home skill system component(s) 125a may write, to a datastore, indications of which types of events and/or which primary content or responses are associated with supplemental content. In some examples, the system component(s) 120 and/or the smart home skill system component(s) 125a may provide access to third-party developers to allow the developers to register supplemental content for output on secondary devices for particular events and/or primary content. For example, if a voice-enabled device is to output that the weather will include thunder and lightning, the system component(s) 120 and/or the smart home skill system component(s) 125a may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device 110b to the audio session. In these and other examples, the system component(s) 120 and/or the smart home skill system component(s) 125a may store an association between the primary response or content (e.g., outputting of information regarding the world's largest mammal) and corresponding supplemental content (e.g., the audio data, image data, or the like). In some examples, the system component(s) 120 and/or the smart home skill system component(s) 125a may also indicate which types of secondary devices are to output which supplemental content. For example, the system component(s) 120 and/or the smart home skill system component(s) 125a may store an indication that secondary devices of a class type "tablet" are to output a picture of a blue whale. In these and other examples, meanwhile, the system component(s) 120 and/or the smart home skill system component(s) 125a may store the supplemental content in association with secondary-device capabilities (e.g., devices with speakers output the audio commentary, devices with screens output the image, etc.).

The system component(s) 120 and/or the smart home skill system component(s) 125a may also determine how to transmit response and/or supplement content (and/or information acquiring the content) to the devices 110 and/or the secondary devices. To make this determination, the system component(s) 120 and/or the smart home skill system component(s) 125a may determine a device type of the devices 110 and/or secondary devices, capabilities of the device(s), or the like, potentially as stored in the user registry. In some examples, the system component(s) 120 and/or the smart home skill system component(s) 125a may determine that a particular device is able to communicate directly and may provide the response and/or content directly over the network(s) 199 to the secondary device 110b (potentially via the system component(s) 120). In another example, the system component(s) 120 and/or the smart home skill system component(s) 125*a* may determine that a particular secondary device 110*b* is unable to communicate directly with the system component(s) 120 and/or the smart home skill system component(s) 125*a*, but instead is configured to communicate with a hub device 110*a*-110*b* in its space over short-range wireless networks. As such, the system component(s) 120 and/or the smart home skill system component(s) 125*a* may send the supplement content (or information) to the hub device 110*a*/110*b*, which may send the information over a short-range network to the secondary device.

The system component(s) 120 and/or the smart home skill system component(s) 125*a* may include the user registry (e.g., profile storage 275, database associated with the smart home skill system component(s) 125*a*, etc.) that includes data regarding user profiles as described herein. The user registry may be located part of, or proximate to, the system component(s) 120 and/or the smart home skill system component(s) 125*a*, although the disclosure is not limited thereto and the user registry may be separate and may communicate with the system component(s) 120 and/or the smart home skill system component(s) 125*a* via the network(s) 199 without departing from the disclosure.

The user registry may include a variety of information related to individual users, user profiles, accounts, etc., that interact with the devices 110, the system component(s) 120, and/or the smart home skill system component(s) 125*a*. For example, the user registry may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry may store indications of associations between various devices 110 (e.g., between voice-enabled devices and/or secondary device), such as virtual clusters of devices, states of devices, and associations between devices and audio-session queues. The user registry may represent clusters of devices as single devices that can receive commands and disperse the commands to each device and/or to the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the smart home skill 1490*a*/1590*a* and/or other skills 1490 may determine, based on the stored device states in the user registry, a current device state of the devices 110. Rather than receiving device states for the voice-enabled devices, in metadata, the device states may already have been determined or received and stored in the user registry. Further, the user registry may provide indications of various permission levels depending on the user. As an example, the system component(s) 120 may perform speaker recognition on audio signals to determine an identity of the speaker. If the speaker is a child, for example, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus may publish different events which indicate device states to various entities or components that subscribe to the event bus. For example, if an event of "turn on office lights" occurs for a voice-enabled device, the event bus may publish the indication of this event, and thus the device state of the voice-enabled device from which the audio data was received may be determined. Thus, various components may be provided with indications of the various device states via the event bus. The event bus may further store and/or update device states for the devices 110 in the user registry. The components of the system component(s) 120 and/or the smart home skill system component(s) 125*a* may query the user registry to determine device states.

A particular user profile may include a variety of data that may be used by the system component(s) 120 and/or the smart home skill system component(s) 125*a*. For example, a user profile may include information about what device(s) 110 are associated with the user and/or user profile. The user profile may further indicate an IP address for each of the devices 110 associated with the user and/or user profile, user IDs for the devices 110, indications of the types of devices, and current device states for the devices.

The user registry component may be configured to identify, determine, and/or generate associations between users, user accounts, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between the devices 110. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores may be configured to identify, determine, and/or generate data associated with use of the devices 110. Usage data may be identified, determined, and/or generated that indicates some or each of these interactions. Timing data may also be identified, determined, and/or generated that indicates a time at which some or each of these interactions took place. Device-state data, and/or other usage data may also be identified, determined, and/or generated. In some examples, the user registry and the data stores may be separate components, although the disclosure is not limited thereto and in other examples the user registry and the data stores may be a single component. In other examples, the data stores may be operated and/or maintained by a third-party system other than the system component(s) 120 and/or the smart home skill system component(s) 125*a*, and the system component(s) 120 and/or the smart home skill system component(s) 125*a* may have access to the data stores.

As described above, the smart home skill system component(s) 125*a* may include a device state component 2310 configured to monitor a device state for each of the individual devices 110. For example, a device 110 may undergo state changes, such as being turned on and off. Additionally or alternatively, the device 110 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill system component(s) 125a and stored by the device state component 2310.

In some examples, the smart home skill system component(s) 125a may store information about the device and/or the device state in a device registry 1510. For example, the device registry 1510 may be configured to store the state data as well as identifying information associated with each of the devices 110, although the disclosure is not limited thereto.

Figure 25:
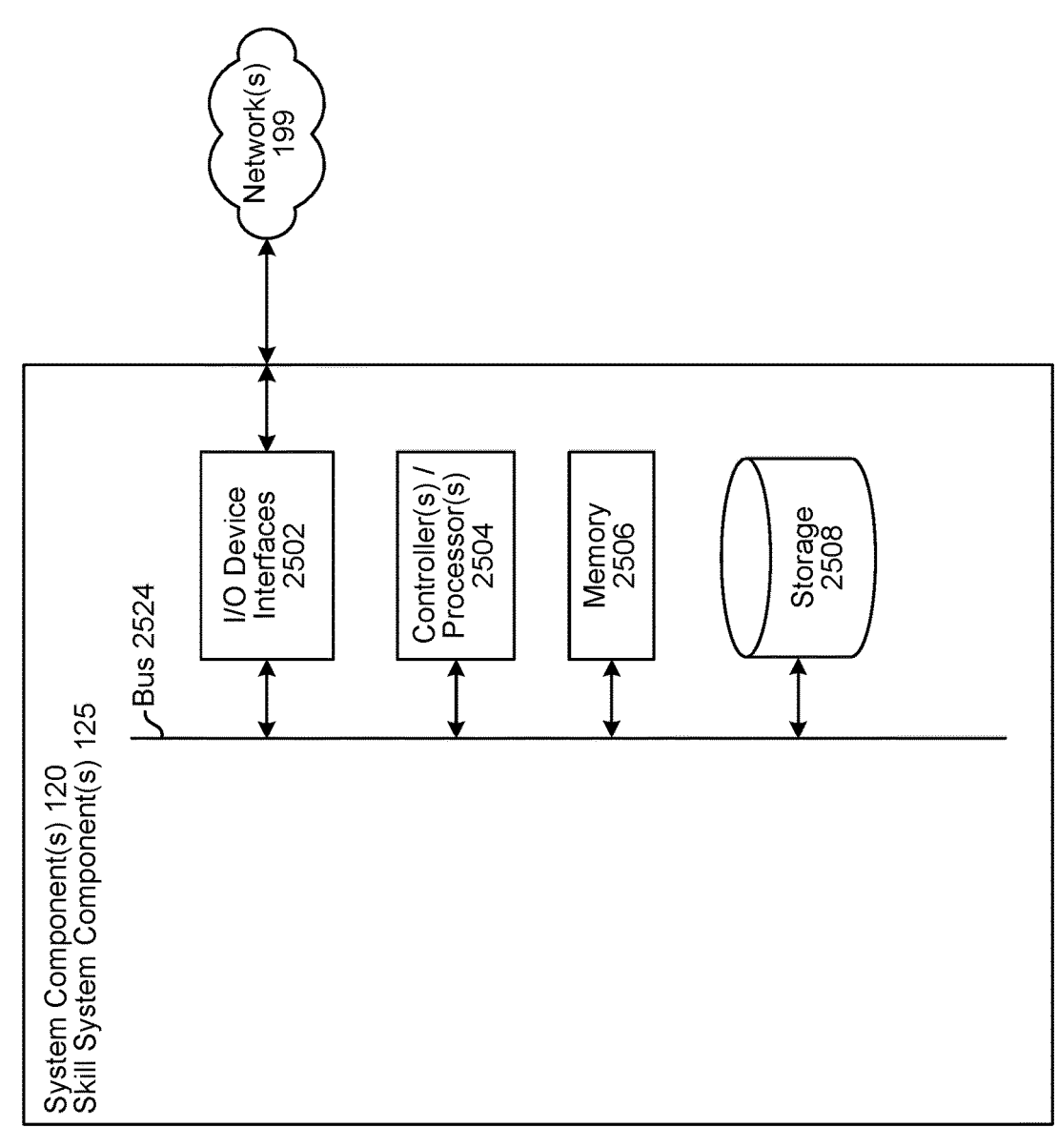
FIG. 25 is a block diagram conceptually illustrating example components of a system, according to embodiments of the present disclosure.

FIG. 24 is a block diagram conceptually illustrating a device 110 that may be used with the system. FIG. 25 is a block diagram conceptually illustrating example components of skill system component(s) 125 and/or system component(s) 120, such as a natural language command processing device, which may assist with ASR processing, NLU processing, etc. The system component(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) (120/125) may be located remotely from the device 110 as its operations may not require proximity to the user. The server/system component(s) (120/125) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) (120/125) may also be a version of a user device 110 that includes different (e.g., more) processing capabilities than other user device(s) 110 in a home/office. One benefit to the server/system component(s) (120/125) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) (120/125) for performing ASR processing, one or more natural language processing system component(s) (120/125) for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (2404/2504), which may each include a central processing unit (CPU) for processing data and computer-readable instructions, and a memory (2406/2506) for storing data and instructions of the respective device. The memories (2406/2506) may individually include volatile random access memory (RAM), non-volatile read only memory (ROM), non-volatile magnetoresistive memory (MRAM), and/or other types of memory. Each device (110/120/125) may also include a data storage component (2408/2508) for storing data and controller/processor-executable instructions.

Each data storage component (2408/2508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2402/2502).

Computer instructions for operating each device (110/120/125) and its various components may be executed by the respective device's controller(s)/processor(s) (2404/2504), using the memory (2406/2506) as temporary "working" storage at runtime. A device's computer instructions may be stored in a non-transitory manner in non-volatile memory (2406/2506), storage (2408/2508), or an external device(s). Alternatively, some or all of the executable instructions may be embedded in hardware or firmware on the respective device in addition to or instead of software.

Each device (110/120/125) includes input/output device interfaces (2402/2502). A variety of components may be connected through the input/output device interfaces (2402/2502), as will be discussed further below. Additionally, each device (110/120/125) may include an address/data bus (2424/2524) for conveying data among components of the respective device. Each component within a device (110/120/125) may also be directly connected to other components in addition to (or instead of) being connected to other components across the bus (2424/2524).

Referring to FIG. 24, the device 110 may include input/output device interfaces 2402 that connect to a variety of components such as an audio output component such as one or more loudspeaker(s) 2413, a wired headset or a wireless headset (not illustrated), or other component capable of outputting audio. The device 110 may also include an audio capture component. The audio capture component may be, for example, one or more microphone(s) 2412 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 2416 for displaying content. The device 110 may further include a camera 2418.

Via antenna(s) 2422, the input/output device interfaces 2402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2402/2502) may also include communication components that allow data to be exchanged between devices such as different physical servers in a collection of servers or other components.

The components of the device(s) 110 and/or the system component(s) (120/125) may include their own dedicated processors, memory, and/or storage. Alternatively, one or more of the components of the device(s) 110 and/or the system component(s) (120/125) may utilize the I/O interfaces (2402/2502), processor(s) (2404/2504), memory (2406/2506), and/or storage (2408/2508) of the device(s) 110 and/or the system component(s) (120/125), respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, and the system component(s) 120, as described herein, are illustrative, and may be located as a stand-alone device or may be included, in whole or in part, as a component of a larger device or system. As can be appreciated, a number of components may exist either on the system component(s) (120/125) and/or on the device 110. For example, language processing component 1492/1592 (which may include ASR component 1450/1550), language output component 1493/1593 (which may include NLG component 1479/1579 and/or TTS component 1480/1580), etc., for example as illustrated in FIGS. 14 and 15. Unless expressly noted otherwise, the system version of such components may operate similarly to the device version of such components and thus the description of one version (e.g., the system version or the local version) applies to the description of the other version (e.g., the local version or system version) and vice-versa.

Figure 26:
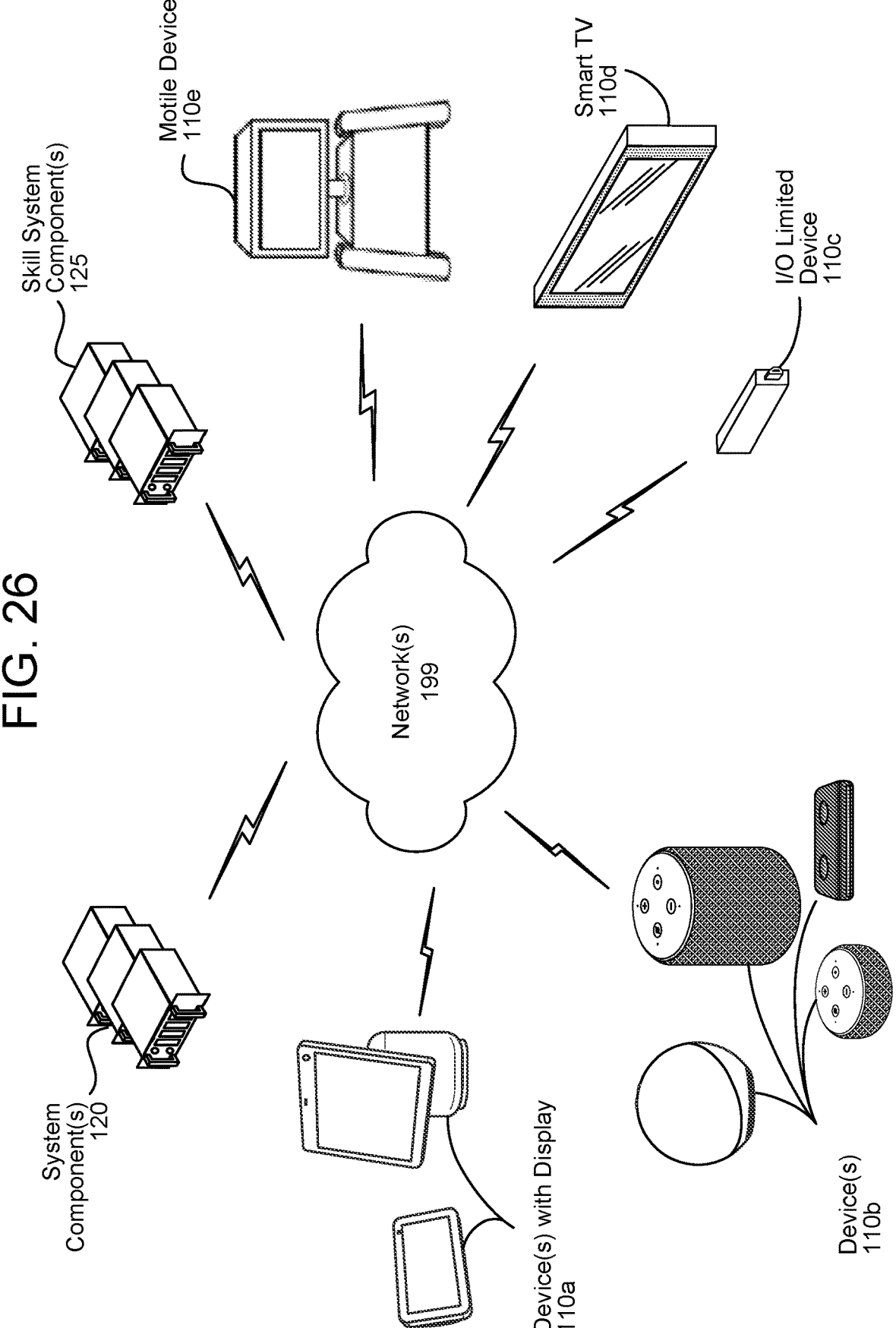
FIG. 26 illustrates an example of a computer network for use with the overall system, according to embodiments of the present disclosure.

As illustrated in FIG. 26, multiple devices (110a-110e, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, device(s) with display 110a, device(s) 110b, an input/output limited device 110c, a display/smart television 110d, and/or a motile device 110e may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

retrieving device data that indicates a plurality of devices associated with a user profile, the device data including (i) a first device identifier and a first network address associated with a first device and (ii) a second device identifier and a second network address associated with a second device;

selecting a subset of the plurality of devices corresponding to a first location, the subset including the first device and the second device;

determining first capability data indicating a first capability of the first device to perform wakeword detection;

determining second capability data indicating a second capability of the first device to perform user identification;

determining third capability data indicating a third capability of the second device to perform the wakeword detection;

determining fourth capability data indicating a fourth capability of the second device to perform the user identification;

selecting, using the first capability data and the third capability data, the first device to perform the wakeword detection over the second device;

selecting, using the second capability data and the fourth capability data, the second device to perform the user identification over the first device;

storing first data that includes a first association between the first device and the wakeword detection and a second association between the second device and the user identification;

sending, to the first device, second data directing the first device to enable the wakeword detection and disable the user identification;

in response to receiving the second data, enabling, by the first device, the wakeword detection and disabling the user identification;

sending, to the second device, third data directing the second device to enable the user identification and disable the wakeword detection; and in response to receiving the third data, enabling, by the second device, the user identification and disabling the wakeword detection.

2. The computer-implemented method of claim 1, further comprising:

determining a first indicator of performance indicating a first quality at which the first device performs the wakeword detection;

determining a second indicator of performance indicating a second quality at which the first device performs the user identification, the second quality corresponding to a first resolution of a first camera associated with the first device;

determining a third indicator of performance indicating a third quality at which the second device performs the wakeword detection;

determining a fourth indicator of performance indicating a fourth quality at which the second device performs the user identification, the fourth quality corresponding to a second resolution of a second camera associated with the second device, the second resolution being higher than the first resolution;

selecting the first device to perform the wakeword detection based on the first capability data, the third capability data, the first indicator, and the third indicator; and selecting the second device to perform the user identification based on the second capability data, the fourth capability data, the second indicator, and the fourth indicator.

3. The computer-implemented method of claim 1, further comprising:

determining that the second device is no longer detected by the plurality of devices;

removing the second device from the subset of the plurality of devices;

determining, using the third capability data, that the first device is most capable of performing the user identification from the subset of the plurality of devices; and sending, to the first device, fourth data directing the first device to enable the user identification.

4. The computer-implemented method of claim 1, further comprising:

determining, using the fourth capability data and fifth capability data indicating a fifth capability of a third device to perform the user identification, that the third device is more capable of performing the user identification than the second device;

determining context data associated with the subset, the context data indicating that the third device has available processing capability;

selecting the third device to perform the user identification using the context data, the second capability data, the fourth capability data, and the fifth capability data;

storing fourth data that includes the first association and a third association between the third device and the user identification;

sending, to the second device, fifth data directing the second device to disable the user identification; and sending, to the third device, sixth data directing the third device to enable the user identification.

5. A computer-implemented method, the method comprising:

retrieving device data that indicates a plurality of devices associated with a user profile, the device data including (i) a first device identifier and a first network address associated with a first device and (ii) a second device identifier and a second network address associated with a second device;

selecting a subset of the plurality of devices, the subset including the first device and the second device;

determining first capability data associated with the first device, the first capability data indicating that the first device is capable of performing a first task and a second task;

determining second capability data associated with the second device, the second capability data indicating that the second device is capable of performing the first task and the second task;

selecting the first device to perform the first task using the first capability data, the second capability data, and first context data, the first context data indicating a context associated with the subset of the plurality of devices;

selecting the second device to perform the second task using the first capability data, the second capability data, and the first context data;

storing first data that includes a first association between the first device and the first task and a second association between the second device and the second task;

sending, to the first device, second data directing the first device to enable the first task and disable the second task;

in response to receiving the second data, enabling, by the first device, the first task and disabling the second task;

sending, to the second device, third data directing the second device to enable the second task and disable the first task; and in response to receiving the third data, enabling, by the second device, the second task and disabling the first task.

6. The computer-implemented method of claim 5, further comprising:

determining a first indicator of performance indicating a first quality at which the first device performs the first task;

determining a second indicator of performance indicating a second quality at which the first device performs the second task;

determining a third indicator of performance indicating a third quality at which the second device performs the first task;

determining a fourth indicator of performance indicating a fourth quality at which the second device performs the second task; and determining the first context data using the first indicator, the second indicator, the third indicator, and the fourth indicator.

7. The computer-implemented method of claim 5, further comprising:

determining a first value indicating how frequently the first device is selected to perform the first task;

determining a second value indicating how frequently the first device is selected to perform the second task;

determining a third value indicating how frequently the second device is selected to perform the first task;

determining a fourth value indicating how frequently the second device is selected to perform the second task; and determining the first context data using the first value, the second value, the third value, and the fourth value.

8. The computer-implemented method of claim 5, further comprising:

determining that the second device is no longer detected by the plurality of devices;

removing the second device from the subset of the plurality of devices;

determining, using the first capability data, that the first device is most capable of performing the second task from the subset of the plurality of devices; and sending, to the first device, fourth data directing the first device to enable the second task.

9. The computer-implemented method of claim 5, further comprising:

determining that the second device is currently performing an action;

determining, using the first capability data, that the first device is capable of performing the second task; and sending, to the first device, fourth data directing the first device to enable the second task.

10. The computer-implemented method of claim 5, further comprising:

receiving a request to perform an action associated with the second task;

determining that a device state associated with the second device indicates that the second device is currently unable to perform the action;

determining, using the first capability data, that the first device is capable of performing the second task; and sending, to the first device, fourth data directing the first device to perform the action.

11. The computer-implemented method of claim 5, further comprising:

receiving, from the first device, a request to perform an action;

determining a first number of devices with available processing capability from the subset;

determining, from the first number of devices, a third device configured to perform the action; and causing the third device to execute the request.

12. The computer-implemented method of claim 5, wherein the first context data indicates that a third device was associated with a first processing consumption during a first time range, the method further comprising:

determining second context data, the second context data indicating that the third device is associated with a second processing consumption during a second time range, the second processing consumption lower than the first processing consumption;

selecting the third device to perform the second task using the first capability data, the second capability data, and the second context data;

storing fourth data that includes the first association and a third association between the third device and the second task;

sending, to the second device, fifth data directing the second device to disable the second task; and sending, to the third device, sixth data directing the third device to enable the second task.

13. A system comprising:

at least one processor; and memory including instructions operable to be executed by the at least one processor to cause the system to:

retrieve device data that indicates a plurality of devices associated with a user profile, the device data including (i) a first device identifier and a first network address associated with a first device and (ii) a second device identifier and a second network address associated with a second device select a subset of the plurality of devices, the subset including the first device and the second device;

determine first capability data associated with the first device, the first capability data indicating that the first device is capable of performing a first task and a second task;

determine second capability data associated with the second device, the second capability data indicating that the second device is capable of performing the first task and the second task;

select the first device to perform the first task using the first capability data, the second capability data, and first context data, the first context data indicating a context associated with the subset of the plurality of devices;

select the second device to perform the second task using the first capability data, the second capability data, and the first context data;

store first data that includes a first association between the first device and the first task and a second association between the second device and the second task;

send, to the first device, second data directing the first device to enable the first task and disable the second task;

in response to receiving the second data, enable, by the first device, the first task and disable the second task;

send, to the second device, third data directing the second device to enable the second task and disable the first task; and in response to receiving the third data, enable, by the second device, the second task and disable the first task.

14. The system of claim 13, wherein the memory further comprises instructions that, when executed by the at least one processor, further cause the system to:

determine a first indicator of performance indicating a first quality at which the first device performs the first task;

determine a second indicator of performance indicating a second quality at which the first device performs the second task;

determine a third indicator of performance indicating a third quality at which the second device performs the first task;

determine a fourth indicator of performance indicating a fourth quality at which the second device performs the second task; and determine the first context data using the first indicator, the second indicator, the third indicator, and the fourth indicator.

15. The system of claim 13, wherein the memory further comprises instructions that, when executed by the at least one processor, further cause the system to:

determine a first value indicating how frequently the first device is selected to perform the first task;

determine a second value indicating how frequently the first device is selected to perform the second task;

determine a third value indicating how frequently the second device is selected to perform the first task;

determine a fourth value indicating how frequently the second device is selected to perform the second task; and determine the first context data using the first value, the second value, the third value, and the fourth value.

16. The system of claim 13, wherein the memory further comprises instructions that, when executed by the at least one processor, further cause the system to:

determine that the second device is no longer detected by the plurality of devices;

remove the second device from the subset of the plurality of devices;

determine, using the first capability data, that the first device is most capable of performing the second task from the subset of the plurality of devices; and send, to the first device, fourth data directing the first device to enable the second task.

17. The system of claim 13, wherein the memory further comprises instructions that, when executed by the at least one processor, further cause the system to:

determine that the second device is currently performing an action;

determine, using the first capability data, that the first device is capable of performing the second task; and send, to the first device, fourth data directing the first device to enable the second task.

18. The system of claim 13, wherein the memory further comprises instructions that, when executed by the at least one processor, further cause the system to:

receive a request to perform an action associated with the second task;

determine that a device state associated with the second device indicates that the second device is currently unable to perform the action;

determine, using the first capability data, that the first device is capable of performing the second task; and send, to the first device, fourth data directing the first device to perform the action.

19. The system of claim 13, wherein the memory further comprises instructions that, when executed by the at least one processor, further cause the system to:

receive, from the first device, a request to perform an action;

determine a first number of devices with available processing capability from the subset;

determine, from the first number of devices, a third device configured to perform the action; and cause the third device to execute the request.

20. The system of claim 13, wherein the first context data indicates that a third device was associated with a first processing consumption during a first time range, and the memory further comprises instructions that, when executed by the at least one processor, further cause the system to:

determine second context data, the second context data indicating that the third device is associated with a second processing consumption during a second time range, the second processing consumption lower than the first processing consumption;

select the third device to perform the second task using the first capability data, the second capability data, and the second context data;

store fourth data that includes the first association and a third association between the third device and the second task;

send, to the second device, fifth data directing the second device to disable the second task; and send, to the third device, sixth data directing the third device to enable the second task.

* * * * *